United States Patent
Dinan

(10) Patent No.: US 10,638,430 B2
(45) Date of Patent: *Apr. 28, 2020

(54) INITIALIZING UPLINK POWER IN A WIRELESS NETWORK

(71) Applicant: Ofinno Technologies, LLC, Herndon, VA (US)

(72) Inventor: Esmael Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/171,464

(22) Filed: Oct. 26, 2018

(65) Prior Publication Data

US 2019/0069250 A1 Feb. 28, 2019

Related U.S. Application Data

(63) Continuation of application No. 15/186,495, filed on Jun. 19, 2016, now Pat. No. 10,117,187.

(Continued)

(51) Int. Cl.
*H04W 52/14* (2009.01)
*H04W 52/24* (2009.01)
*H04W 74/08* (2009.01)

(52) U.S. Cl.
CPC ....... *H04W 52/146* (2013.01); *H04W 52/242* (2013.01); *H04W 74/0833* (2013.01)

(58) Field of Classification Search
CPC ............... Y02B 60/50; H04W 84/042; H04W 74/0833; H04W 72/0413; H04W 72/042;

(Continued)

(56) References Cited

U.S. PATENT DOCUMENTS 10,117,187 B2 * 10/2018 Dinan ................ H04W 52/146
2013/0188612 A1 7/2013 Dinan (Continued)

OTHER PUBLICATIONS

3GPP TS 36.211 V12.4.0 (Dec. 2014), Technical Specification, 3rd Generation Partnership Project; Technical Specification Group Radio Access Network; Evolved Universal Terrestrial Radio Access (E-UTRA); Physical channels and modulation, 3GPP, Valbonne, France.

(Continued)

*Primary Examiner* — Un C Cho
*Assistant Examiner* — Peter K Mak
(74) *Attorney, Agent, or Firm* — David Grossman; Kavon Nasabzadeh; Philip Smith

(57) ABSTRACT

A wireless device transmits first control information, via a secondary physical uplink control channel (PUCCH) of a secondary cell, with a first transmit power computed based on an adjustment factor. The wireless device receives a power control command of the secondary PUCCH and ignores the power control command by not applying the power control command to the adjustment factor in response to a time alignment timer of a timing advance group comprising the secondary cell not running. The wireless device transmits second control information on the secondary PUCCH with a second transmit power computed based on the adjustment factor initialized to a first value.

18 Claims, 29 Drawing Sheets

Related U.S. Application Data

(60) Provisional application No. 62/182,460, filed on Jun. 20, 2015.

(58) Field of Classification Search
CPC ........... H04W 52/146; H04W 52/0206; H04W 52/36; H04W 72/0473; H04W 52/34; H04W 52/50
See application file for complete search history.

(56) References Cited

U.S. PATENT DOCUMENTS

| | | | |
|---|---|---|---|
| 2014/0169322 A1* | 6/2014 | Ouchi | H04W 52/146 370/329 |
| 2014/0177500 A1* | 6/2014 | Han | H04W 52/0206 370/311 |
| 2014/0321442 A1 | 10/2014 | Kim et al. | |
| 2015/0163793 A1 | 6/2015 | Han et al. | |
| 2015/0245307 A1 | 8/2015 | Chen et al. | |
| 2015/0334734 A1* | 11/2015 | Park | H04W 76/15 370/329 |
| 2016/0029323 A1 | 1/2016 | Hwang et al. | |
| 2016/0227486 A1 | 8/2016 | Park | |

OTHER PUBLICATIONS

3GPP TS 36.212 V12.3.0 (Dec. 2014), Technical Specification, 3rd Generation Partnership Project; Technical Specification Group Radio Access Network; Evolved Universal Terrestrial Radio Access (E-UTRA); Multiplexing and channel coding, 3GPP, Valbonne, France.
3GPP TS 36.213 V12.4.0 (Dec. 2014), Technical Specification, 3rd Generation Partnership Project; Technical Specification Group Radio Access Network; Evolved Universal Terrestrial Radio Access (E-UTRA); Physical layer procedures, Valbonne, France.
3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Valbonne, France.
3GPP TS 36.321 V12.4.0 (Dec. 2014), Technical Specification, 3rd Generation Partnership Project; Technical Specification Group Radio Access Network; Evolved Universal Terrestrial Radio Access (E-UTRA); Medium Access Control (MAC) protocol specification, Valbonne, France.
3GPP TS 36.331 V12.4.1 (Dec. 2014), Technical Specification, 3rd Generation Partnership Project; Technical Specification Group Radio Access Network; Evolved Universal Terrestrial Radio Access (E-UTRA); Radio Resource Control (RRC); Protocol specification, Valbonne, France.
3GPP TSG RAN WG1 #80 R1-150357, Athens, Greece, Feb. 9-13, 2015, Agenda item: 7.2.2.1, Source: Samsung, Title: PUCCH Transmission on SCell for CA.
3GPP TSG RAN WG1 #80 R1-150468, Feb. 9-Feb. 13, 2015, Athens, Greece, Agenda item: 7.2.2.1, Source: Qualcomm Incorporated, Title: PUCCH on SCell.
3GPP TSG RAN WG1 #80 R1-150823, Athens, Greece, Feb. 9-13, 2015, Title: WF on PUCCH on SCell for CA, Source: NTT DOCOMO, NEC, Sharp, Softbank Mobile,Intel, Ericsson, KDDI.
3GPP TSG RAN WG1 #81 R1-152772, May 25-29, 2015, Fukuoka, Japan, Source: Qualcomm Incorporated, Title: Remaining aspects of PUCCH on SCell.
3GPP TSG RAN WG1 #81 R1-152847, Fukuoka, Japan, May 25-29, 2015, Source: Samsung, Title: Remaining Aspects for PUCCH Transmission on a SCell.
3GPP TSG RAN WG1 #81 R1-153397, Fukuoka, Japan, May 25-29, 2015, Source: Samsung, Title: Remaining Aspects for PUCCH Transmission on a SCell.
3GPP TSG RAN WG1 #81 R1-153459, Fukuoka, Japan, May 25-29, 2015, Source: LG Electronics, Intel Corporation, ZTE, ITL, Qualcomm, Title: Way Forward on power control for CA with PUCCH on Scell.
3GPP TSG RAN WG1 #81 R1-153497, Fukuoka, Japan, May 25-29, 2015, Source: LG Electronics, NTT DOCOMO, CATT, Samsung, Nokia Network, Qualcomm, Sharp, Potevio, Title: Way Forward on power control for CA with Pucch on Scell.
3GPP TSG RAN WG1 Meeting #80 R1-150102, Athens, Greece, Feb. 9-13, 2015, Source: CATT, Title: Uplink power control to support PUCCH on SCell for Rel-13 CA.
3GPP TSG RAN WG1 Meeting #80 R1-150067, Athens, Greece, Feb. 9-13, 2015, Source: Huawei, HiSilicon, Title: Support of PUCCH on SCell based on dual connectivity mechanism.
3GPP TSG RAN WG1 Meeting #80 R1-150135, Athens, Greece, Feb. 9-13, 2015, Source: ZTE, Title: Further CA enhancement to support PUCCH on SCell.
3GPP TSG RAN WG1 Meeting #80 R1-150206, Athens, Greece, Feb. 9-13, 2015, Agenda Item: 7.2.2.1, Source: LG Electronics, Title: Consideration on the support PUCCH on Scell for CA enhancement.
3GPP TSG RAN WG1 Meeting #80 R1-150291, Athens, Greece, Feb. 9-13, 2015, Agenda item: 7.2.2.1, Source: NEC, Title: Initial considerations on SCell PUCCH for CA.
3GPP TSG RAN WG1 Meeting #80 R1-150509, Athens, Greece, Feb. 9-13, 2015, Source: NTT DOCOMO, Inc., Title: PUCCH on SCell for UEs supporting UL-CA.
3GPP TSG RAN WG1 Meeting #81 R1-152564, Fukuoka, Japan, May 25-29, 2015, Source: CATT, Title: Remaining issues on PUCCH on SCell for Rel-13 CA.
3GPP TSG RAN WG1 Meeting #81 R1-152461, Fukuoka, Japan, May 25-29, 2015, Source: Huawei, HiSilicon, Title: Remaining issues for PUCCH on Scell.
3GPP TSG RAN WG1 Meeting #81 R1-152712, Fukuoka, Japan, May 25-29, 2015, Source: LG Electronics, Title: Remaining issues for supporting PUCCH on Scell in Rel-13 CA.
3GPP TSG RAN WG1 Meeting #81 R1-152950, Fukuoka, Japan, May 25-29, 2015, Source: ZTE, Title: Remaining aspects of PUCCH on Scell.
3GPP TSG RAN WG1 Meeting #81 R1-153047, Fukuoka, Japan, May 25-29, 2015, Source: Sharp, Title: On need of DCI format 3/3A for SCell PUCCH.
3GPP TSG RAN WG1 Meeting #81 R1-153271, Fukuoka, Japan, May 25-29, 2015, Source: ITL, Title: Remaining details for supporting PUCCH on Scell.
3GPP TSG RAN WG1 Meeting #81 R1-153672, Fukuoka, Japan, May 25-29, 2015, Title: LS on RAN1 agreements on CA Enhancement Beyond 5 Carriers, Release: Rel-13, Work Item: LTE_CA_enh_b5C, Source: TSG RAN WG1.
3GPP TSG RAN WG2 Meeting #89 R2-150038, Athens, Greece, Feb. 9-13, 2015, 3GPP TSG RAN WG1 Meeting #80 R1-150858, Athens, Greece, Feb. 9-13, 2015, Title: LS on RAN1 agreements on PUCCH on SCell for CA, Release: Rel-13, Work Item: LTE_CA_enh_b5C-Core, Source: TSG RAN WG1.
3GPP TSG-RAN WG1 #80 R1-150085, Athens, Greece, Feb. 9-13, 2015, Source: Intel Corporation, Title: Support of PUCCH on Scell for CA.
3GPP TSG-RAN WG1 #81 R1-152622, Fukuoka, Japan, May 25-29, 2015, Source: Intel Corporation, Title: Remaining issues for PUCCH on SCell.
3GPP TSG-RAN WG1 Meeting #81 R1-152664, Fukuoka, Japan, May 25-29, 2015, Source: Alcatel-Lucent, Alcatel-Lucent Shanghai Bell, Title: Remaining aspect PUCCH on SCell.
3GPP TSG-RAN WG1 Meeting #81 R1-153296, Fukuoka, Japan, May 25-29, 2015, Source: Nokia Networks, Title: Remaining aspects of PUCCH on SCell.
3GPP TSG-RAN WG1#80 R1-150321, Athens, Greece, Feb. 9-13, 2015, Source: Ericsson, Title: PUCCH on SCell for carrier aggregation.
3GPP TSG-RAN WG1#81 R1-153065, Fukuoka, Japan, May 25-29, 2015, Source: Ericsson, Title: Remaining issues of PUCCH on SCell.

(56) References Cited

OTHER PUBLICATIONS

3GPP TSG-RAN WG2 Meeting #80 R1-150167, Athens, Greece, Feb. 9-13, 2015, Source: Alcatel-Lucent, Alcatel-Lucent Shanghai Bell, Title: PUCCH on SCell for CA enhancement.

* cited by examiner

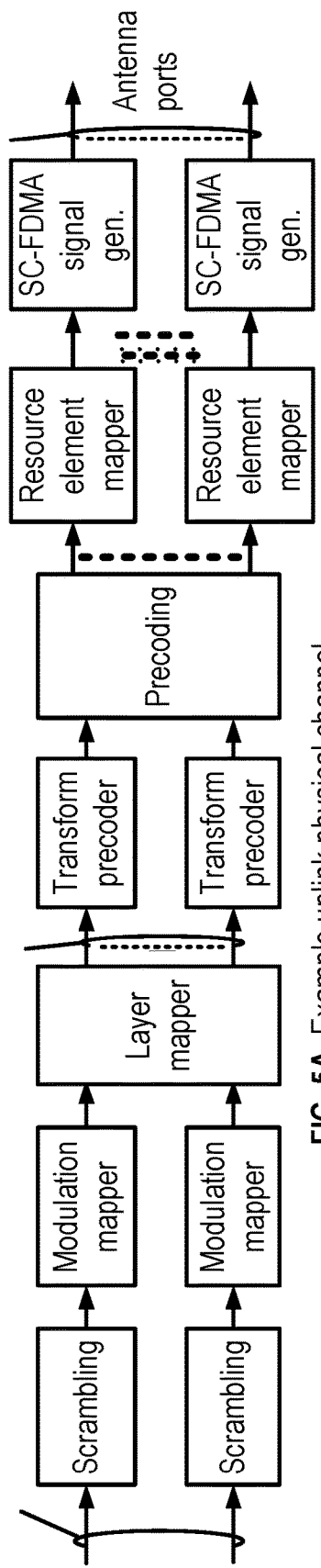
FIG. 5A Example uplink physical channel
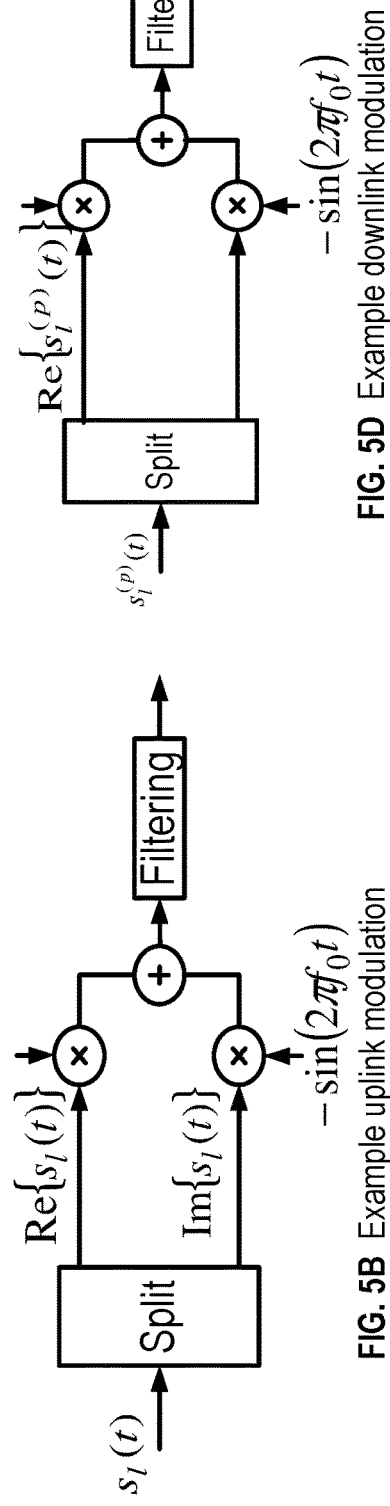
FIG. 5B Example uplink modulation
FIG. 5D Example downlink modulation
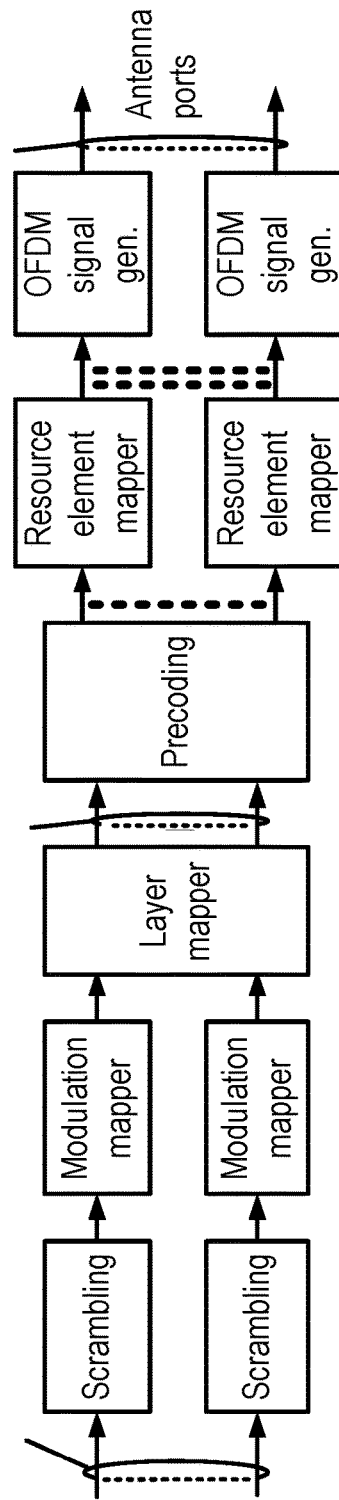
FIG. 5C Example downlink physical channel Dual-Connectivity at eNB FIG. 7 Dual-Connectivity- two MAC entities at UE side

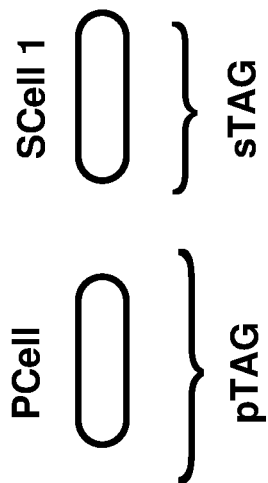
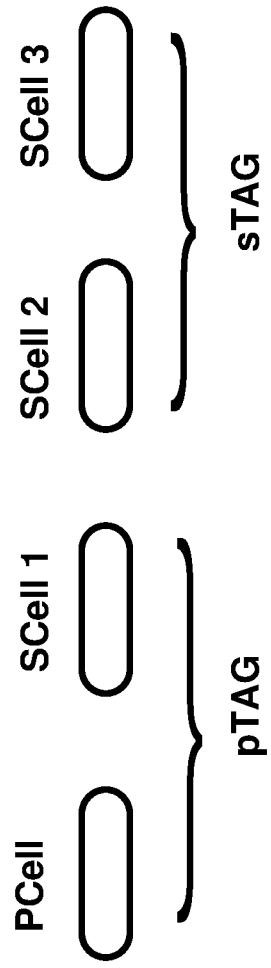
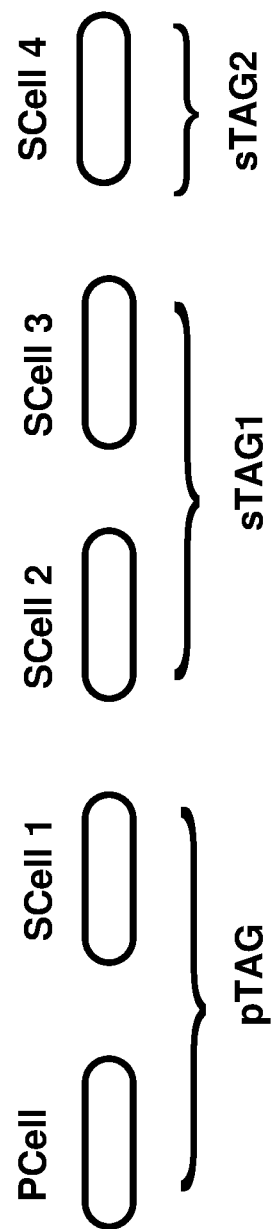
FIG. 8

Table A: Mapping of TPC Command Field in DCI format 1A/1B/1D/1/2A/2B/2C/2D/2/3 to $\delta_{PUCCH}$ values

| TPC Command Field in DCI format 1A/1B/1D/1/2A/2B/2C/2D/2/3 | $\delta_{PUCCH}$ [dB] |
|---|---|
| 0 | -1 |
| 1 | 0 |
| 2 | 1 |
| 3 | 3 |

Table B: Mapping of TPC Command Field in DCI format 3A to $\delta_{PUCCH}$ values

| TPC Command Field in DCI format 3A | $\delta_{PUCCH}$ [dB] |
|---|---|
| 0 | -1 |
| 1 | 1 |

FIG. 21 ved uplink power in a
wireless network

CROSS-REFERENCE TO RELATED
APPLICATIONS

This application is a continuation of Ser. No. 15/186,495, filed on Jun. 19, 2016, which claims the benefit of U.S. Provisional Application No. 62/182,460, filed Jun. 20, 2015, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 21 are example mappings of TPC command field according as per an aspect of an embodiment of the present invention.

DETAILED DESCRIPTION OF EMBODIMENTS

Figure 1:
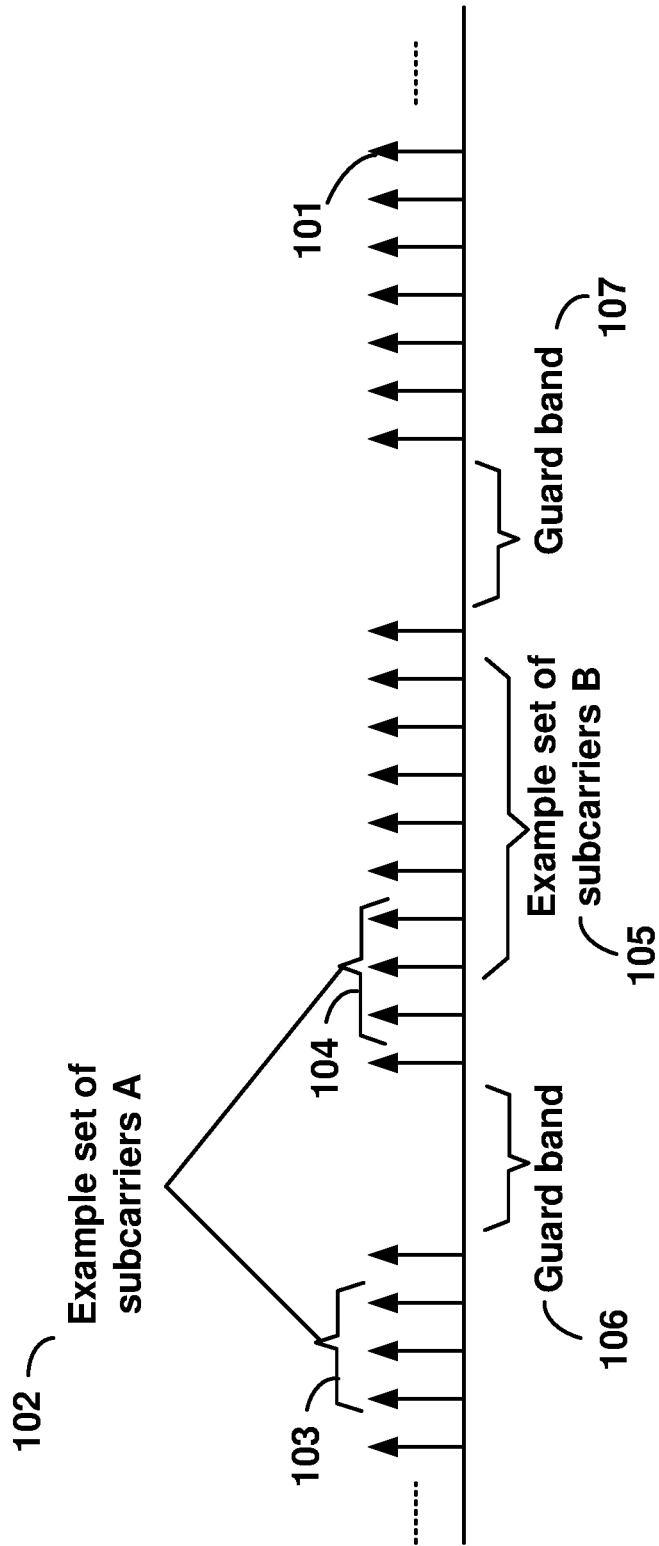
FIG. 1 is a diagram depicting example sets of OFDM subcarriers as per an aspect of an embodiment of the present invention.

Example embodiments of the present invention enable operation of multiple physical uplink control channel (PUCCH) groups. Embodiments of the technology disclosed herein may be employed in the technical field of multicarrier communication systems. More particularly, the embodiments of the technology disclosed herein may relate to operation of PUCCH groups.

The following Acronyms are used throughout the present disclosure:
  ASIC application-specific integrated circuit
  BPSK binary phase shift keying
  CA carrier aggregation
  CSI channel state information
  CDMA code division multiple access
  CSS common search space
  CPLD complex programmable logic devices
  CC component carrier
  DL downlink
  DCI downlink control information
  DC dual connectivity
  EPC evolved packet core
  E-UTRAN evolved-universal terrestrial radio access network
  FPGA field programmable gate arrays
  FDD frequency division multiplexing
  HDL hardware description languages
  HARQ hybrid automatic repeat request
  IE information element
  LTE long term evolution
  MCG master cell group
  MeNB master evolved node B
  MIB master information block
  MAC media access control
  MAC media access control
  MME mobility management entity
  NAS non-access stratum OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
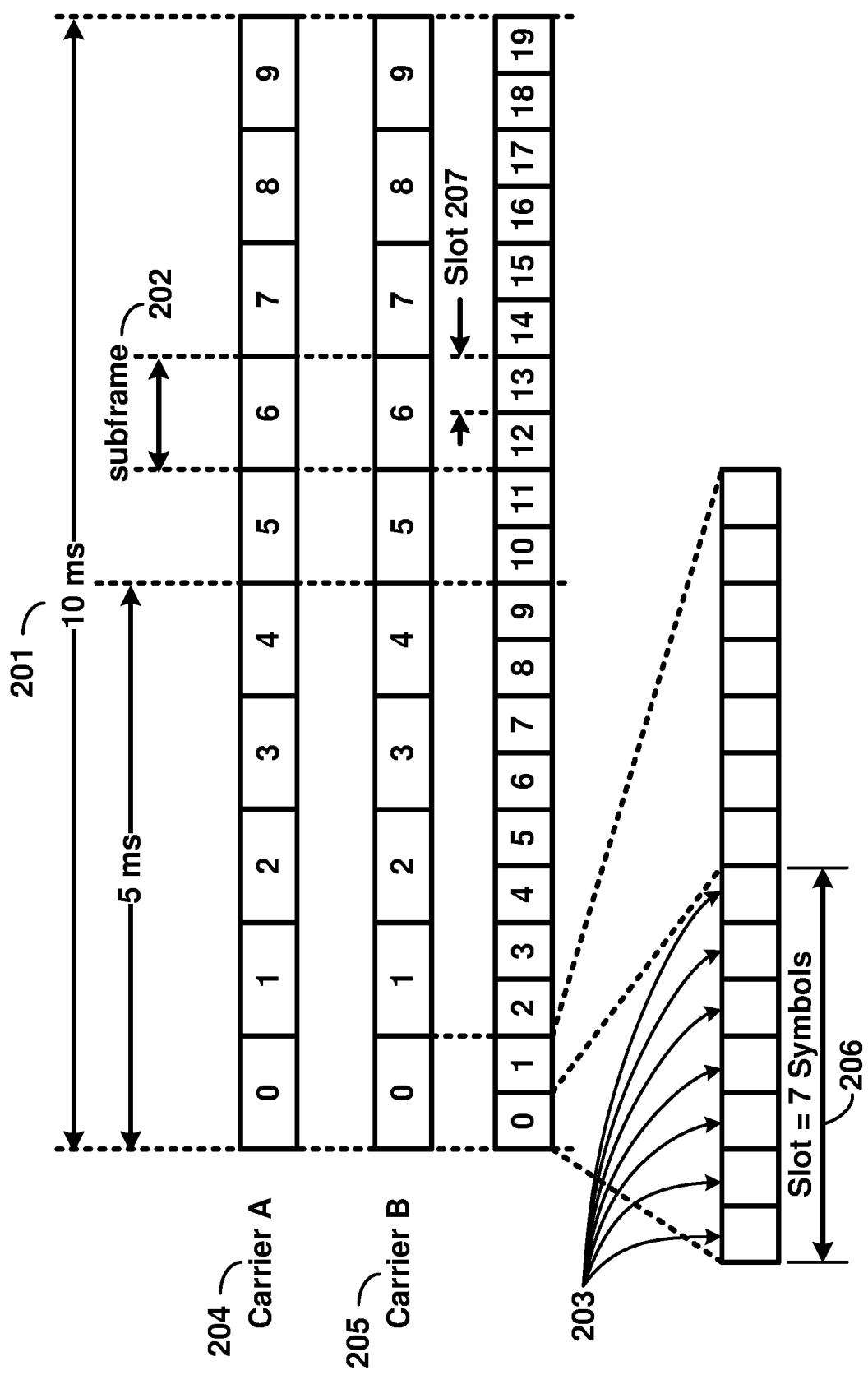
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
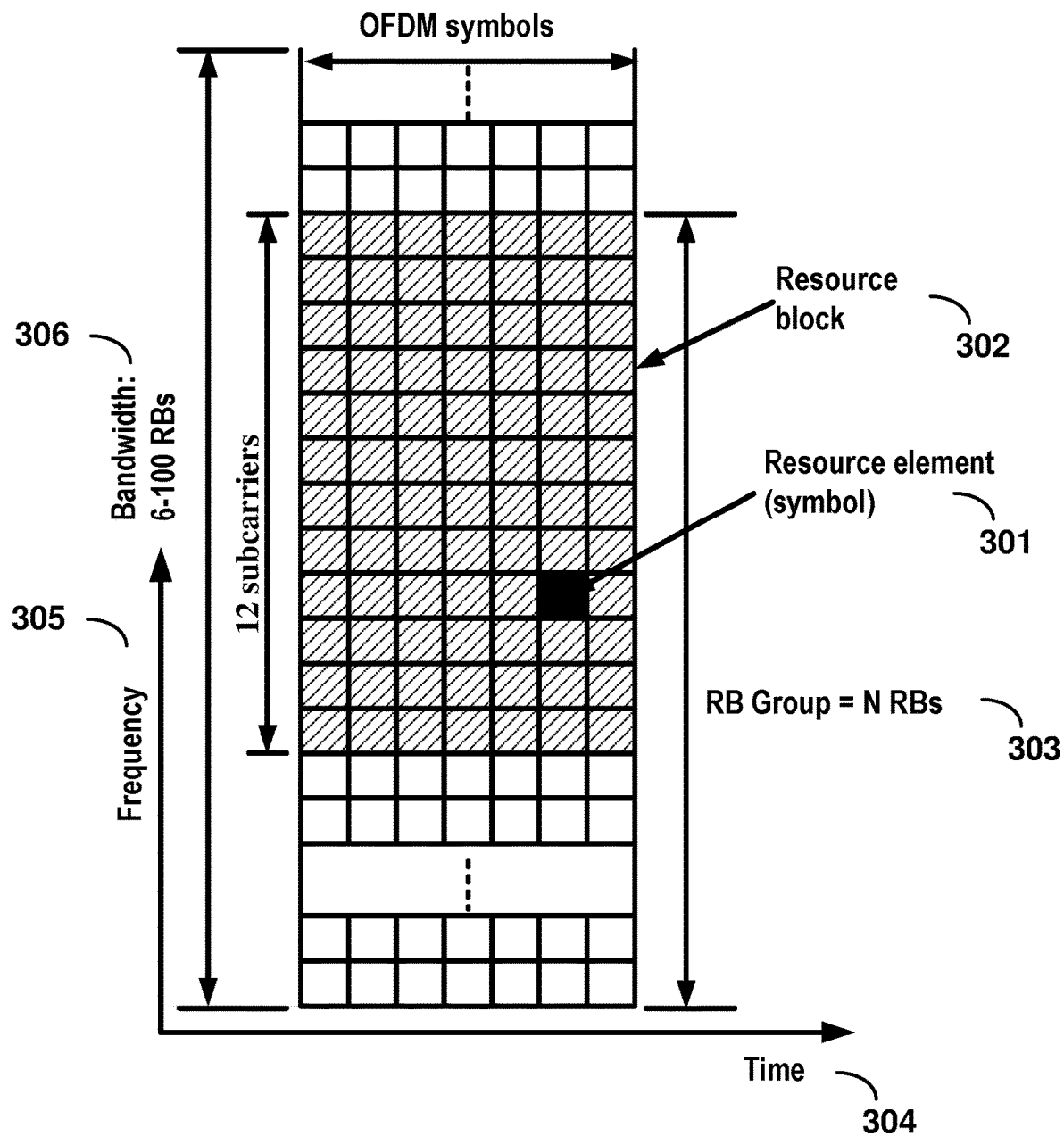
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain SC-FDMA signal for each antenna port, and/or the like.

Example modulation and up-conversion to the carrier frequency of the complex-valued SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
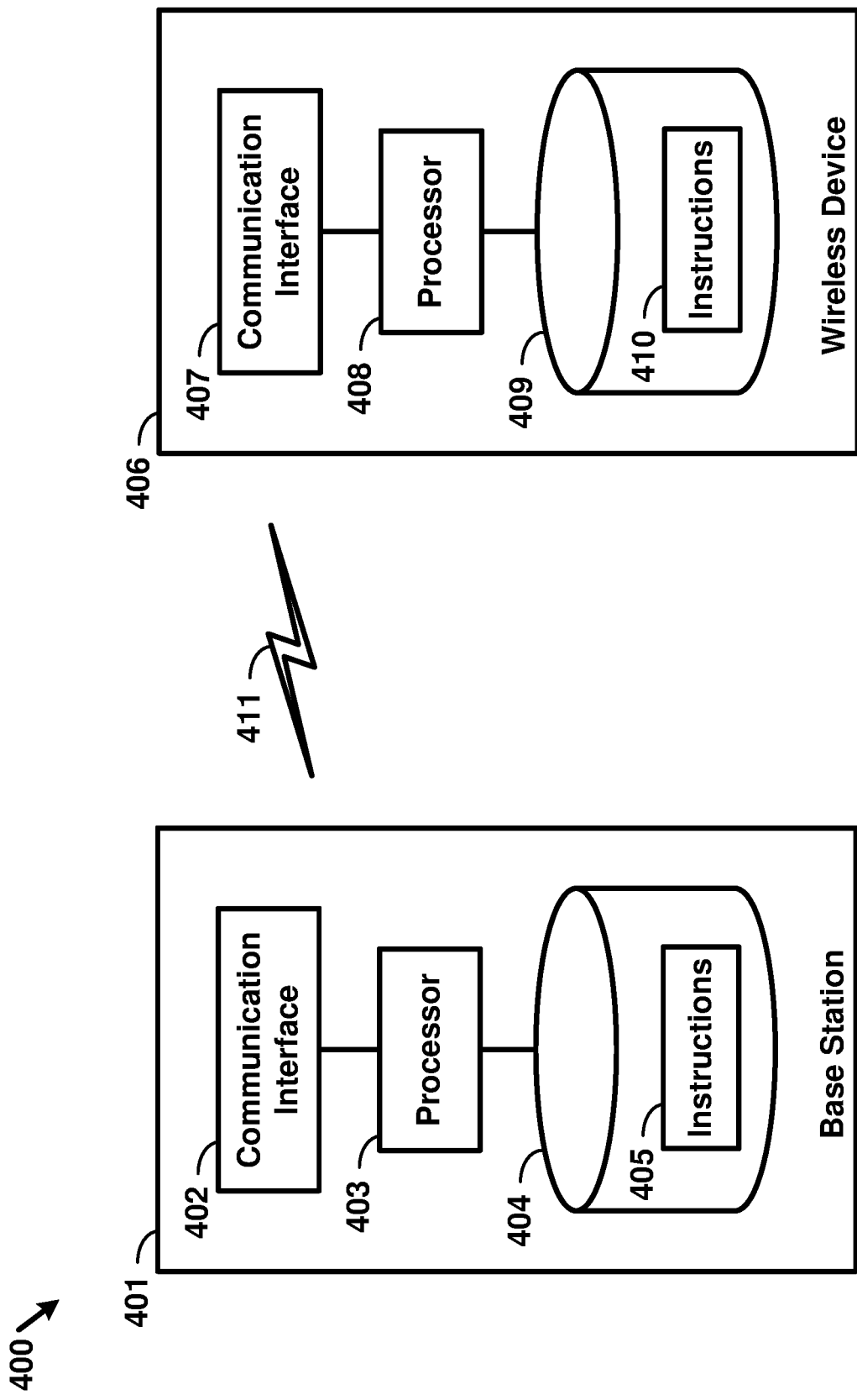
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
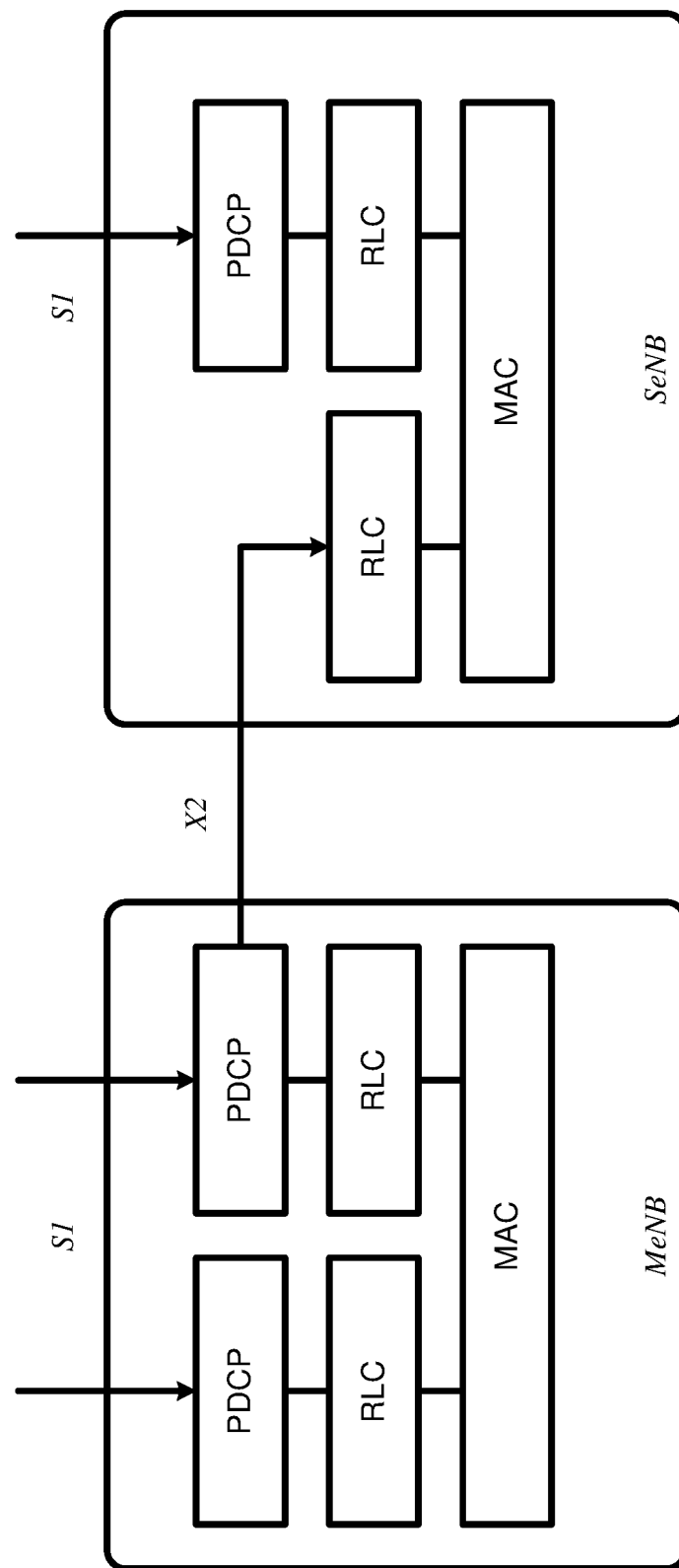
FIG. 6 is an example diagram for a protocol structure with CA and DC as per an aspect of an embodiment of the present invention.
Figure 7:
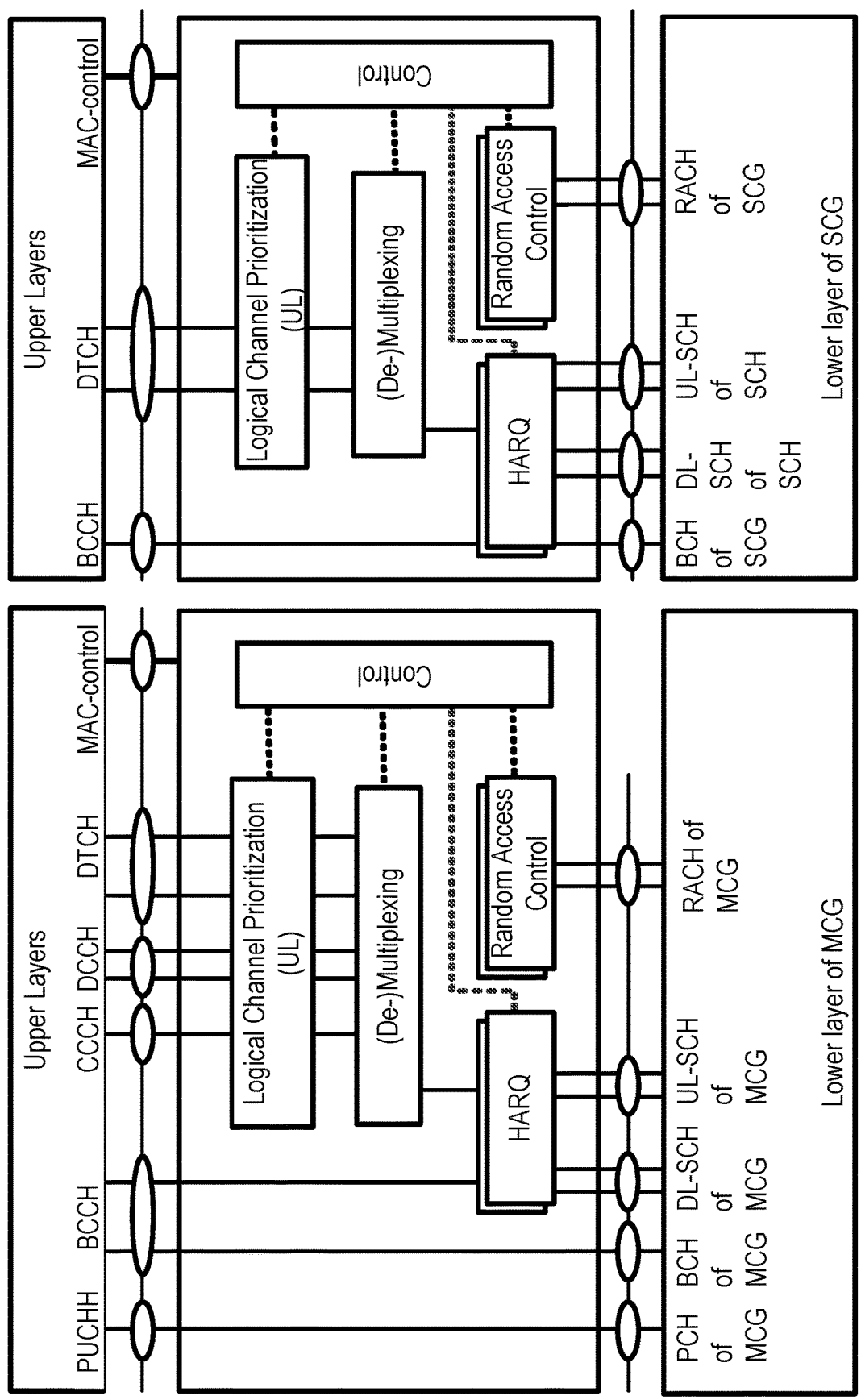
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g., based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

According to some of the various aspects of embodiments, serving cells having an uplink to which the same time alignment (TA) applies may be grouped in a TA group (TAG). Serving cells in one TAG may use the same timing reference. For a given TAG, user equipment (UE) may use one downlink carrier as a timing reference at a given time. The UE may use a downlink carrier in a TAG as a timing reference for that TAG. For a given TAG, a UE may synchronize uplink subframe and frame transmission timing of uplink carriers belonging to the same TAG. According to some of the various aspects of embodiments, serving cells having an uplink to which the same TA applies may correspond to serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and a timing reference for a pTAG may follow LTE release 10 principles in the MCG and/or SCG. The UE may need to measure downlink pathloss to calculate uplink transmit power. A pathloss reference may be used for uplink power control and/or transmission of random access preamble(s). UE may measure downlink pathloss using signals received on a pathloss reference cell. For SCell(s) in a pTAG, the choice of a pathloss reference for cells may be selected from and/or be limited to the following two options: a) the downlink SCell linked to an uplink SCell using system information block 2 (SIB2), and b) the downlink pCell. The pathloss reference for SCells in a pTAG may be configurable using RRC message(s) as a part of an SCell initial configuration and/or reconfiguration. According to some of the various aspects of embodiments, a PhysicalConfigDedicatedSCell information element (IE) of an SCell configuration may include a pathloss reference SCell (downlink carrier) for an SCell in a pTAG. The downlink SCell linked to an uplink SCell using system information block 2 (SIB2) may be referred to as the SIB2 linked downlink of the SCell. Different TAGs may operate in different bands. For an uplink carrier in an sTAG, the pathloss reference may be only configurable to the downlink SCell linked to an uplink SCell using the system information block 2 (SIB2) of the SCell.

To obtain initial uplink (UL) time alignment for an sTAG, an eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one time alignment timer (TAT) per TA group. A TAT for TAGs may be configured with different values. In a MAC entity, when a TAT associated with a pTAG expires: all TATs may be considered as expired, the UE may flush HARQ buffers of serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with an sTAG expires: a) SRS transmissions may be stopped on the corresponding SCells, b) SRS RRC configuration may be released, c) CSI reporting configuration for corresponding SCells may be maintained, and/or d) the MAC in the UE may flush the uplink HARQ buffers of the corresponding SCells.

An eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
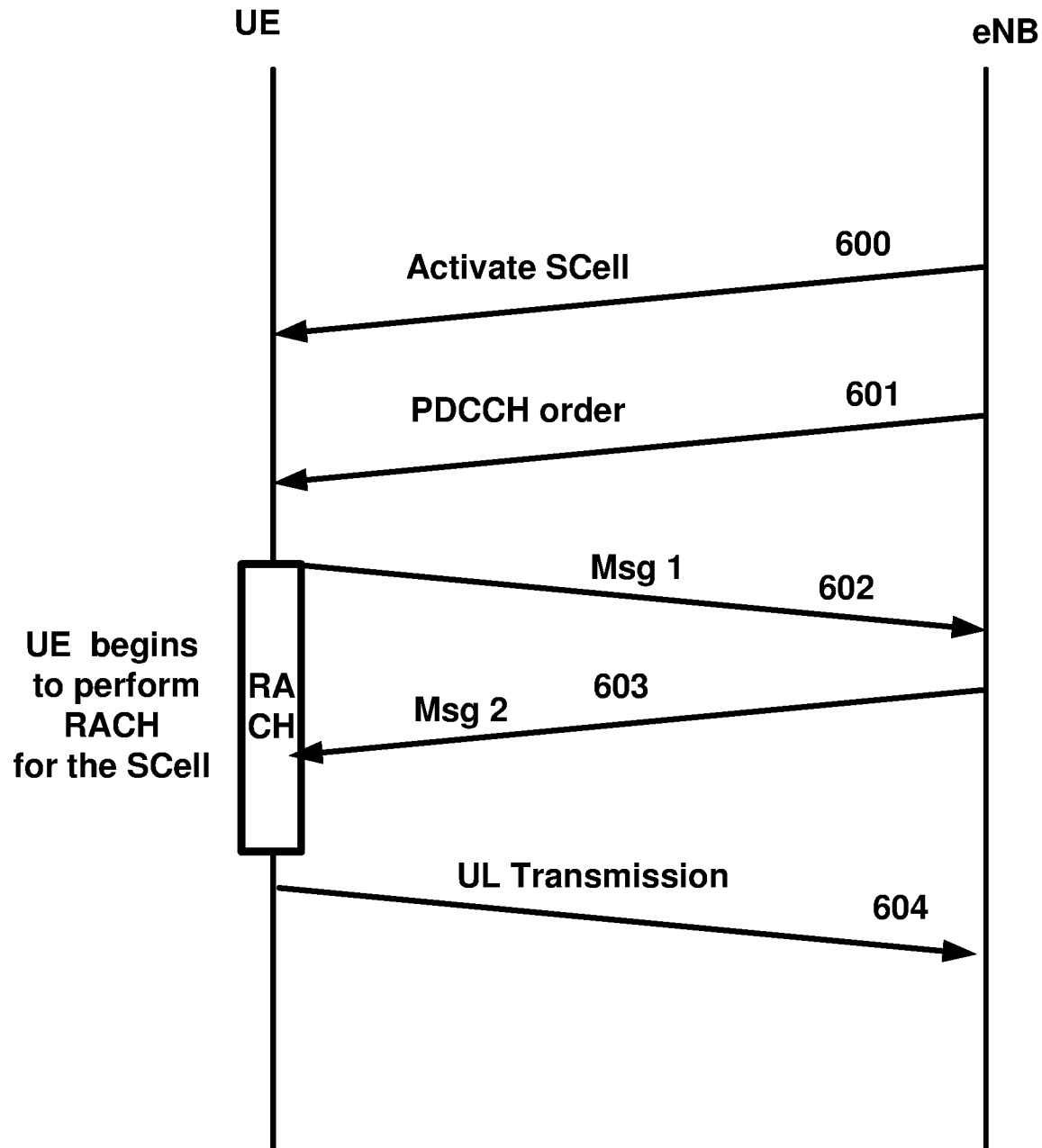
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may always be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

Figure 10:
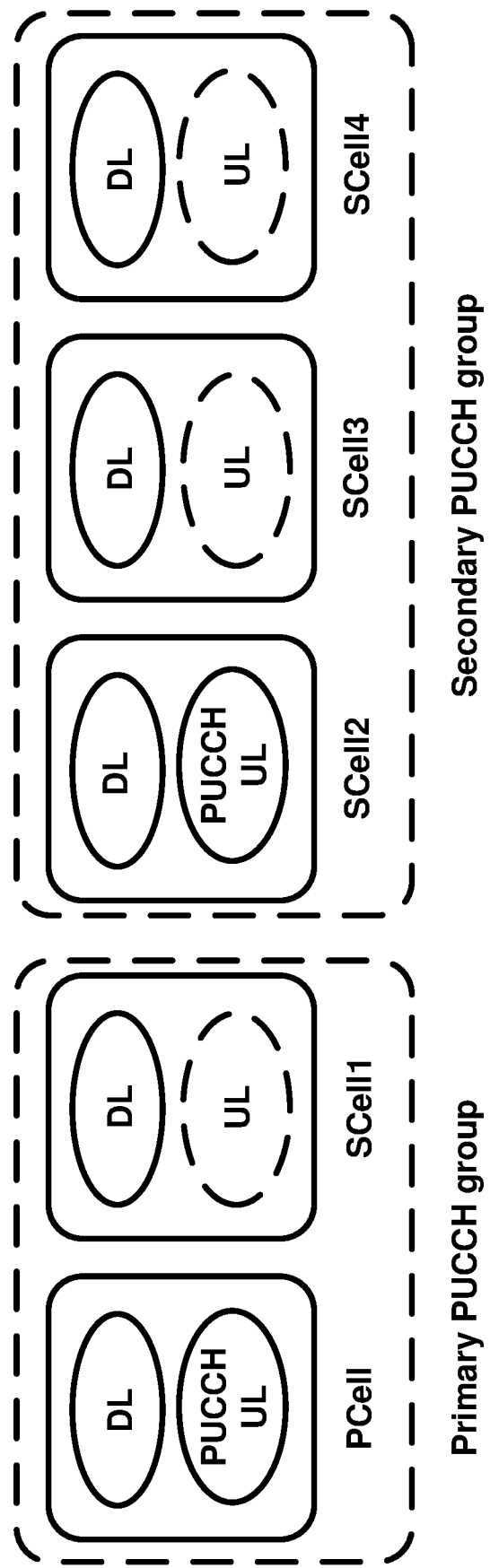
FIG. 10 is an example grouping of cells into PUCCH groups as per an aspect of an embodiment of the present invention.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. FIG. 10 is an example grouping of cells into PUCCH groups as per an aspect of an embodiment of the present invention. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In Release-12, a PUCCH can be configured on a PCell and/or a PSCell, but cannot be configured on other SCells. In an example embodiment, a UE may transmit a message indicating that the UE supports PUCCH configuration on a PCell and SCell. Such an indication may be separate from an indication of of dual connectivity support by the UE. In an example embodiment, a UE may support both DC and PUCCH groups. In an example embodiment, either DC or PUCCH groups may be configured, but not both. In another example embodiment, more complicated configurations comprising both DC and PUCCH groups may be supported.

When a UE is capable of configuring PUCCH groups, and if a UE indicates that it supports simultaneous PUCCH/PUSCH transmission capability, it may imply that the UE supports simultaneous PUCCH/PUSCH transmission on both PCell and SCell. When multiple PUCCH groups are configured, a PUCCH may be configured or not configured with simultaneous PUCCH/PUSCH transmission.

In an example embodiment, PUCCH transmission to a base station on two serving cells may be realized as shown in FIG. 10. A first group of cells may employ a PUCCH on the PCell and may be called PUCCH group 1 or a primary PUCCH group. A second group of cells may employ a PUCCH on an SCell and may be called PUCCH group 2 or a secondary PUCCH group. One, two or more PUCCH groups may be configured. In an example, cells may be grouped into two PUCCH groups, and each PUCCH group may include a cell with PUCCH resources. A PCell may provide PUCCH resources for the primary PUCCH group and an SCell in the secondary PUCCH group may provide PUCCH resources for the cells in the secondary PUCCH group. In an example embodiment, no cross-carrier scheduling between cells in different PUCCH groups may be configured. When cross-carrier scheduling between cells in different PUCCH groups is not configured, ACK/NACK on PHICH channel may be limited within a PUCCH group. Both downlink and uplink scheduling activity may be separate between cells belonging to different PUCCH groups.

A PUCCH on an SCell may carry HARQ-ACK and CSI information. A PCell may be configured with PUCCH resources. In an example embodiment, RRC parameters for an SCell PUCCH Power Control for a PUCCH on an SCell may be different from those of a PCell PUCCH. A Transmit Power Control command for a PUCCH on an SCell may be transmitted in DCI(s) on the SCell carrying the PUCCH.

UE procedures on a PUCCH transmission may be different and/or independent between PUCCH groups. For example, determination of DL HARQ-ACK timing, PUCCH resource determination for HARQ-ACK and/or CSI, Higher-layer configuration of simultaneous HARQ-ACK+CSI on a PUCCH, Higher-layer configuration of simultaneous HARQ-ACK+SRS in one subframe may be configured differently for a PUCCH PCell and a PUCCH SCell.

A PUCCH group may be a group of serving cells configured by a RRC and use the same serving cell in the group for transmission of a PUCCH. A Primary PUCCH group may be a PUCCH group containing a PCell. A secondary PUCCH group may be a PUCCH cell group not containing the PCell. In an example embodiment, an SCell may belong to one PUCCH group. When one SCell belongs to a PUCCH group, ACK/NACK or CSI for that SCell may be transmitted over the PUCCH in that PUCCH group (over PUCCH SCell or PUCCH PCell). A PUCCH on an SCell may reduce the PUCCH load on the PCell. A PUCCH SCell may be employed for UCI transmission of SCells in the corresponding PUCCH group.

In an example embodiment, a flexible PUCCH configuration in which control signalling is sent on one, two or more PUCCHs may be possible. Beside the PCell, it may be possible to configure a selected number of SCells for PUCCH transmission (herein called PUCCH SCells). Control signalling information conveyed in a certain PUCCH SCell may be related to a set of SCells in a corresponding PUCCH group that are configured by the network via RRC signalling.

PUCCH control signalling carried by a PUCCH channel may be distributed between a PCell and SCells for offloading or robustness purposes. By enabling a PUCCH in an SCell, it may be possible to distribute the overall CSI reports for a given UE between a PCell and a selected number of SCells (e.g. PUCCH SCells), thereby limiting PUCCH CSI resource consumption by a given UE on a certain cell. It may be possible to map CSI reports for a certain SCell to a selected PUCCH SCell. An SCell may be assigned a certain periodicity and time-offset for transmission of control information. Periodic CSI for a serving cell may be mapped on a PUCCH (on the PCell or on a PUCCH-SCell) via RRC signalling. The possibility of distributing CSI reports, HARQ feedbacks, and/or Scheduling Requests across PUCCH SCells may provide flexibility and capacity improvements. HARQ feedback for a serving cell may be mapped on a PUCCH (on the PCell or on a PUCCH SCell) via RRC signalling.

In example embodiments, PUCCH transmission may be configured on a PCell, as well as one SCell in CA. An SCell PUCCH may be realized using the concept of PUCCH groups, where aggregated cells are grouped into two or more PUCCH groups. One cell from a PUCCH group may be configured to carry a PUCCH. More than 5 carriers may be configured. In the example embodiments, up to n carriers may be aggregated. For example, n may be 16, 32, or 64. Some CCs may have non-backward compatible configurations supporting only advanced UEs (e.g. support licensed assisted access SCells). In an example embodiment, one SCell PUCCH (e.g. two PUCCH groups) may be supported. In another example embodiment, a PUCCH group concept with multiple (more than one) SCells carrying PUCCH may be employed (e.g., there can be more than two PUCCH groups).

In an example embodiment, a given PUCCH group may not comprise serving cells of both MCG and SCG. One of the PUCCHs may be configured on the PCell. In an example embodiment, PUCCH mapping of serving cells may be configured by RRC messages. In an example embodiment, a maximum value of an SCellIndex and a ServCellIndex may be 31 (ranging from 0 to 31). In an example, a maximum value of stag-Id may be 3. The CIF for a scheduled cell may be configured explicitly. A PUCCH SCell may be configured by giving a PUCCH configuration for an SCell. A HARQ feedback and CSI report of a PUCCH SCell may be sent on the PUCCH of that PUCCH SCell. The HARQ feedback and CSI report of a SCell may sent on a PUCCH of a PCell if no PUCCH SCell is signalled for that SCell. The HARQ feedback and CSI report of an SCell may be sent on the PUCCH of one PUCCH SCell; hence they may not be sent on the PUCCH of different PUCCH SCell. The UE may report a Type 2 PH for serving cells configured with a PUCCH. In an example embodiment, a MAC activation/deactivation may be supported for a PUCCH SCell. An eNB may manage the activation/deactivation status for SCells. A newly added PUCCH SCell may be initially deactivated.

Figure 11:
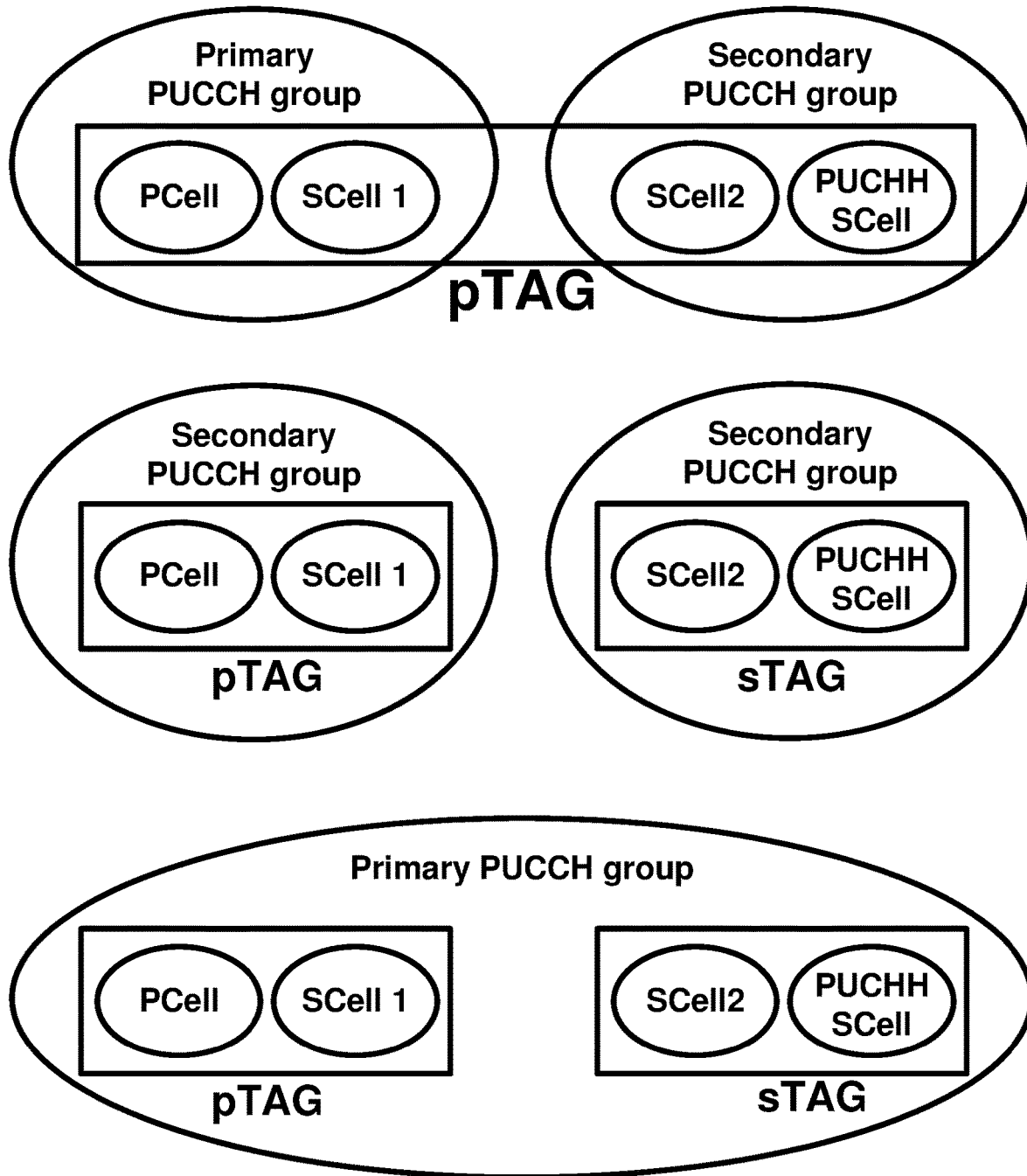
FIG. 11 illustrates example groupings of cells into one or more PUCCH groups and one or more TAGs as per an aspect of an embodiment of the present invention.
Figure 12:
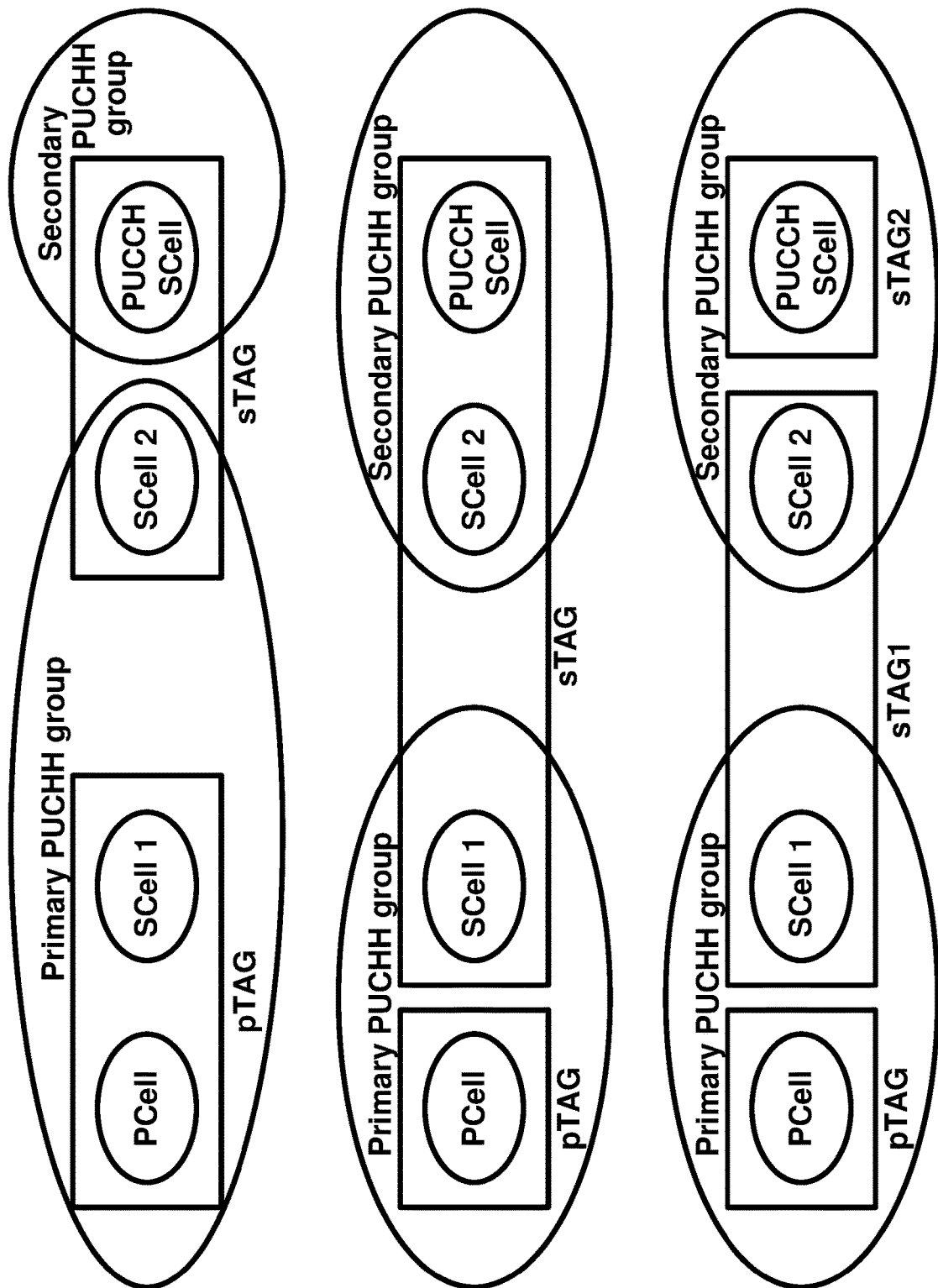
FIG. 12 illustrates example groupings of cells into one or more PUCCH groups and one or more TAGs as per an aspect of an embodiment of the present invention.

In an example embodiment, independent configuration of PUCCH groups and TAGs may be supported. FIG. 11 and FIG. 12 show example configurations of TAGs and PUCCH groups. For example, one TAG may contain multiple serving cells with a PUCCH. For example, each TAG may only comprise cells of one PUCCH group. For example, a TAG may comprise the serving cells (without a PUCCH) which belong to different PUCCH groups.

There may not be a one-to-one mapping between TAGs and PUCCH groups. For example, in a configuration, a PUCCH SCell may belong to primary TAG. In an example implementation, the serving cells of one PUCCH group may be in different TAGs and serving cells of one TAG may be in different PUCCH groups. Configuration of PUCCH groups and TAGs may be left to eNB implementation. In another example implementation, restriction(s) on the configuration of a PUCCH cell may be specified. For example, in an example embodiment, cells in a given PUCCH group may belong to the same TAG. In an example, an sTAG may only comprise cells of one PUCCH group. In an example, one-to-one mapping between TAGs and PUCCH groups may be implemented. In implementation, cell configurations may be limited to some of the examples. In other implementations, some or all the below configurations may be allowed.

In an example embodiment, for an SCell in a pTAG, the timing reference may be a PCell. For an SCell in an sTAG, the timing reference may be any activated SCell in the sTAG. For an SCell (configured with PUCCH or not) in a pTAG, a pathloss reference may be configured to be a PCell or an SIB-2 linked SCell. For an SCell in a sTAG, the pathloss reference may be the SIB-2 linked SCell. When a TAT associated with a pTAG is expired, the TAT associated with sTAGs may be considered as expired. When a TAT of an sTAG containing PUCCH SCell expires, the MAC may indicate to an RRC to release PUCCH resource for the PUCCH group. When the TAT of an sTAG containing a PUCCH SCell is not running, the uplink transmission (PUSCH) for SCells in the secondary PUCCH group not belonging to the sTAG including the PUCCH SCell may not be impacted. The TAT expiry of an sTAG containing a PUCCH SCell may not trigger TAT expiry of other TAGs to which other SCells in the same PUCCH group belong. When the TAT associated with sTAG not containing a PUCCH SCell is not running, the wireless device may stop the uplink transmission for the SCell in the sTAG and may not impact other TAGs.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

Example embodiments of the invention may enable operation of multiple PUCCH groups. Other example embodiments may comprise a non-transitory tangible computer readable media comprising instructions executable by one or more processors to cause operation of PUCCH groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of PUCCH groups. The device may include processors, memory, interfaces, and/or the like. Other example embodiments may comprise communication networks comprising devices such as base stations, wireless devices (or user equipment: UE), servers, switches, antennas, and/or the like. In an example embodiment one or more TAGs may be configured along with PUCCH group configuration.

Figure 13:
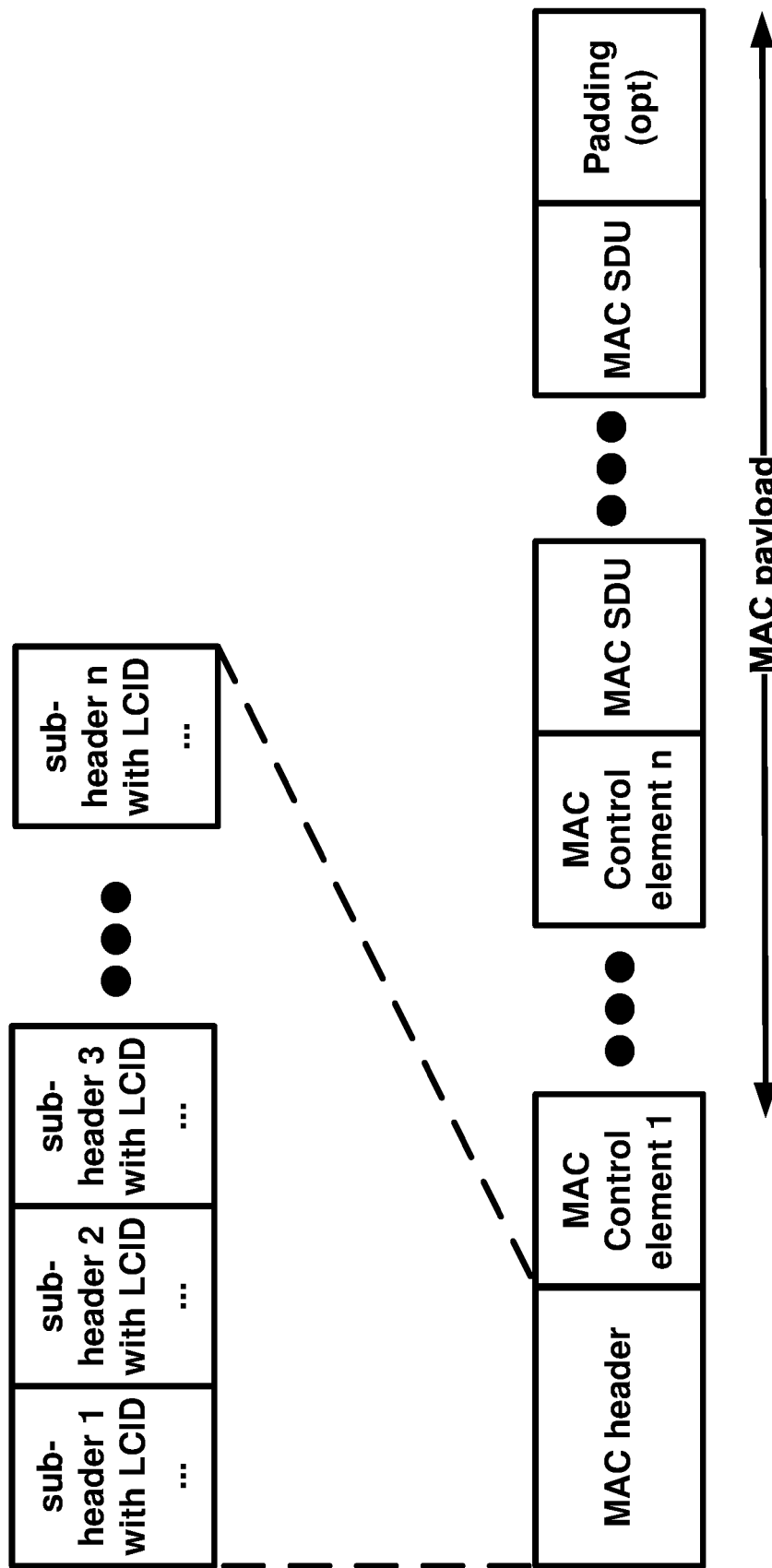
FIG. 13 is an example MAC PDU as per an aspect of an embodiment of the present invention.
Figure 14:
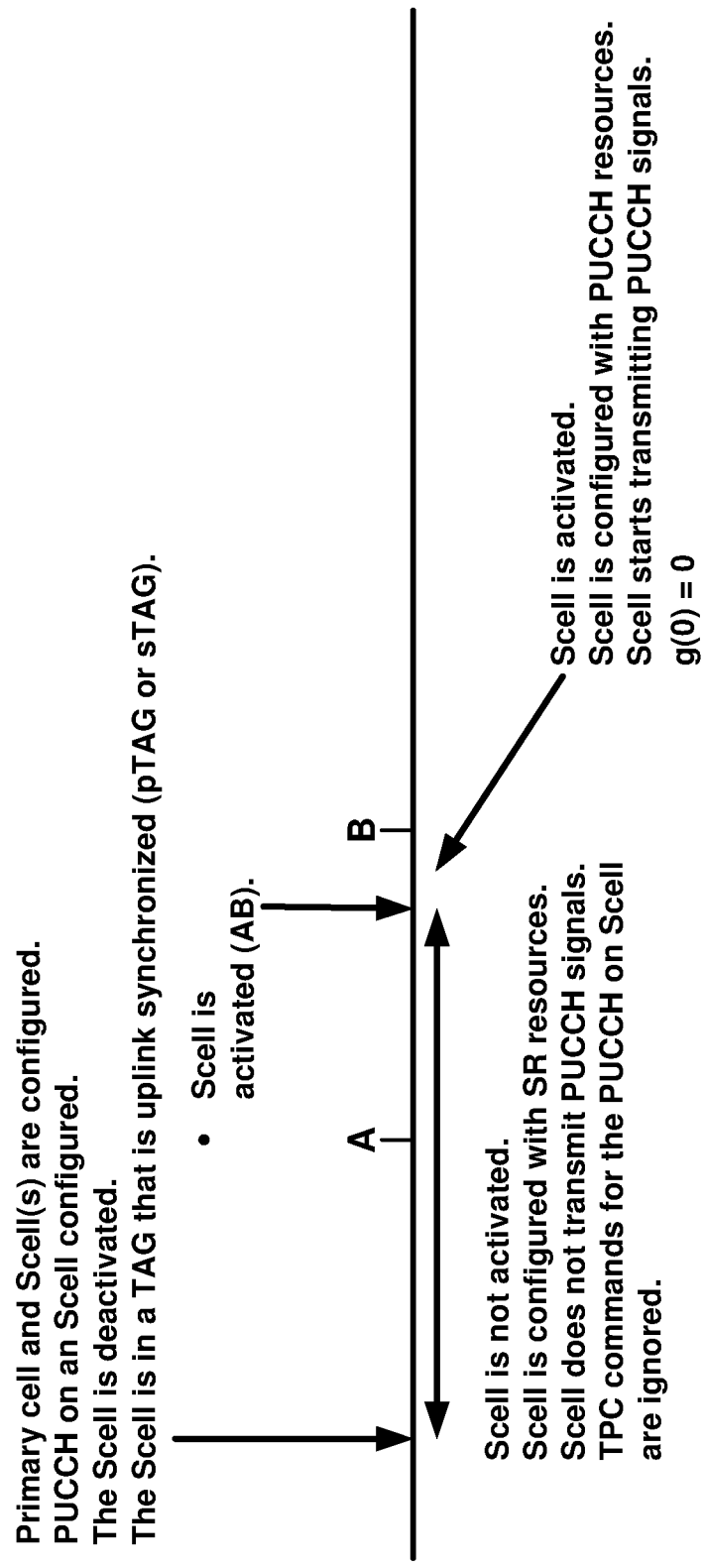
FIG. 14 is an example diagram illustrating timing of different events according as per an aspect of an embodiment of the present invention.
Figure 15:
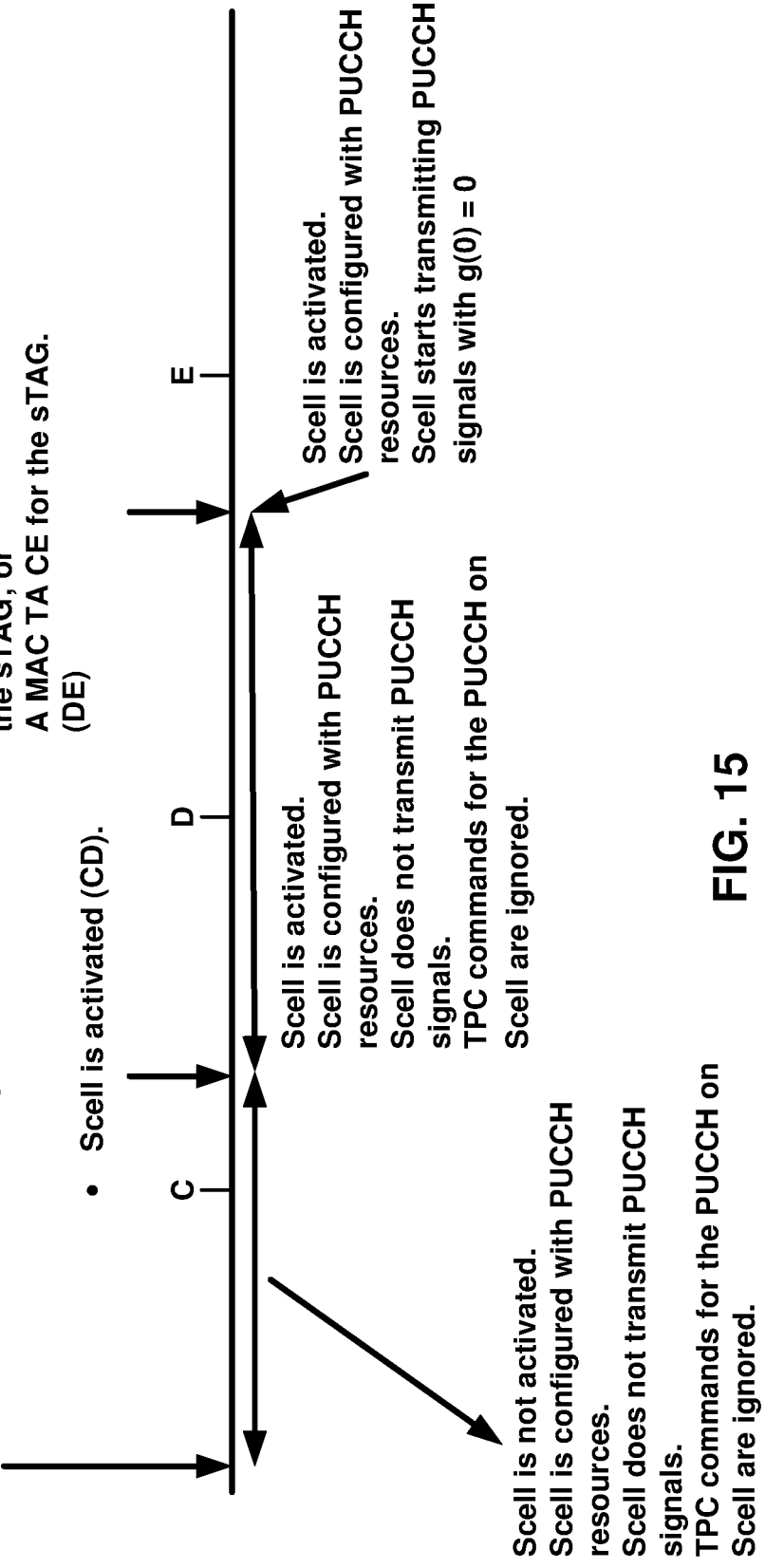
FIG. 15 is an example diagram illustrating timing of different events according as per an aspect of an embodiment of the present invention.
Figure 16:
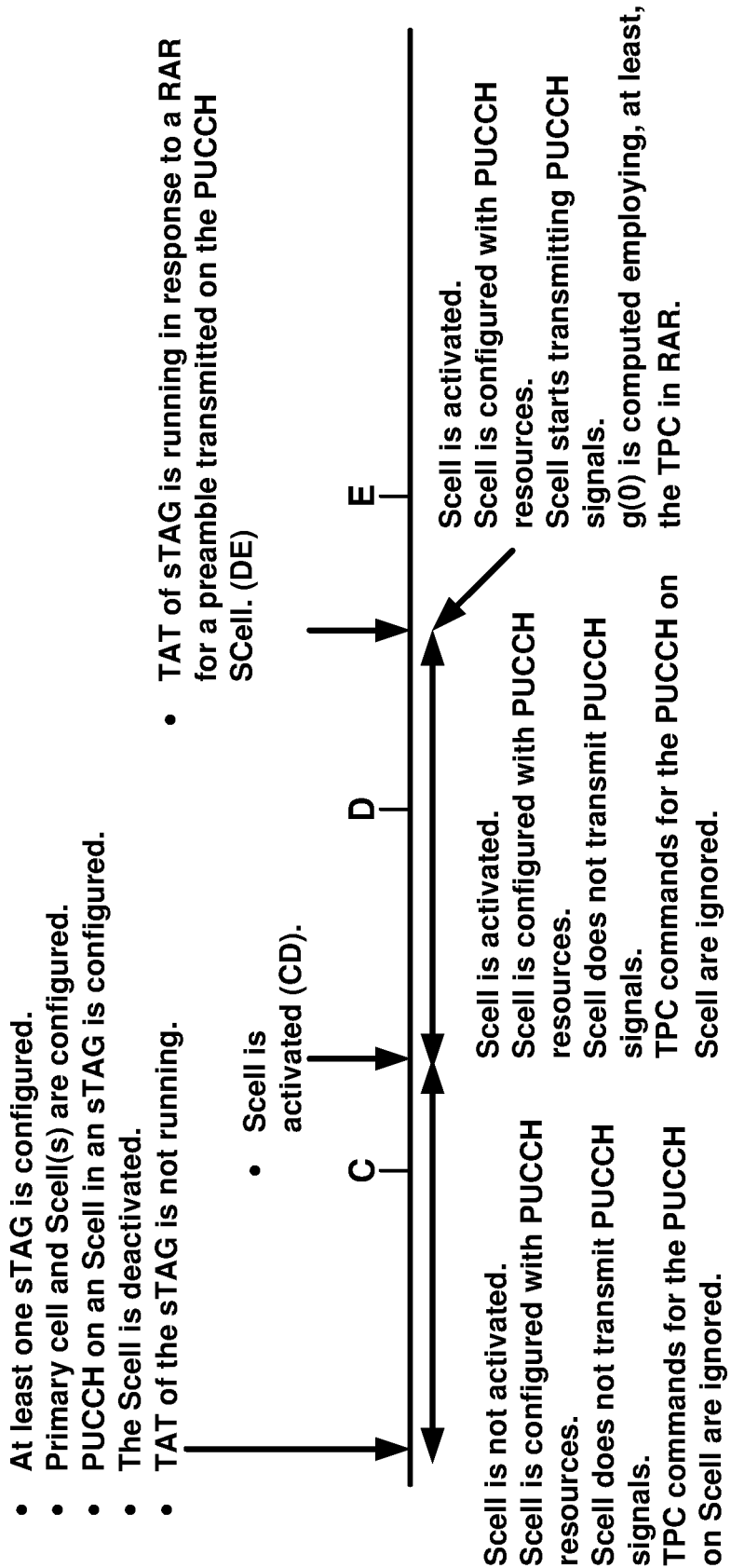
FIG. 16 is an example diagram illustrating timing of different events according as per an aspect of an embodiment of the present invention.
Figure 17:
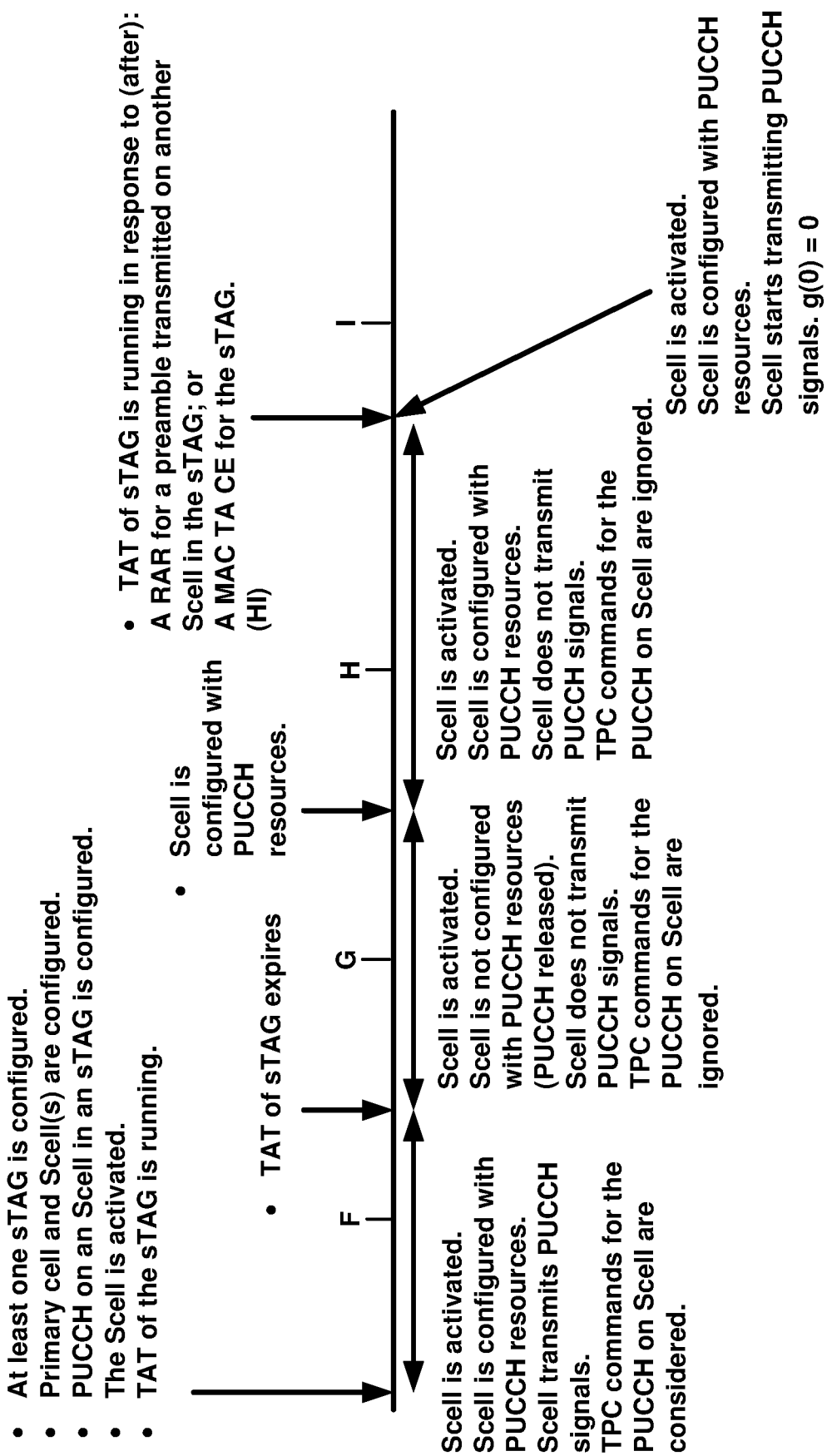
FIG. 17 is an example diagram illustrating timing of different events according as per an aspect of an embodiment of the present invention.

FIG. 13 is an example MAC PDU as per an aspect of an embodiment of the present invention. In an example embodiment, a MAC PDU may comprise of a MAC header, zero or more MAC Service Data Units (MAC SDU), zero or more MAC control elements, and optionally padding. The MAC header and the MAC SDUs may be of variable sizes. A MAC PDU header may comprise one or more MAC PDU subheaders. A subheader may correspond to either a MAC SDU, a MAC control element or padding. A MAC PDU subheader may comprise header fields R, F2, E, LCID, F, and/or L. The last subheader in the MAC PDU and subheaders for fixed sized MAC control elements may comprise the four header fields R, F2, E, and/or LCID. A MAC PDU subheader corresponding to padding may comprise the four header fields R, F2, E, and/or LCID.

In an example embodiment, LCID or Logical Channel ID field may identify the logical channel instance of the corresponding MAC SDU or the type of the corresponding MAC control element or padding. There may be one LCID field for a MAC SDU, MAC control element or padding included in the MAC PDU. In addition to that, one or two additional LCID fields may be included in the MAC PDU when single-byte or two-byte padding is required but cannot be achieved by padding at the end of the MAC PDU. The LCID field size may be, e.g. 5 bits. L or the Length field may indicate the length of the corresponding MAC SDU or variable-sized MAC control element in bytes. There may be one L field per MAC PDU subheader except for the last subheader and subheaders corresponding to fixed-sized MAC control elements. The size of the L field may be indicated by the F field and F2 field. The F or the Format field may indicate the size of the Length field. There may be one F field per MAC PDU subheader except for the last subheader and subheaders corresponding to fixed-sized MAC control elements and expect for when F2 is set to 1. The size of the F field may be 1 bit. In an example, if the F field is included, and/or if the size of the MAC SDU or variable-sized MAC control element is less than 128 bytes, the value of the F field is set to 0, otherwise it is set to 1. The F2 or the Format2 field may indicate the size of the Length field. There may be one F2 field per MAC PDU subheader. The size of the F2 field may be 1 bit. In an example, if the size of the MAC SDU or variable-sized MAC control element is larger than 32767 bytes and if the corresponding subheader is not the last subheader, the value of the F2 field may be set to 1, otherwise it is set to 0. The E or the Extension field may be a flag indicating if more fields are present in the MAC header or not. The E field may be set to "1" to indicate another set of at least R/F2/E/LCID fields. The E field may be set to "0" to indicate that either a MAC SDU, a MAC control element or padding starts at the next byte. R or reserved bit, set to "0".

MAC PDU subheaders may have the same order as the corresponding MAC SDUs, MAC control elements and padding. MAC control elements may be placed before any MAC SDU. Padding may occur at the end of the MAC PDU, except when single-byte or two-byte padding is required. Padding may have any value and the MAC entity may ignore it. When padding is performed at the end of the MAC PDU, zero or more padding bytes may be allowed. When single-byte or two-byte padding is required, one or two MAC PDU subheaders corresponding to padding may be placed at the beginning of the MAC PDU before any other MAC PDU subheader. In an example, a maximum of one MAC PDU may be transmitted per TB per MAC entity, a maximum of one MCH MAC PDU can be transmitted per TTI.

At least one RRC message may provide configuration parameters for at least one cell and configuration parameters for PUCCH groups. The information elements in one or more RRC messages may provide mapping between configured cells and PUCCH SCells. Cells may be grouped into a plurality of cell groups and a cell may be assigned to one of the configured PUCCH groups. There may be a one-to-one relationship between PUCCH groups and cells with configured PUCCH resources. At least one RRC message may provide mapping between an SCell and a PUCCH group, and PUCCH configuration on PUCCH SCell.

System information (common parameters) for an SCell may be carried in a RadioResourceConfigCommonSCell in a dedicated RRC message. Some of the PUCCH related information may be included in common information of an SCell (e.g. in the RadioResourceConfigCommonSCell). Dedicated configuration parameters of SCell and PUCCH resources may be configured by dedicated RRC signaling using, for example, RadioResourceConfigDedicatedSCell.

The IE PUCCH-ConfigCommon and IE PUCCH-ConfigDedicated may be used to specify the common and the UE specific PUCCH configuration respectively.

In an example, PUCCH-ConfigCommon may include: deltaPUCCH-Shift: ENUMERATED {ds1, ds2, ds3}; nRB-CQI: INTEGER (0 ... 98); nCS-AN: INTEGER (0 ... 7); and/or n1PUCCH-AN: INTEGER (0 ... 2047). The parameter deltaPUCCH-Shift ($\Delta_{shift}^{PUCCH}$), nRB-CQI ($N_{RB}^{(2)}$), nCS-An ($N_{cs}^{(1)}$), and n1PUCCH-AN ($N_{PUCCH}^{(1)}$) may be physical layer parameters of PUCCH.

PUCCH-ConfigDedicated may be employed. PUCCH-ConfigDedicated may include: ackNackRepetition CHOICE{release: NULL, setup: SEQUENCE {repetitionFactor: ENUMERATED {n2, n4, n6, spare1},n1PUCCH-AN-Rep: INTEGER (0 . . . 2047)}}, tdd-AckNackFeedbackMode: ENUMERATED {bundling, multiplexing} OPTIONAL}. ackNackRepetitionj parameter indicates whether ACK/NACK repetition is configured. n2 corresponds to repetition factor 2, n4 to 4 for repetitionFactor parameter ($N_{ANRep}$), n1PUCCH-AN-Rep parameter may be $n_{PUCCH,\ ANRep}^{(1,p)}$ for antenna port P0 and for antenna port P1. dd-AckNackFeedbackMode parameter may indicate one of the TDD ACK/NACK feedback modes used. The value bundling may correspond to use of ACK/NACK bundling whereas, the value multiplexing may correspond to ACK/NACK multiplexing. The same value may apply to both ACK/NACK feedback modes on PUCCH as well as on PUSCH.

The parameter PUCCH-ConfigDedicated may include simultaneous PUCCH-PUSCH parameter indicating whether simultaneous PUCCH and PUSCH transmissions is configured. An E-UTRAN may configure this field for the PCell when the nonContiguousUL-RA-WithinCC-Info is set to supported in the band on which PCell is configured. The E-UTRAN may configure this field for the PSCell when the nonContiguousUL-RA-WithinCC-Info is set to supported in the band on which PSCell is configured. The E-UTRAN may configure this field for the PUCCH SCell when the nonContiguousUL-RA-WithinCC-Info is set to supported in the band on which PUCCH SCell is configured.

A UE may transmit radio capabilities to an eNB to indicate whether UE support the configuration of PUCCH groups. The simultaneous PUCCH-PUSCH in the UE capability message may be applied to both a PCell and an SCell. Simultaneous PUCCH+PUSCH may be configured separately (using separate IEs) for a PCell and a PUCCH SCell. For example, a PCell and a PUCCH SCell may have different or the same configurations related to simultaneous PUCCH+PUSCH.

The eNB may select the PUCCH SCell among current SCells or candidate SCells considering cell loading, carrier quality (e.g. using measurement reports), carrier configuration, and/or other parameters. From a functionality perspective, a PUCCH Cell group management procedure may include a PUCCH Cell group addition, a PUCCH cell group release, a PUCCH cell group change and/or a PUCCH cell group reconfiguration. The PUCCH cell group addition procedure may be used to add a secondary PUCCH cell group (e.g., to add PUCCH SCell and one or more SCells in the secondary PUCCH cell group). In an example embodiment, cells may be released and added employing one or more RRC messages. In another example embodiment, cells may be released employing a first RRC message and then added employing a second RRC messages.

SCells including PUCCH SCell may be in a deactivated state when they are configured. A PUCCH SCell may be activated after an RRC configuration procedure by an activation MAC CE. An eNB may transmit a MAC CE activation command to a UE. The UE may activate an SCell in response to receiving the MAC CE activation command.

In example embodiments, a timer is running once it is started, until it is stopped or until it expires; otherwise it may not be running. A timer can be started if it is not running or restarted if it is running. For example, a timer may be started or restarted from its initial value.

LTE-Advanced introduced Carrier Aggregation (CA) in Release-10. In Release-10 CA, the Primary Cell (PCell) is always activated. One or more Secondary Cells (SCells) can be in activated or deactivated state. The SCell activation/deactivation processes were introduced in Release-10 to achieve battery power savings. When an SCell is deactivated, the UE (also called a wireless device) may stop receiving downlink signals and stop transmission on the SCell. In Release-10 CA, the default state of an SCell is deactivated when the SCell has been configured/added. Additional activation procedure employing MAC CE Activation Command may be needed to activate the SCell. SCells may be deactivated either by an activation/deactivation MAC CE or by the sCellDeactivationTimer. The UE and eNB maintain one sCellDeactivationTimer per SCell with a common value across SCells. An eNB maintains the activation/deactivation status of an SCell for a wireless device.

In LTE-Advanced Release-12, Dual Connectivity (DC) was introduced. In DC, a UE maintains connectivity to a Master eNB (MeNB) and a Secondary eNB (SeNB). Serving cells may be grouped into cell groups (CGs) such as a master CG (MCG) and a secondary CG (SCG). The primary cell in MeNB is called PCell. A cell in SeNB is called PSCell. A PSCell may support similar functions supported by a PCell, such as PUCCH, RACH, RLM, etc. If PSCell is deactivated, many processes may be impacted in SCG, e.g. RACH and PUCCH delivery. Therefore, in Release-12 DC, PSCell in SCG and PCell in MCG are kept in the activated state. In DC, the activation/deactivation processes may be performed per CG and per eNB. Activation/deactivation related information may not be exchanged between MeNB and SeNB. With DC, the cells with PUCCH (e.g. PCell and PSCell) are always in an activated state after they are configured. This process may prevent the need for cross-eNB activation/deactivation.

Cells of an eNB may be grouped in multiple PUCCH groups, each having its own PUCCH resources on a PUCCH SCell. eNB configures PUCCH groups for a wireless device by transmitting RRC messages to the wireless device. Implementation of activation/deactivation processes for PUCCH SCell may present some issues, if Release-10 or 12 activation/deactivation processes are implemented. Novel PUCCH SCell activation/deactivation procedures may be implemented to maintain PUCCH resources if and when they are needed. In addition, novel PUCCH SCell activation/deactivation procedures may be implemented to handle scenarios wherein PUCCH is deactivated or activated.

To achieve battery power saving benefits similar to the existing CA technology, it may be beneficial to enable deactivation of the PUCCH SCell. PUCCH SCell delivers uplink control information for the serving cells in the corresponding PUCCH group using its configured PUCCH resources. When there is no need for PUCCH UCI delivery, e.g. when other serving cells in the same PUCCH group are deactivated, the PUCCH SCell may be deactivated. Support for activation/deactivation of PUCCH SCell may provide battery power saving benefits. There may be no need to keep PUCCH SCell activated all the time, for example when there is no data transmission on cells in the corresponding PUCCH group. A PUCCH SCell deactivation procedure may introduce new implications for SCells that are in the corresponding PUCCH group. It may be beneficial to avoid or reduce situations where an active SCell may not have access to an activated PUCCH SCell. It may be beneficial to develop systems and processes wherein the PUCCH SCell may be activated/deactivated to reduce battery power consumption in the UE. Implementations may consider that the PUCCH SCell carries control information related to other SCells within the corresponding PUCCH group.

Solutions may be provided in which PUCCH control information such as HARQ/CQI/SR may be sent on the PUCCH SCell even when the PUCCH SCell is deactivated. Allowing transmission of the PUCCH control information on a deactivated PUCCH SCell may require that PUCCH SCell to be capable of transmitting uplink signals when it is deactivated, or may require activation of PUCCH SCell when such transmissions are needed. Such a solution may to be too complex to implement and may require many changes to existing physical and MAC layer procedures and/or hardware. Partially activating the PUCCH SCell for transmission of PUCCH control information may increase power consumption and transceiver complexity and may not be desirable.

In an example scenario, there may be one or more activated SCells belonging to the same PUCCH group with PUCCH SCell. Since serving cells in the same PUCCH group may use this PUCCH to deliver uplink control information, once PUCCH SCell is deactivated, the delivery of the uplink control information for other activated serving cells in the corresponding PUCCH group may not be possible. PUCCH SCell may carry PUCCH for other SCells in a secondary PUCCH group. Other SCells in the secondary PUCCH group may require PUCCH SCell resources. An eNB implementation may consider that a PUCCH SCell is activated before any other SCell in a secondary PUCCH group is activated. The PUCCH SCell may not be deactivated earlier than the other SCells in Secondary PUCCH group.

Deactivation of PUCCH SCell may imply stopping PUCCH transmissions on the PUCCH SCell. Stopping PUCCH transmission on the PUCCH SCell may impact the downlink scheduling of other activated SCells in the corresponding PUCCH group. It may be beneficial to keep the PUCCH SCell in the activated state as long as there is at least one other activated SCell in the corresponding PUCCH group. When the other SCells are deactivated, the PUCCH SCell may be deactivated when its deactivation timer expires.

In an example embodiment, if the MAC entity is configured with one or more SCells, the network may activate and deactivate the configured SCells. The SpCell may always be activated. The network may activate and deactivate the SCell(s) by sending the Activation/Deactivation MAC control element. Furthermore, the MAC entity may maintain a sCellDeactivationTimer timer per configured SCell. The same initial timer value applies to an instance of the sCellDeactivationTimer and it is configured by RRC. The configured SCells may be initially deactivated upon addition and after a handover.

In an example embodiment, when PUCCH SCell is configured by the RRC layer, the initial state of the PUCCH SCell may be a deactivated state. An eNB may activate a PUCCH SCell when it is needed by transmitting a MAC Activation CE. In an example embodiment, when PUCCH SCell is deactivated, PUCCH delivery on the deactivated PUCCH SCell may be stopped but PUCCH resource configuration may be kept (and not released). The configuration of the corresponding PUCCH group may be maintained while deactivating PUCCH SCell or other SCells in the PUCCH group. The start of PUCCH transmission on PUCCH SCell may depend, at least, on the activation delay of the PUCCH SCell. The re-activation of PUCCH transmission after a deactivation may not require additional RRC reconfiguration procedure since RRC Configuration of PUCCH SCell is retained when it is deactivated. In some embodiments, if the TAG including PUCCH SCell is expired, PUCCH may be released and RRC reconfiguration may be needed to reconfigure PUCCH resources on PUCCH SCell.

In an example embodiment, the following processes may be implemented in the UE and/or eNB when an SCell (e.g. PUCCH SCell or other SCells in a PUCCH group) is deactivated. Signals are applied to the process if they are configured. Other similar processes may be developed to achieve substantially the same outcome. If an SCell is deactivated, a UE may not transmit SRS on the SCell; may not report CQI/PMI/RI/PTI for the SCell; may not transmit on UL-SCH on the SCell; may not transmit on RACH on the SCell; may not monitor the PDCCH on the SCell; and/or may not monitor the PDCCH for the SCell. HARQ feedback for the MAC PDU containing Activation/Deactivation MAC control element may not be impacted by PCell interruption due to SCell activation/deactivation. When an SCell is deactivated, an ongoing Random Access procedure on the SCell, if any, may be aborted.

In the example embodiments, if the MAC entity receives an Activation/Deactivation MAC control element in a TTI activating the SCell (e.g. PUCCH SCell or other SCell(s) in a PUCCH group), the MAC entity may activate the SCell. When an SCell is activated, UE may apply normal SCell operation including one or more or all of the following: SRS transmissions on the SCell, PDCCH monitoring on the SCell, PDCCH monitoring for the SCell, start or restart the sCellDeactivationTimer associated with the SCell, and/or trigger PHR. When an SCell is activated, UE may apply CQI/PMI/RI/PTI/HARQ reporting for the SCell, if the corresponding PUCCH is activated and uplink synchronized (is included in an uplink synchronized TAG). If the SCell belong to primary PUCCH group, then PUCCH is always activated. If the SCell is in a secondary PUCCH group, UE may apply CQI/PMI/RI/PTI/HARQ reporting for the SCell, if the corresponding PUCCH SCell is active and uplink synchronized. In an example embodiment, when a PUCCH SCell is activated, the UE may apply normal operation of PUCCH transmissions. SRS and/or PUCCH are transmitted on an activated SCell if SRS and/or PUCCH are configured on the SCell. No uplink signals such as PUCCH, PUSCH, and SRS signals are transmitted on an SCell which is out-of-sync (included in an out-of-sync TAG), except random access preamble.

A PUCCH SCell may be activated or deactivated by Activation/Deactivation MAC control element like other SCell(s) configured by an eNB. An eNB implementation may activate a PUCCH SCell before any other SCell in the corresponding PUCCH group is activated. In an example embodiment, if an eNB activates an SCell in a secondary PUCCH group when the corresponding PUCCH SCell is deactivated, the UE may not report CQI/PMI/RI/PTI/HARQ on PUCCH for the SCell until the corresponding PUCCH SCell is activated and uplink synchronized.

In an example embodiment, if the MAC entity in a UE receives a Deactivation MAC control element, the UE may deactivate the SCell. A PUCCH SCell may be deactivated by Deactivation MAC control element regardless of activation or deactivation status of other SCells in the corresponding PUCCH group. It may be up to an eNB implementation to decide when to transmit Activation/Deactivation MAC control elements to a UE. A UE may process the received command to activate or deactivate SCells per the Activation/Deactivation MAC control element.

When the PUCCH SCell in a PUCCH group is in the deactivated state, the PUCCH SCell may not transmit PUCCH control information in the uplink PUCCH for the SCells in the corresponding PUCCH group. Other activated SCell(s) in a PUCCH group corresponding to a deactivated PUCCH SCell may not transmit uplink CQI/PMI/RI/PTI/HARQ-feedback reporting on PUCCH of the deactivated PUCCH SCell.

An eNB implementation may reduce or prevent scenarios wherein PUCCH SCell is deactivated while one or more other SCells in the corresponding PUCCH group are active. For example, an eNB may transmit activation command for activating PUCCH SCell before or at the same time activating other SCells in the corresponding PUCCH group. For example, an eNB may not transmit a deactivation command to deactivate PUCCH SCell, when there is at least one active SCell in the corresponding PUCCH group.

In an example embodiment, Activation/Deactivation may be supported for a PUCCH SCell. While the PUCCH SCell is deactivated in a PUCCH group, SCells belonging to the PUCCH group may not be activated. The eNB may manage the activation/deactivation status. The eNB may deactivate an SCell when its PUCCH is remapped to a deactivated PUCCH SCell. SCell deactivation timer of PUCCH SCell may be disabled. A newly added PUCCH SCell may be initially deactivated.

In LTE-Advanced release 12, PUCCH is transmitted on primary serving cell(s) (PCell and PSCell). PSCell is configured when Dual Connectivity (DC) is configured. PCell and PSCell may remain activated after they are configured. A UE may start a random access process after PCell/PSCell is configured. A UE may start transmission of PUCCH after PUCCH is configured and the primary serving cell is uplink synchronized. Initial UE PUCCH transmit power, $P_{PUCCH}$, for the physical uplink control channel (PUCCH) transmission in a primary serving cell (PCell and PSCell) is computed employing TPC command indicated in the random access response corresponding to the random access preamble transmitted in the primary serving cell (PCell in MCG and PSCell in SCG). A UE may, for example, employ following power computation mechanism shown below to compute the transmit power of PUCCH signals.

If serving cell c is the primary cell, the setting of the UE Transmit power $P_{PUCCH}$ for the physical uplink control channel (PUCCH) transmission in subframe i for serving cell c is defined by $$P_{PUCCH}(i) = \min \begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} \quad (1)$$

If the UE is not transmitting PUCCH for the primary cell, for the accumulation of TPC command for PUCCH, the UE may assume that the UE transmit power $P_{PUCCH}$ for PUCCH in subframe i is computed by $$P_{PUCCH}(i) = \min\{P_{CMAX,c}(i), P_{0\_PUCCH} + PL_c + g(i)\} \quad [dBm](2)$$

The power $P_{PUCCH}(i)$ is calculated for subframe i, and UE may reset accumulation of g(i) when $P_{O\_UE\_PUCCH}$ value is changed by higher layers or when the UE receives a random access response message for the primary cell. The factor g(i) may be called the adjustment factor. In PCell and PSCell, the adjustment factor is initialized and computed employing TPC command indicated in the random access response corresponding to the random access preamble transmitted in the primary serving cell. The adjustment factor g(i) is initialized to zero (g(0)=0) if $P_{O\_UE\_PUCCH}$ value is changed by higher layers (e.g. RRC).

In an example, $P_{CMAX,c}(i)$ may be the configured UE transmit power in subframe i for serving cell c. If the UE transmits PUSCH without PUCCH in subframe i for the serving cell c, for the accumulation of TPC command for PUCCH, the UE may assume $P_{CMAX,c}(i)$. If the UE does not transmit PUCCH and PUSCH in subframe i for the serving cell c, for the accumulation of TPC command for PUCCH, the UE may compute $P_{CMAX,c}(i)$ assuming MPR=0 dB, A-MPR=0 dB, P-MPR=0 dB and □TC=0 dB.

In an example embodiment, the parameter $\Delta_{F\_PUCCH}(F)$ may be provided by higher layers. Each $\Delta_{F\_PUCCH}(F)$ value corresponds to a PUCCH format (F) relative to PUCCH format 1a. If the UE is configured by higher layers to transmit PUCCH on two antenna ports, the value of $\Delta_{TxD}(F')$ is provided by higher layers; otherwise, $\Delta_{TxD}(F')=0$ $h(n_{CQI}, n_{HARQ}, n_{SR})$ is a PUCCH format dependent value, where $n_{CQI}$ corresponds to the number of information bits for the channel quality information. $n_{SR}=1$ if subframe i is configured for SR for the UE not having any associated transport block for UL-SCH, otherwise $n_{SR}=0$. If the UE is configured with more than one serving cell, or the UE is configured with one serving cell and transmitting using PUCCH format 3; otherwise, $n_{HARQ}$ is the number of HARQ-ACK bits sent in subframe i.

For PUCCH format 1,1a and 1b $h(n_{CQI}, n_{HARQ}, n_{SR})=0$. For PUCCH format 1b with channel selection, if the UE is configured with more than one serving cell, $$h(n_{CQI}, n_{HARQ}, n_{SR}) = \frac{(n_{HARQ} - 1)}{2},$$

otherwise, $h(n_{CQI}, n_{HARQ}, n_{SR})=0$. For PUCCH format 2, 2a, 2b and normal cyclic prefix $$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases}$$

For PUCCH format 2 and extended cyclic prefix $$h(n_{CQI}, n_{HARQ}, n_{SR}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

For PUCCH format 3 and when UE transmits HARQ-ACK/SR without periodic CSI. If the UE is configured by higher layers to transmit PUCCH format 3 on two antenna ports, or if the UE transmits more than 11 bits of HARQ-ACK/SR $$h(n_{CQI}, n_{HARQ}, n_{SR}) = \frac{n_{HARQ} + n_{SR} - 1}{3}.$$

Otherwise $$h(n_{CQI}, n_{HARQ}, n_{SR}) = \frac{n_{HARQ} + n_{SR} - 1}{2}.$$

In an example, for PUCCH format 3 and when UE transmits HARQ-ACK/SR and periodic CSI, if the UE is configured by higher layers to transmit PUCCH format 3 on two antenna ports, or if the UE transmits more than 11 bits of HARQ-ACK/SR and CSI $$h(n_{CQI}, n_{HARQ}, n_{SR}) = \frac{n_{HARQ} + n_{SR} + n_{CQI} - 1}{3},$$

Otherwise $$h(n_{CQI}, n_{HARQ}, n_{SR}) = \frac{n_{HARQ} + n_{SR} + n_{CQI} - 1}{2}.$$

$P_{O\_PUCCH}$ is a parameter composed of the sum of a parameter $P_{O\_NOMINAL\_PUCCH}$ provided by higher layers and a parameter $P_{O\_UE\_PUCCH}$ provided by higher layers. $\delta_{PUCCH}$ is a UE specific correction value, also referred to as a TPC command, included in a PDCCH with DCI format 1A/1B/1D/1/2A/2/2B/2C/2D for the primary cell, or included in an EPDCCH with DCI format 1A/1B/1D/1/2A/2/2B/2C/2D for the primary cell, or sent jointly coded with other UE specific PUCCH correction values on a PDCCH with DCI format 3/3A whose CRC parity bits are scrambled with TPC-PUCCH-RNTI. If a UE is not configured for EPDCCH monitoring, the UE attempts to decode a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI on every subframe except when in DRX.

There are many challenges in calculation of transmit power for PUCCH signals transmitted on a PUCCH SCell. Simply extending the current mechanisms in release-12 may not result in an efficient power calculation for PUCCH signals transmitted on a PUCCH SCell. Unlike a primary cell, a newly added PUCCH SCell may be initially deactivated and no PUCCH may initially be transmitted on PUCCH SCell. An eNB may activate a PUCCH SCell after an arbitrary period of time and when there is a need for activation of the PUCCH SCell. Unlike in the primary serving cell (PCell and PSCell), PUCCH signals may not be transmitted shortly after configuration of PUCCH on an SCell.

The TPC command indicated in the random access response (RAR) corresponding to the random access preamble transmitted in the primary cell may or may not be applicable to the PUCCH transmission on a PUCCH SCell. In an example scenario, PCell and PUCCH SCell signals may be transmitted by the same eNB and in the same band and with the same power. In such a scenario, the TPC command in RAR for the primary cell may provide some useful information for power settings of PUCCH on the PUCCH SCell. In some other scenarios, PUCCH SCell signals may be transmitted by a different transmission point, in a different band, and/or with a different power compared with a primary cell. In an example configuration, a PUCCH SCell may or may not have its own random access resources different from the random access resources of the primary cell.

Even after a PUCCH SCell activation, (unlike a primary cell) the PUCCH SCell may be deactivated using a MAC Activation/Deactivation command, and then be activated again after certain period with another MAC Activation/Deactivation command. When a PUCCH SCell is deactivated no PUCCH signal may be transmitted on the PUCCH SCell. Power computation mechanism for PUCCH signal transmission when PUCCH SCell is activated or re-activated may need to be addressed. In another scenario, PUCCH resources may be configured on an existing activated and uplink synchronized SCell. Power computation for PUCCH signal transmission on PUCCH resources configured on an existing activated SCell may need to be addressed. Existing transmit power control (TPC) command transmission and processing mechanisms may not apply to a PUCCH configured on a PUCCH SCell. Development of TPC command transmission and processing for PUCCH signal transmission on PUCCH resources configured on an activated or deactivated SCell may need to be addressed.

Legacy PUCCH signal power computation mechanisms in the current LTE-Advanced technology may not be suitable for some example scenarios described in the previous paragraphs. PUCCH signal power computation mechanisms in the current LTE-Advanced technology may need to be enhanced to address these scenarios. PUCCH SCell signals may be transmitted when PUCCH SCell is activated and uplink synchronized. Example embodiments provide mechanisms for computation of transmit power of PUCCH signals on a PUCCH SCell. Example embodiments describe methods and systems for transmission and processing of TPC commands for a PUCCH SCell and method and systems for computation of transmit power for a PUCCH SCell.

Legacy $P_{PUCCH}(i)$ computation mechanisms may be updated for power computation of PUCCH signals transmitted on a PUCCH SCell. Mechanisms employing equations (1) and (2) may be employed with different input parameters for a PUCCH SCell. PUCCH on a PUCCH SCell may be configured using separate information elements compared with PUCCH on a primary cell. A first RRC PUCCH configuration parameters (including power parameters) may be employed for configuration of PUCCH on a primary cell, and a second RRC PUCCH configuration parameters (including power parameters) may be employed for configuration of PUCCH on a PUCCH SCell. The first and second PUCCH parameters may be comprised in one RRC message or multiple RRC messages (e.g. a first RRC message for configuration of a primary PUCCH and a second RRC message for configuration of a secondary PUCCH).

Parameters $P_{CMAX,c}(i)$, $\Delta_{F\_PUCCH}(F)$, $\Delta_{TxD}(F')$, $h(n_{CQI}, n_{HARQ}, n_{SR})$, $P_{O\_UE\_PUCCH}$ may be calculated using the legacy methods using configuration parameters and settings of the PUCCH SCell. $PL_c$ may be calculated employing the pathloss reference configured for the PUCCH SCell (via RRC signalling).

The computation for the factor g(i) (so called the adjustment factor) may be updated for calculation of $P_{PUCCH}$ of a PUCCH SCell. The adjustment factor g(i) may be calculated for subframe i, and a UE may reset accumulation when $P_{O\_UE\_PUCCH}$ value is received (e.g. received for the first time, or when it is updated) by higher layers or when the UE receives a random access response message for a preamble transmitted on PRACH of the PUCCH SCell. The adjustment factor g(i) is initialized to zero (g(0)=0) if $P_{O\_UE\_PUCCH}$ value is initially received or later updated by higher layers (e.g. RRC messages). In an example embodiment, when a PUCCH SCell is configured, the initial value of the adjustment factor, g(0), may depend on whether a random access process is initiated on the PUCCH SCell. If the PUCCH SCell is uplink-synchronized without initiating a random access process on PUCCH SCell, g(0) may be initialized to zero. This may be regardless of PUCCH SCell being in an sTAG or a pTAG.

In an example embodiment, if the eNB initiates a random access process on the PUCCH SCell after the PUCCH SCell is configured and activated (e.g. when the PUCCH SCell is associated with an sTAG), the initial value of the adjustment factor, g(0), may be computed employing at least in part the TPC command indicated in the random access response corresponding to the random access preamble transmitted in the PUCCH SCell. For example, $g(0)=\Delta P_{rampup}+\delta_{msg2}$, where $\delta_{msg2}$ may be the TPC command indicated in the random access response corresponding to the random access preamble transmitted in the PUCCH SCell and if UE is transmitting PUCCH in subframe i, $$\Delta P_{rampup} = \min\left[\left\{\max\left(0, P_{CMAX,c} - \begin{pmatrix} P_{0\_PUCCH} + \\ PL_c + h(n_{CQI}, n_{HARQ}, n_{SR}) + \\ \Delta_{F\_PUCCH}(F) + \Delta_{TxD}(F') \end{pmatrix}\right)\right\}, \Delta P_{rampuprequested}\right] \quad (3)$$

Otherwise,
$\Delta P_{rampup}=\min[\{\max(0, P_{CMAX,c}-(P_{0\_PUCCH}+PL_c))\}, \Delta P_{rampuprequested}]$ and $\Delta P_{rampuprequested}$ may be provided by higher layers and may correspond to the total power ramp-up requested by higher layers from the first to the last preamble in the PUCCH SCell.

The value of g(0) may be applicable to the first instance of PUCCH signal transmission after PUCCH SCell is activated and uplink synchronized. In an example scenario, wherein a PUCCH SCell is configured and activated in pTAG or in an already synchronized sTAG, PUCCH signals may be transmitted after activation of the PUCCH SCell without a need for a random access process. In another example scenario, wherein a PUCCH SCell is configured and activated in an uplink out-of-synch sTAG, PUCCH is transmitted after PUCCH SCell activated and the sTAG is uplink synchronized employing a random access process or MAC TA control element. When the sTAG is uplink synchronized employing a MAC TA control element, the value of g(0) may be set to zero.

In an example embodiment, the subsequent values of the adjustment factor, g(i), may be calculated employing the legacy computation mechanism for the PUCCH during the period that the PUCCH remains in the activated state.

Existing transmit power control (TPC) command transmission and processing mechanisms may need further enhancements when a PUCCH is configured on a PUCCH SCell. Development of TPC commands transmission and processing for PUCCH signals transmission on PUCCH resources configured on an existing activated SCell may need to be addressed.

Figure 18:
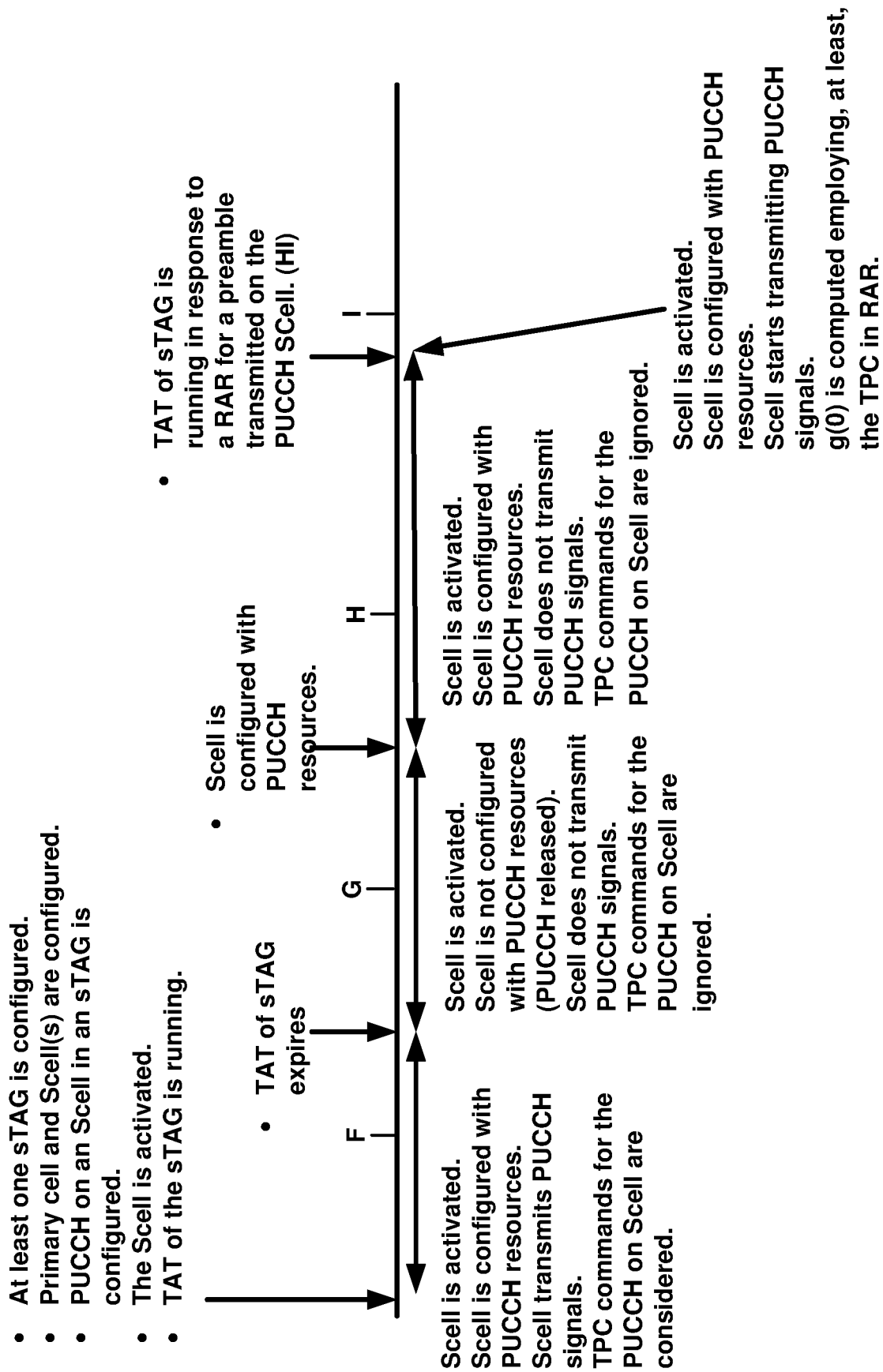
FIG. 18 is an example diagram illustrating timing of different events according as per an aspect of an embodiment of the present invention.

FIGS. 14, 15, 16, 17, 18, 19, and 20 illustrate mechanisms employed in example embodiments. For example, time (AB) in FIG. 14, time (DE) in FIG. 15, time (DE) in FIG. 16, time (HI) in FIG. 17, and time (HI) in FIG. 18 are example events causing the adjustment factor g(0) to be set. The figures provide some example scenarios. Time in LTE-Advance is organized in frames and subframes. PUCCH resources may not be configured in every subframe and a UE may not transmit PUCCH signals in every subframe. In one example, PUCCH resources may be configured in subframes #0 and #5 in a plurality of frames. A PUCCH SCell may be activated/deactivated in any subframes depending on the subframes that MAC activation/deactivation CE is received and depending on the processing time for the corresponding MAC CE command. For example, a PUCCH SCell may be activated in subframe #1 and the first instance of PUCCH may be transmitted in subframe #5. In an example embodiment, g(i) may be set, reset, or updated, for example, when a PUCCH SCell is in activated state.

In an example embodiment, a wireless device may receive, from a base station, at least one message comprising: one or more first physical uplink control channel (PUCCH) information elements (IEs) indicating one or more PUCCH formats of a secondary PUCCH of a secondary cell; and one or more second PUCCH power control IEs. An RRC message transmitted to a UE for PUCCH configuration may comprise PUCCH configuration IEs. Some of the parameters may indicate one or more PUCCH formats of a secondary PUCCH of a secondary cell. The IE PUCCH-ConfigCommon and IE PUCCH-ConfigDedicated may be used to configure the common and the UE specific PUCCH configuration respectively. An RRC message transmitted to a UE for PUCCH configuration may comprise power control IEs for PUCCH. The IE UplinkPowerControlCommon and IE UplinkPowerControlDedicated may be used to configure parameters for uplink power control in the system information and in the dedicated signalling, respectively.

The wireless device may transmit a first instance of uplink control information (UCI) on the secondary PUCCH employing an initial transmit power computed employing an initial adjustment factor. If the wireless device transmits a random access preamble on the PUCCH secondary cell, the initial transmit power may depend on at least one of the following parameters: i) the one or more second PUCCH power control IEs indicating a power parameter value for at least one of the one or more PUCCH formats; and/or ii) the initial adjustment factor. And the initial adjustment factor may be computed employing a transmit power control value received in a random access response corresponding to the random access preamble. Otherwise, the initial transmit power may depend on, at least, the one or more second PUCCH power control IEs. And the initial adjustment factor may be set to zero.

In an example embodiment, a wireless device may receive, from a base station, at least one message comprising configuration parameters of a plurality of cells. The plurality of cells may be grouped into a plurality of physical uplink control channel (PUCCH) groups comprising: i) a primary PUCCH group comprising a primary cell with a primary PUCCH transmitted to the base station; and ii) a secondary PUCCH group comprising a PUCCH secondary cell with a secondary PUCCH transmitted to the base station. The wireless device may compute an initial transmit power for the secondary PUCCH employing an initial adjustment factor. The wireless device may transmit a first instance of uplink control information on the secondary PUCCH employing the initial transmit power. If the wireless device transmits a random access preamble on the PUCCH secondary cell, the initial adjustment factor may be calculated employing a transmit power control value received in a random access response corresponding to the random access preamble, otherwise the initial adjustment factor may be set to zero.

In an example embodiment, a wireless device may receive, from a base station, at least one message comprising configuration parameters of a plurality of cells, the plurality of cells being grouped into a plurality of physical uplink control channel (PUCCH) groups comprising: i) a primary PUCCH group comprising a primary cell with a primary PUCCH transmitted to the base station; and ii) a secondary PUCCH group comprising a PUCCH secondary cell with a secondary PUCCH transmitted to the base station. The wireless device may transmit a first instance of uplink control information on the secondary PUCCH employing an initial transmit power. The initial transmit power may be computed employing an initial adjustment factor. If the wireless device transmits a random access preamble on the PUCCH secondary cell, the initial adjustment factor may be calculated employing a transmit power control value received in a random access response corresponding to the random access preamble, otherwise the initial adjustment factor is set to zero.

In an example embodiment, a UE may deactivate a PUCCH SCell after a period of activation. A PUCCH SCell may be deactivated when a UE receives a MAC Activation/Deactivation CE indicating deactivation of the PUCCH SCell. When the PUCCH SCell is deactivated no PUCCH signals may be transmitted on the PUCCH SCell by the wireless device.

Figure 19:
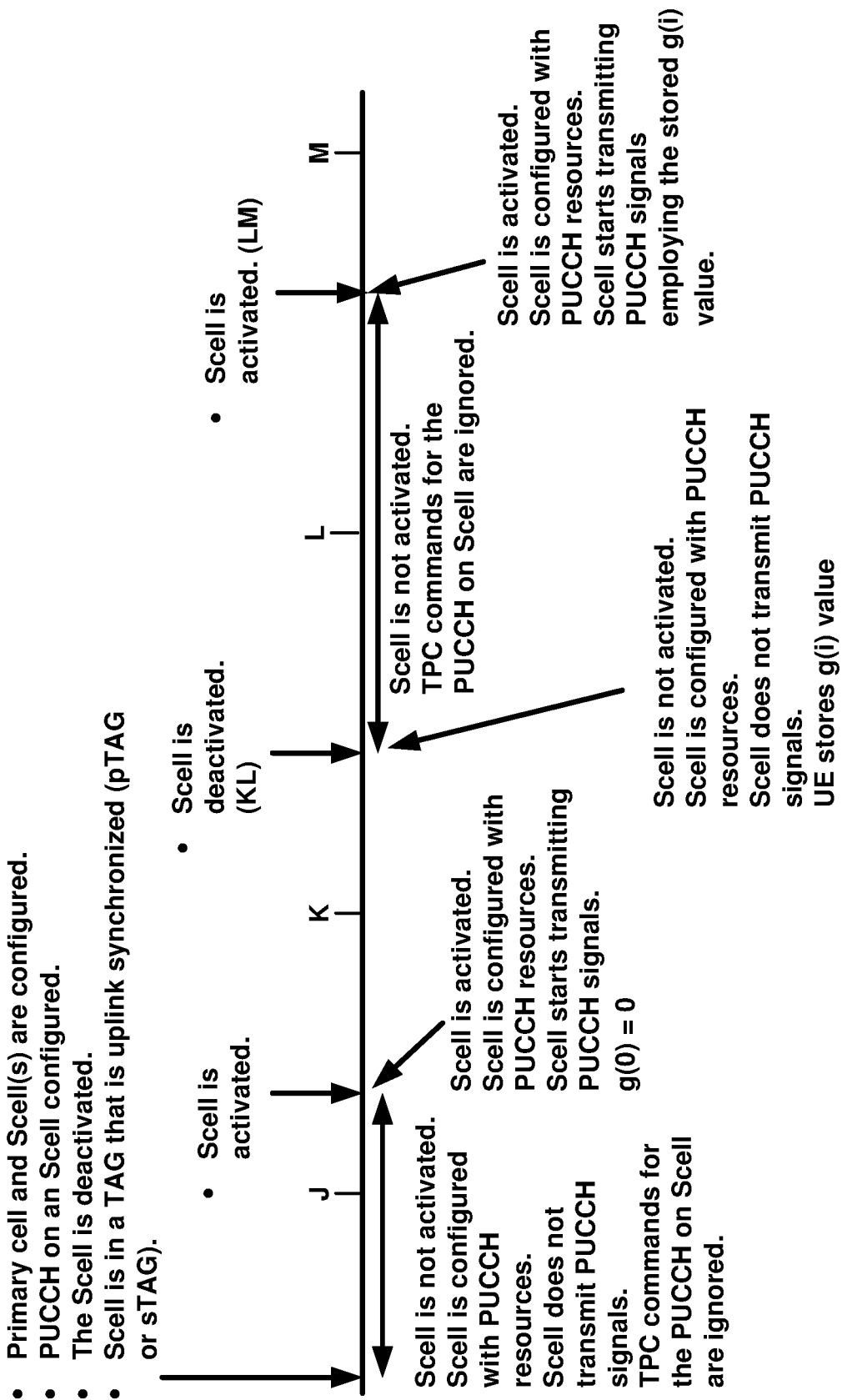
FIG. 19 is an example diagram illustrating timing of different events according as per an aspect of an embodiment of the present invention.
Figure 20:
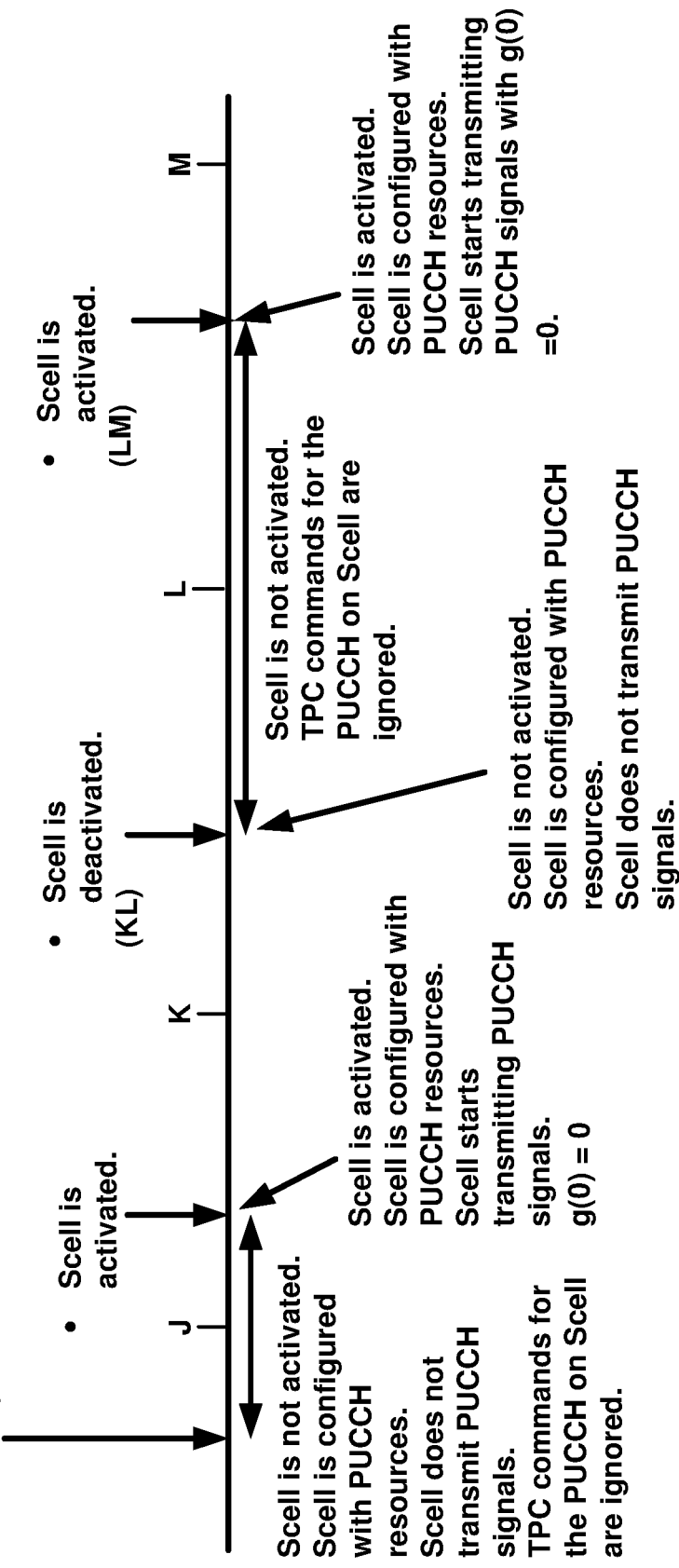
FIG. 20 is an example diagram illustrating timing of different events according as per an aspect of an embodiment of the present invention.

In an example embodiment, the UE may store the last value of g(i) after a last value of TPC command for PUCCH on SCell is received (e.g. before PUCCH SCell deactivation). The stored value of g(i) may be employed for PUCCH signal power computation when PUCCH SCell is re-activated. A UE may not consider any PUCCH TPC command for a deactivated PUCCH SCell, and the value of g(i) may not change during PUCCH SCell deactivation. This example embodiment is shown in FIG. 19. A UE may store the g(i) adjustment factor value at time (KL) and employ the stored value at time (LM).

In an example embodiment, a wireless device may receive, from a base station, at least one message comprising configuration parameters of a physical uplink control channel (PUCCH) for a secondary cell in a plurality of cells. The wireless device may transmit uplink control information on the secondary PUCCH employing an adjustment factor. The adjustment factor may be updated when the wireless device receives a transmit power control command for the PUCCH. The wireless device may receive a first MAC activation/deactivation command indicating deactivation of the secondary cell. The wireless device may stop transmission of the uplink control information and store a current value of the adjustment factor. The wireless device may receive a second MAC activation/deactivation command indicating activation of the secondary cell. The wireless device may transmit uplink control information on the secondary PUCCH employing the stored adjustment factor.

In an example embodiment, a PUCCH SCell may be activated when a UE receives a MAC Activation/Deactivation CE indicating deactivation of the PUCCH SCell. The value of g(i) may be reset to zero when a PUCCH SCell is activated. In an example embodiment, g(i) may be reset to g(0)=0 when an PUCCH SCell is activated and uplink synchronized. The adjustment factor of g(0)=0 may be employed for PUCCH power calculation after PUCCH SCell is activated. When PUCCH SCell is activated but is not uplink synchronized, no PUCCH SCell may be transmitted until the associated sTAG is synchronized. If the random access process is initiated on the PUCCH SCell, the UE may employ the disclosed embodiment and reset the g(0) employing TPC in a RAR received for the preamble transmitted on the PUCCH SCell. If the random access process is initiated on another SCell, the random access process may not impact the g(i) computation process and g(0) may be set to zero after SCell activation and/or after SCell is time aligned.

In an example embodiment, a wireless device may receive, from a base station, at least one message comprising configuration parameters of a physical uplink control channel (PUCCH) for a secondary cell in a plurality of cells. The wireless device may transmit first uplink control information on the secondary PUCCH employing an adjustment factor. The adjustment factor may be updated when the wireless device receives a transmit power control command for the PUCCH. The wireless device may receive a first MAC activation/deactivation command indicating deactivation of the secondary cell. The wireless device may stop transmission of the uplink control information. The wireless device may receive a second MAC activation/deactivation command indicating activation of the secondary cell. The wireless device may start transmission of second uplink control information on the secondary PUCCH. The adjustment factor may set or reset to zero after receiving the first MAC activation/deactivation command and before transmission of the second uplink control information.

In an example embodiment, PUCCH resources may be configured employing RRC message(s) on an existing configured, activated, and uplink-synchronized SCell. PUCCH signals may be transmitted on the newly configured PUCCH resources on PUCCH SCell after the RRC message(s) are successfully processed. The adjustment factor g(i) may be initialized to zero (g(0)=0) when the RRC message(s) are processed. In an example embodiment, when $P_{O\_UE\_PUCCH}$ value is received by higher layers the g(i) is initialized to zero (g(0)=0).

In an example embodiment, a wireless device may receive, from a base station, at least one message comprising configuration parameters of a physical uplink control channel (PUCCH) for a secondary cell in a plurality of cells. The secondary cell being in an activated state and being uplink synchronized. The wireless device may transmit a first instance of uplink control information on the secondary PUCCH employing an initial transmit power. The initial transmit power may be computed employing an initial adjustment factor. The initial adjustment factor may be set to zero.

In another example embodiment, an eNB may transmit PUCCH TPC for a deactivated SCell. In an example implementation, a UE may not consider (ignore) PUCCH TPC commands received during PUCCH SCell deactivation. If a UE considers PUCCH TPC commands received during PUCCH TPC deactivation and updates g(i) according to the received TPC commands, this approach may add some complexity to the UE and eNB TPC processing. For example, when PUCCH for PUCCH SCell is configured, a tpc-index may be configured for DCI 3/3A. The tpc-index may be applicable to any DCI 3/3A received and decoded in TPC-PUCCH-RNTI in the common search space of the primary cell. The one or two bits identified by the tpc-index in the received DCI format 3/3A are reserved for the PUCCH SCell.

An eNB may transmit DCI 3/3A to control transmit power of PUCCH on a primary cell. eNB may have to include the bits for the PUCCH SCell when PUCCH SCell is configured, even if PUCCH SCell is inactive and/or out-of-sync. In an example embodiment, an eNB may set the value of the TPC for an inactive and/or out-of-sync PUCCH SCell to pre-defined values. A UE may receive DCI 3/3A transmitted employing TPC-PUCCH-RNTI in the common search space of the primary cell. The UE may decode the DCI 3/3A information. In an example embodiment, the UE may ignore the DCI 3/3A information identified by tpc-index of PUCCH of PUCCH SCell if PUCCH SCell is deactivated. In an example embodiment, the UE may ignore the DCI 3/3A information identified by tpc-index of PUCCH of PUCCH SCell if PUCCH SCell is uplink out-of-sync. In an example embodiment, the UE may ignore the DCI 3/3A information identified by tpc-index of PUCCH of PUCCH SCell if PUCCH SCell is deactivated and/or uplink out-of-sync.

Example embodiments may enhance the updating mechanism for the adjustment factor when PUCCH SCell is deactivated and/or uplink out-of-sync. For example, when DCI format 3A is configured for TPC of PUCCH of a PUCCH SCell. In a DCI format 3A received employing TPC-PUCCH-RNTI, the bit corresponding to PUCCH SCell may be set to zero or one. According to Table B of FIG. 21, the value of zero may corresponds to a step size of −1 dB and the value of one may correspond to a step size of +1 dB. Applying these values to the adjustment factor may add additional complexity and processing needs in both eNB and UE. In addition, such a process may become unstable, for example, when a PUCCH SCell is deactivated for a relatively long period of time.

FIGS. 14, 15, 16, 17, 18, 19, and 20 illustrate mechanisms employed in example embodiments. For example, a UE may ignore TPC commands in time (A) in FIG. 14. For example, a UE may ignore TPC commands in time (C) and/or (D) in FIG. 15. For example, a UE may ignore TPC commands in time (C) and/or (D) in FIG. 16. For example, a UE may ignore TPC commands in time (G) and/or (H) in FIG. 17. For example, a UE may ignore TPC commands in time (G) and/or (H) in FIG. 18. For example, a UE may ignore TPC commands in time (J) and/or (L) in FIG. 19. For example, a UE may ignore TPC commands in time (J) and/or (L) in FIG. 20.

In an example embodiment, a wireless device may receive, from a base station, at least one message comprising configuration parameters of a plurality of cells. The plurality of cells may be grouped into a plurality of physical uplink control channel (PUCCH) groups comprising: i) a primary PUCCH group comprising a primary cell with a primary PUCCH transmitted to the base station; and ii) a secondary PUCCH group comprising a PUCCH secondary cell with a secondary PUCCH transmitted to the base station. The wireless device may receive and decode a group power control command on a common search space of the primary cell. A power control command in the group power control command may be for the secondary PUCCH. The wireless device may ignore (other terms such as abort, drop, not consider, not process, etc may also be used) the power control command when the PUCCH secondary cell is in deactivated state.

In an example embodiment, a wireless device may receive, from a base station, at least one message comprising configuration parameters of a plurality of cells. The plurality of cells may be grouped into a plurality of physical uplink control channel (PUCCH) cell groups comprising: i) a primary PUCCH group comprising a primary cell with a primary PUCCH transmitted to the base station; and ii) a secondary PUCCH group comprising a PUCCH secondary cell with a secondary PUCCH transmitted to the base station. The wireless device may receive and decode a group power control command on a common search space of the primary cell. A power control command in the group power control command may be for the secondary PUCCH. The wireless device may ignore (other terms such as abort, drop, not consider, not process, etc may also be used) the power control command when the PUCCH secondary cell is in a timing advance group which is out-of-sync (not uplink synchronized). The timing advance group is out-of-sync (not uplink synchronized) if its time alignment timer is not running.

In an example embodiment, DCI formats 1A/1B/1D/1/2A/2B/2C/2D/2 may comprise TPC command for PUCCH. In the current LTE-Advanced, The TPC command in these DCI formats are applicable to PUCCH on PCell or PSCell depending on which eNB transmits the command. If the DCI is received by the MAC/PHY entity communicating with the Master eNB, the TPC command for PUCCH is applied to PUCCH transmitted to the Master eNB. If the DCI is received by the MAC/PHY entity communicating with the Secondary eNB, the TPC command for PUCCH is applied to PUCCH transmitted to the Secondary eNB. A UE may comprise two functionally independent MAC/PHY entities, when the UE is configured with dual connectivity (DC). New power control command (TPC) transmission mechanisms may be employed to transmit TPC commands for PUCCH SCell(s). In the current LTE-Advanced, The TPC commands in these DCI formats are applicable to a primary serving cell. When multiple PUCCH groups are configured, the existing TPC transmission and reception mechanisms need to be enhanced.

In an example solution, the PUCCH TPC commands in DCI formats 1A/1B/1D/1/2A/2B/2C/2D/2 may be applicable to the primary cell when PUCCH groups are configured. DCI formats 3/3A can be extended by configuring new tpc-Index for the PUCCH SCell. This approach may be simple and provide an easy extension of the current power control methods, but may limit the power control commands of PUCCH on PUCCH SCell to TPCs in DCI formats 3/3A. An eNB may need to frequently transmit DCI formats 3/3A on PCell common search space, and this may increase the control channel (PDCCH/ePDCCH) overhead.

In an example solution, a new index may be added to DCI formats 1A/1B/1D/1/2A/2B/2C/2D/2 to identify the serving cell or to identify PUCCH group that the PUCCH TPC command is applicable to. This approach may be flexible and extendable, but may increase the size of the DCI formats and consequently increase the control channel overhead and complexity. Other alternatives may be available to address this issue, including relying on open loop power control for a PUCCH SCell, applying the TPC commands to PUCCH on both primary and secondary cell(s), dividing subframes in multiple subsets and DCI in a subset would be applicable to a PUCCH resource, and etc. There is a need for an efficient and enhanced TPC transmission and processing mechanism for PUCCH signals transmitted on PUCCH resources configured on an SCell.

In an example embodiment, effective power control mechanisms are introduced for PUCCH signal transmission on an SCell. TPC commands may be transmitted for PUCCH on an SCell without increasing the signalling overhead. Enhanced mechanisms may be developed for determining which TPC commands are applicable to which PUCCH.

In an example embodiment, a serving cell carrying the PDCCH/ePDCCH DCI or the serving cell that employ the PDCCH/ePDCCH DCI (DCI is for that serving cell) implicitly determines the PUCCH that employ the PUCCH TPC command in the DCI. When cross carrier scheduling across PUCCH groups are not allowed/configured, then the serving cell carrying the PDCCH/ePDCCH DCI and the serving cell that employ the PDCCH/ePDCCH DCI belong to the same PUCCH group.

In an example embodiment, when the PDCCH/ePDCCH DCI carries scheduling information for a cell in a PUCCH group, the TPC command in DCI 1A/1B/1D/1/2A/2B/2C/2D/2 may be applicable to the PUCCH on the PUCCH SCell associated with the PUCCH group. This rule may implicitly determine which PUCCH may employ PUCCH TCP command in a PDCCH/ePDCCH DCI format 1A/1B/1D/1/2A/2B/2C/2D/2. When cross-carrier scheduling across PUCCH groups are not allowed/configured, the following equivalent rule may be implemented. When the PDCCH/ePDCCH DCI is received on a cell in a PUCCH group, the TPC command in DCI 1A/1B/1D/1/2A/2B/2C/2D/2 may be applicable to the PUCCH on the PUCCH SCell associated with the PUCCH group.

This mechanism may not be applicable to DCI format 3/3A. DCI format 3/3A is transmitted on the primary cell. If this mechanism is extended to DCI format 3/3A, then the PUCCH TPC commands carried on DCI format 3/3A would be only applicable to the primary cell. A different mechanism need to be developed for DCI formats 3/3A. DCI format 3/3A may be extended to PUCCH on PUCCH SCell(s) by defining a new tpc-Index configured for a PUCCH SCell using RRC signalling.

In the example embodiments, power control mechanisms are extended to efficiently implement power control mechanisms for PUCCH on PUCCH SCell(s), without a need to change the format of DCI formats 1A/1B/1D/1/2A/2B/2C/2D/2/3/3A. The UE may identify which PUCCH employs the TPC command in DCI format 1A/1B/1D/1/2A/2B/2C/2D/2 using the information on which serving cell carries the PDCCH DCI, or which serving cell applies the scheduling information in the PDCCH DCI. These two rules are practically the same (achieve the same result), when cross carrier scheduling is not allowed and/or configured among PUCCH groups. DCI formats 3/3A may be extended employing newly configured tpc-index for a PUCCH SCell using RRC signalling. These mechanisms employ legacy DCI formats 1A/1B/1D/1/2A/2B/2C/2D/2/3/3A and extend the legacy PUCCH power control mechanisms to PUCCH SCells by defining new mechanisms in the physical layer and/or RRC signalling.

In an example embodiment, a wireless device may receive, from a base station, at least one message comprising configuration parameters of a plurality of cells. The plurality of cells may be grouped into a plurality of physical uplink control channel (PUCCH) groups comprising: i) a primary PUCCH group comprising a primary cell with a primary PUCCH transmitted to the base station; and a secondary PUCCH group comprising a PUCCH secondary cell with a secondary PUCCH transmitted to the base station. The wireless device may receive, from the base station and on a cell in the plurality of cells, downlink control information comprising a PUCCH power control command. The downlink control information may be received in a wireless device specific search space of a downlink control channel of the cell. The wireless device may apply the PUCCH power control command to the primary PUCCH if the primary PUCCH group comprises the cell. The wireless device may apply the PUCCH power control command to the secondary PUCCH if the secondary PUCCH group comprises the cell.

In an example embodiment, a wireless device may receive, from a base station, at least one message comprising configuration parameters of a plurality of cells. The plurality of cells being grouped into a plurality of physical uplink control channel (PUCCH) groups comprising: i) a primary PUCCH group comprising a primary cell with a primary PUCCH transmitted to the base station; and a secondary PUCCH group comprising a PUCCH secondary cell with a secondary PUCCH transmitted to the base station. The wireless device may receive, from the base station and for a cell in the plurality of cells, downlink control information comprising a PUCCH power control command. The downlink control information may be received in a wireless device specific search space of a downlink control channel of the cell. The wireless device may apply the PUCCH power control command to the primary PUCCH if the primary PUCCH group comprises the cell. The wireless device may apply the PUCCH power control command to the secondary PUCCH if the secondary PUCCH group comprises the cell.

3GPP TS 36.213 standard titled "Evolved Universal Terrestrial Radio Access (E-UTRA); Physical layer procedures" describes uplink power control procedures for physical uplink shared channel (PUSCH) and physical uplink control channel (PUCCH). An aspect of the PUSCH and PUCCH power control mechanism is about determining the initial PUSCH/PUCCH transmit power after a successful PRACH.

In 3GPP TS 36.213 v.11.2 (February 2013), the initial PUSCH/PUCCH transmit power after a successful PRACH process takes into account the amount of power ramping of the PRACH preamble prior to receipt of the Random Access Response and the transmit power control (TPC) command indicated in the random access response corresponding to the random access preamble transmitted in the serving cell. The power control procedures in 3GPP TS 36.213 v.11.2 is presented in Appendix A.

3GPP TS 36.213 v.11.2 specifies the following rules for PUSCH calculations: For both types of $f_c(*)$ (accumulation or current absolute) the first value is set as follows: If $P_{O\_UE\_PUSCH}$ value is changed by higher layers and serving cell c is the primary cell or, if $P_{O\_UE\_PUSCH}$ value is received by higher layers and serving cell c is a Secondary cell $f_c(0)=0$ Else If the UE receives the random access response message for a serving cell c $f_c(0)\Delta P_{rampup}+\delta_{msg2,c}$, where $\delta_{msg2,c}$ is the TPC command indicated in the random access response corresponding to the random access preamble transmitted in the serving cell c, see Section 6.2, and $\Delta P^{rampup,c}$ is provided by higher layers and corresponds to the total power ramp-up from the first to the last preamble in the serving cell c.

3GPP TS 36.213 v.11.2 specifies the following rules for PUCCH calculations: If $P_{O\_UE\_PUCCH}$ value is changed by higher layers, g(0)=0 Else g(0)=$\Delta P_{rampup}+\delta_{msg2}$, where $\delta_{msg2}$ is the TPC command indicated in the random access response corresponding to the random access preamble transmitted in the primary cell, and $\Delta P_{rampup}$ is the total power ramp-up from the first to the last preamble in the primary cell provided by higher layers.

Change Request, R1-132673, submitted in 3GPP TSG-RAN WG1 Meeting #73, May 2013, provides a mechanism to enhance PUSCH/PUCCH transmit power determination mechanism after PRACH power ramping. In the power control mechanism described in 3GPP TS 36.213 v.11.2, initial PUSCH/PUCCH power after PRACH preamble power ramping may get stuck at maximum power for a prolonged period while repeated negative power control commands may have no effect.

R1-132673 indicates that although the PRACH preamble transmission itself is capped at the maximum UE transmit power, the value of the total power ramping requested by higher layers, as passed down from the MAC layer to the physical layer, is not capped at the maximum UE transmit power. This may imply that the accumulative power adjustments f(i) (for PUSCH) and g(i) (for PUCCH) can be initialized to values that are much higher than the actual PRACH preamble power ramping. This is in contrast to the accumulative power control for PUSCH and PUCCH, for which it is specified that positive power control commands are not be accumulated if the UE has reached maximum power.

Since subsequent negative power control commands may act on the accumulated f(i) and g(i) rather than on the actual power, a large number of negative power control commands may be required after a successful PRACH preamble transmission in order to bring f(i) and g(i) back down to levels at which they start to reduce the actual UE transmitted power.

Similar to the way that positive power control commands may not be accumulated in f(i) and g(i) for PUSCH/PUCCH power control if the UE has reached maximum power, the initialization of f(i) and g(i) based on PRACH power ramping may be capped at the UE maximum power. R1-132673 describes an enhance power control mechanism, in which the initial power setting of PUSCH/PUCCH after PRACH preamble transmission in computed based on the following formulas.

3GPP TS 36.213 v.11.3 (including the Change Request R1-132673) specifies the following rules for PUSCH calculations: For both types of $f_c(*)$ (accumulation or current absolute) the first value is set as follows: If $P_{O\_UE\_PUSCHc}$ value is changed by higher layers and serving cell is the primary cell or, if $P_{O\_UE\_PUSCHc}$ value is received by higher layers and serving cell c is a Secondary cell, $f_c(0)=0$, Else If the UE receives the random access response message for a serving cell c, $f_c(0)=\Delta P_{rampup,c}+\delta_{msg2,c}$, where $\delta_{msg2,c}$ is the TPC command indicated in the random access response corresponding to the random access preamble transmitted in the serving cell c, see Section 6.2, and $$\Delta P_{rampup,c} = \min\left[\left\{\max\left(0, P_{CMAX,c} - \begin{pmatrix}10\log_{10}(M_{PUSCH,c}(0))+\\P_{O\_PUSCH,c}(2)+\delta_{msg2}+\\\alpha_c(2)\cdot PL+\Delta_{TF,c}(0)\end{pmatrix}\right)\right\}, \Delta P_{rampuprequested,c}\right]$$

and $\Delta P_{rampuprequested,c}$ is provided by higher layers and corresponds to the total power ramp-up requested by higher layers from the first to the last preamble in the serving cell c, $M_{PUSCH,c}(0)$ is the bandwidth of the PUSCH resource assignment expressed in number of resource blocks valid for the subframe of first PUSCH transmission in the serving cell c, and $\Delta TF,c(0)$ is the power adjustment of first PUSCH transmission in the serving cell c.

3GPP TS 36.213 v.11.3 specifies the following rules for PUCCH calculations: If $P_{O\_UE\_PUCCH}$ value is changed by higher layers, $g(0)=0$ Else $g(0)=\Delta P_{rampup}+\delta_{msg2}$, where $\delta_{msg2}$ is the TPC command indicated in the random access response corresponding to the random access preamble transmitted in the primary cell, and $$\Delta P_{rampup} = \min\left\{\left[\max\left(0, P_{CMAX,c} - \begin{pmatrix} P_{0\_PUCCH} + \\ PL_c + h(n_{CQI}, n_{HARQ}, n_{SR}) + \\ \Delta_{F\_PUCCH}(F) + \Delta_{TxD}(F') \end{pmatrix}\right)\right], \Delta P_{rampuprequested}\right\}$$

and $\Delta P_{rampuprequested}$ is provided by higher layers and corresponds to the total power ramp-up requested by higher layers from the first to the last preamble in the primary cell.

R1-132673 provided an enhancement to determining the initial PUSCH/PUCCH transmit power after a successful PRACH. If the initial PUSCH/PUCCH transmit power is not set properly, the UEs may start uplink signal transmission at a too high or too low power and multiple power control commands may be required to adjust the UE transmit power. This is especially important for PUCCH, since many UEs may share the same PUCCH radio resources and losing control channel signal may have negative consequences (e.g. due to false detection). If a UE transmits PUCCH at a higher power than required, it may create interference to other UEs. If a UE transmits PUCCH at a lower power than required, the eNB may not be able to successfully receive the PUCCH signal. There is a need to enhance power control mechanisms for PUCCH transmission. Specially, there is a need to enhance the initial PUCCH transmit power computation after a successful PRACH process. Example embodiments describe mechanisms to enhance the initial PUCCH transmit power calculations after a successful PRACH process.

In 3GPP TS 36.213 v.11.3, the initial adjustment factor for PUSCH, $f(0)$, is calculated employing equation $f_c(0)=\Delta P_{rampup}+\delta_{msg2,c}$, and the initial adjustment factor for PUCCH, $g(0)$, is calculated employing equation $g(0)=\Delta P_{rampup}+\delta_{msg2}$. Different formulas are presented for calculating the $\Delta P_{rampup}$ for PUSCH and PUCCH as shown above.

The value of $\Delta P_{rampup}$ for PUCCH is:

$$\Delta P_{rampup}=P_{CMAX,c}-[P_{0\_PUCCH}+PL_c+h(n_{CQI},n_{HARQ},n_{SR})+\Delta_{F\_PUCCH}(F)+\Delta_{TxD}(F')]$$

This is considering a scenario wherein $P_{CMAX,c}-[P_{0\_PUCCH}+PL_c+h(n_{CQI},\ n_{HARQ},\ n_{SR})+\Delta_{F\_PUCCH}(F)+\Delta_{TxD}(F')]$ has a value greater or equal to zero and is less than $\Delta P_{rampuprequested}$. When $P_{CMAX,c}-[P_{0\_PUCCH}+PL_c+h(n_{CQI},\ n_{HARQ},\ n_{SR})+\Delta_{F\_PUCCH}(F)+\Delta_{TxD}(F')]$ is greater than $\Delta P_{rampuprequested}$, $\Delta P_{rampup}=\Delta P_{rampuprequested}$.

When $P_{CMAX,c}-[P_{0\_PUCCH}+PL_c+h(n_{CQI},\ n_{HARQ},\ n_{SR})+\Delta_{F\_PUCCH}(F)+\Delta_{TxD}(F')]$ has a value greater or equal to zero and is less than $\Delta P_{rampuprequested}$, then When the value is inserted in $g(0)$, the value of $g(0)$ may be:

$$g(0)=P_{CMAX,c}-[P_{0\_PUCCH}+PL_c+h(n_{CQI},n_{HARQ},n_{SR})+\Delta_{F\_PUCCH}(F)+\Delta_{TxD}(F')]+\delta_{msg2,c}$$

When this value is inserted in the $P\_PUCCH(0)$ equation may result in:

$$P_{PUCCH}(0) = \min\left\{\begin{matrix} P_{CMAX,c}(0), \\ P_{CMAX,c}(0)-\delta_{msg2,c} \end{matrix}\right\} = P_{CMAX,c}(0)-\delta_{msg2,c}$$

In the current mechanism, in some scenarios, the (maximum) value of initial PUCCH power may be $P_{CMAX,c}(0)-\delta_{msg2,c}$. This may decrease the initial UE power and limit the potential interference to other UEs in some example scenarios. This may reduce interference created by PUCCH transmissions in some example scenarios.

Such a decrease in the initial UE PUCCH transmit power in some example scenarios may decrease overall PUCCH efficiency and may deteriorate overall air interface spectral efficiency. There is a need to enhance the initial PUCCH transmit power calculations after a successful PRACH process.

In an example embodiment, the value the initial transmit power of PUCCH is increased by $\delta_{msg2,c}$ in some example scenarios. This enhancement require changing the PUCCH transmit power computation mechanism in the UE. Example embodiment enhances UE initial PUCCH transmit power settings. Example embodiments describe mechanisms to enhance the initial PUCCH transmit power calculations after a successful PRACH process. Example embodiment may provide an additional 1 to 3 dB gain to initial transmit power.

Adding 3 dB to PUCCH transmit power (calculated by PUCCH power computation mechanism in 3GPP TS 36.213 v.11.3) may not be an effective method for enhancing the UE PUCCH transmit power. In many scenarios, PUCCH may be transmitted with enough initial transmit power in the existing mechanism (e.g. for a UE close to the eNB and/or or a UE with good coverage quality).

To implement the example embodiments, the mechanism for computation of $\Delta P_{rampup}$ is updated as shown below:

$$\Delta P_{rampup} = \min\left\{\left[\max\left(0, P_{CMAX,c} - \begin{pmatrix} P_{0\_PUCCH} + \delta_{msg2,c} + \\ PL_c + h(n_{CQI}, n_{HARQ}, n_{SR}) + \\ \Delta_{F\_PUCCH}(F) + \Delta_{TxD}(F') \end{pmatrix}\right)\right], \Delta P_{rampuprequested}\right\}$$

In an example embodiment, the parameter $\delta_{msg2,c}$ is included in the computation of $\Delta P_{rampup}$. The value of $\delta^{msg2,c}$ may be included in calculation of $\Delta P_{rampup}$ when $P_{CMAX,c}-[P_{0\_PUCCH}+PL_c+h(n_{CQI},\ n_{HARQ},\ n_{SR})+\Delta_{F\_PUCCH}(F)+\Delta_{TxD}(F')+\delta_{msg2,c}]$ has a value greater or equal to zero and is less than $\Delta P_{rampuprequested}$. The example embodiment may increase PUCCH transmit by $\delta_{msg2,c}$ when it is needed.

In some scenarios, the enhancement in example embodiments may not be applicable to PUSCH power computations since PUSCH power computation already includes $\delta_{msg2,c}$ in calculation of the ramp up power value. The current mechanisms do not include $\delta_{msg2,c}$ in calculating the ramp up value for PUCCH. Example embodiments of the invention enhances existing mechanisms by including $\delta_{msg2,c}$ in calculations of PUCCH transmit power and improves air interface efficiency.

In LTE-Advanced Release 12 and before, PUCCH is supported on primary cell(s). When the PUCCH transmission is supported on a secondary cell (e.g. in R.13 and/or beyond), $\Delta P_{rampup}$ may need to be calculated for PUCCH on a primary cell or on a secondary cell. $\delta_{msg2,c}$ and $\Delta P_{rampuprequested}$ may be serving cell specific. In an example embodiment, a serving cell may have its own $\delta_{msg2,c}$ and $\Delta P_{rampuprequested}$ values configured by higher layers (RRC messages). Other parameters in the calculations of $\Delta P_{rampup}$, which are configured by higher layers for a serving cell, may be separately configured and/or computed for a PUCCH on a primary cell and a PUCCH on a secondary cell. PUCCH configuration parameters and settings may be different for a PUCCH on a primary cell or a PUCCH on a secondary cell.

In an example embodiment, a wireless device may receive, from a base station, at least one message comprising: i) one or more physical uplink control channel (PUCCH) information elements (IEs) indicating one or more PUCCH formats of a secondary PUCCH of a secondary cell; and ii) one or more second PUCCH power control IEs. The wireless device may transmit a first instance of uplink control information on the secondary PUCCH with an initial transmit power computed employing an initial adjustment factor. If the wireless device transmits a random access preamble on the PUCCH secondary cell, the initial transmit power depends on: i) the one or more second PUCCH power control IEs indicating a power parameter value for at least one of the one or more PUCCH formats; and ii) the initial adjustment factor, wherein the initial adjustment factor is computed employing a transmit power control value received in a random access response corresponding to the random access preamble. Otherwise the initial transmit power may depend on the one or more second PUCCH power control IEs. The initial adjustment factor is set to zero. The random access may be initiated to align (synchronize) uplink transmission timing before PUCCH signals are transmitted. The initial adjustment factor may be computed further employing a ramp-up parameter. The initial adjustment factor may be computed by adding the transmit power control value and the ramp-up parameter. The ramp-up parameter may be computed as a function of the transmit power control value.

In an example embodiment a wireless device may receive at least one message comprising: i) one or more physical uplink control channel (PUCCH) information elements (IEs) indicating one or more PUCCH formats of a PUCCH of a cell; and ii) one or more PUCCH power control IEs. The wireless device may transmit a first instance of uplink control information on the PUCCH with an initial transmit power computed employing an initial adjustment factor. If the wireless device transmits a random access preamble on the cell prior to transmission of the first instance, the initial transmit power may depend on: i) the one or more PUCCH power control IEs indicating a power parameter value for at least one of the one or more PUCCH formats; and the initial adjustment factor. The initial adjustment factor may be computed by adding the transmit power control value and a ramp-up parameter. The ramp-up parameter may be computed as a function of the transmit power control value. Otherwise the initial transmit power may depend on the one or more PUCCH power control IEs; and the initial adjustment factor is set to zero. The random access may be initiated to align (synchronize) uplink transmission timing before PUCCH signals are transmitted.

Figure 22:
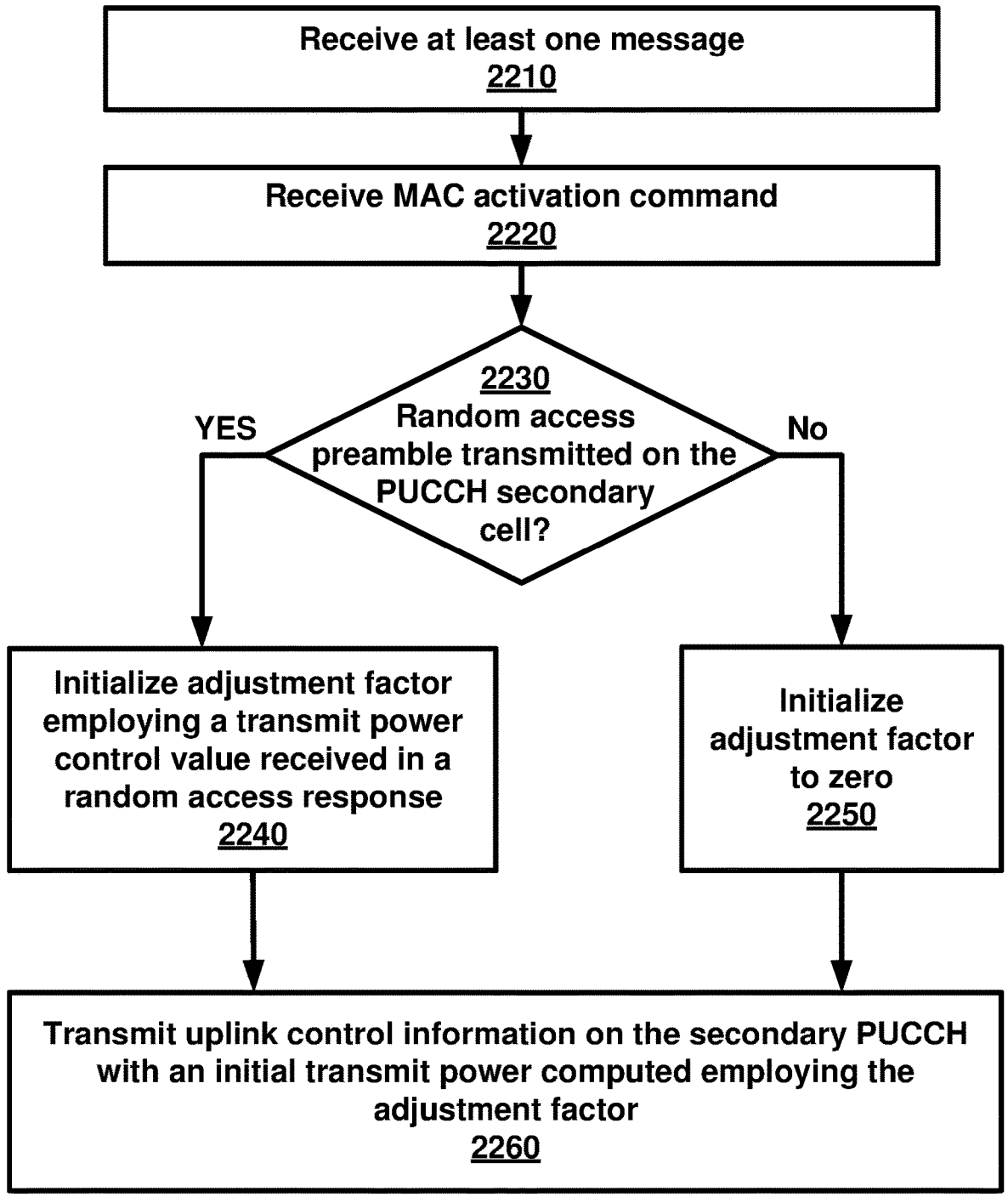
FIG. 22 is an example flow diagram as per an aspect of an embodiment of the present invention.

FIG. 22 is an example flow diagram as per an aspect of an embodiment of the present invention. According to an embodiment, a wireless device may comprise one or more processors and memory storing instructions that, when executed, cause the wireless device to perform at least part of the flow diagram. A wireless device may receive at least one message from a base station at 2210. The at least one message may comprise configuration parameters of a physical uplink control channel (PUCCH) secondary cell with a secondary PUCCH. According to an embodiment, the at least one message may comprise configuration parameters of a plurality of cells grouped into a plurality of PUCCH groups. The plurality of PUCCH groups may comprise a primary PUCCH group and a secondary PUCCH group. The primary PUCCH group may comprise a primary cell with a primary PUCCH transmitted to a base station. The secondary PUCCH group may comprise the PUCCH secondary cell with the secondary PUCCH transmitted to the base station. According to an embodiment, the at least one message may comprise random access resource parameters of the PUCCH secondary cell. According to an embodiment, the at least one message may further comprise a pathloss reference parameter indicating a pathloss reference cell for the PUCCH secondary cell.

A media access control (MAC) activation command indicating activation of the PUCCH secondary cell may be received at 2220. According to an embodiment, the PUCCH secondary cell may be initially deactivated when configured.

An adjustment factor may be initialized at 2240 and/or 2250. A determination may be made at 2230 whether the wireless device transmits a random access preamble on the PUCCH secondary cell employing a transmit power control value received in a random access response. The determination step may be explicit or may be implicit as a part of the implementation of the PHY/MAC in the wireless device. If the determination is positive, the adjustment factor may be initialized at 2240. Otherwise, when the determination is negative, the adjustment factor may be initialized to zero at 2250. The determination step may be explicit or may be implicit as a part of the implementation of the PHY/MAC in the wireless device. According to an embodiment, the random access response may be received on a primary cell. According to an embodiment, the initializing of the adjustment factor may further comprise employing at least one power ramp-up value if the wireless device transmits the random access preamble.

At 2260, a first instance of uplink control information on the secondary PUCCH may be transmitted with an initial transmit power computed employing the adjustment factor. According to an embodiment, the method may further comprise computing the initial transmit power employing one or more second PUCCH power control IEs. The at least one message comprise one or more PUCCH IEs and one or more second PUCCH power control IEs. The one or more PUCCH IEs may indicate one or more PUCCH formats of the secondary PUCCH. The one or more second PUCCH power control IEs may indicate a power parameter value of at least one of the one or more PUCCH formats. According to an embodiment, the first instance of uplink control information may be transmitted after receiving the random access response.

According to an embodiment, the method may further comprise updating the adjustment factor employing one or more power control commands received from a base station.

Figure 23:
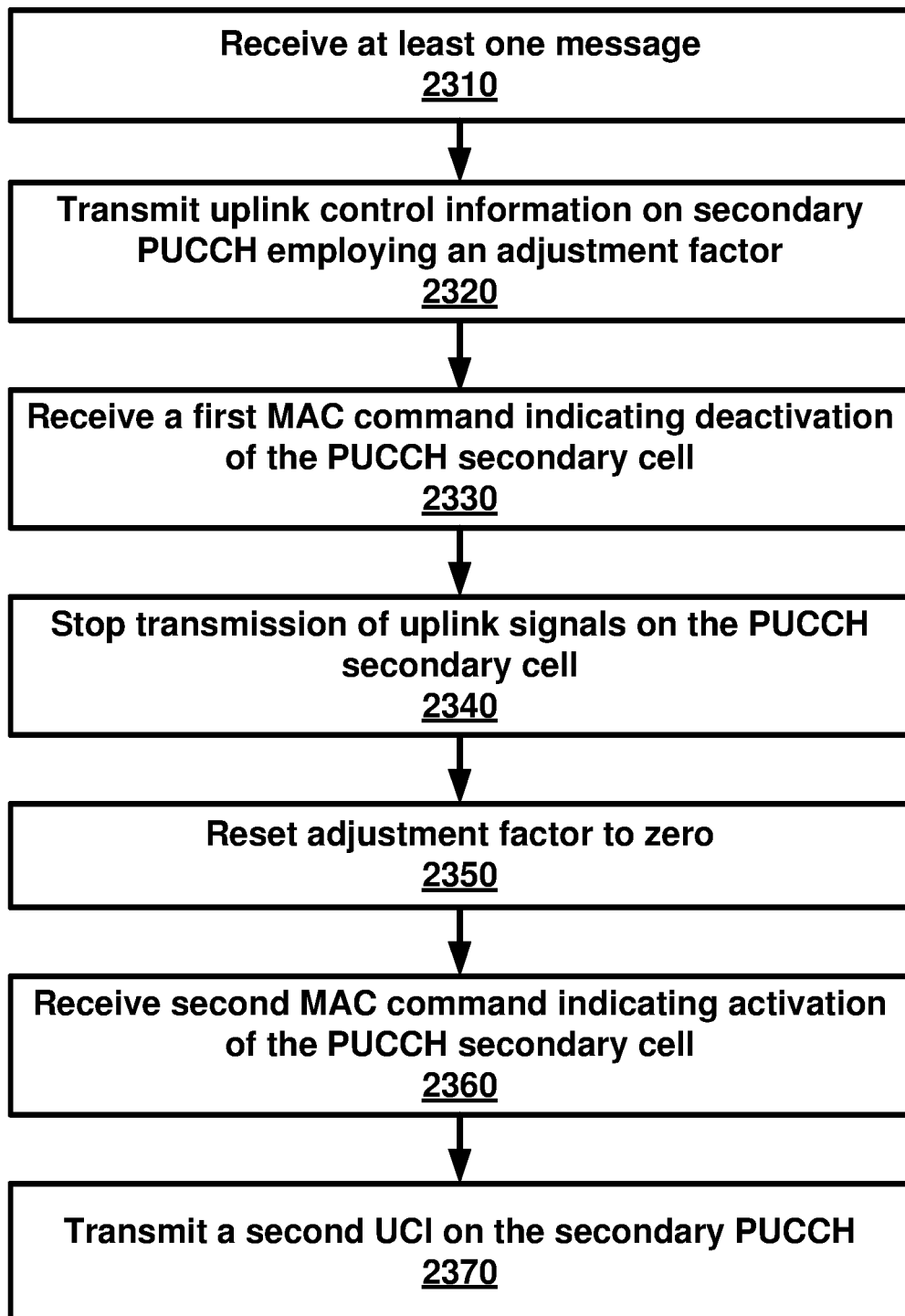
FIG. 23 is an example flow diagram as per an aspect of an embodiment of the present invention.

FIG. 23 is an example flow diagram as per an aspect of an embodiment of the present invention. According to an embodiment, a wireless device may comprise one or more processors and memory storing instructions that, when executed, cause the wireless device to perform at least part of the flow diagram. A wireless device may receive at least one message at 2310. The at least one message may comprise configuration parameters of a physical uplink control channel (PUCCH) secondary cell with a secondary PUCCH. According to an embodiment, the at least one message may comprise configuration parameters of a plurality of cells grouped into a plurality of PUCCH groups. The plurality of PUCCH groups may comprise a primary PUCCH group and a secondary PUCCH group. The primary PUCCH group may comprise a primary cell with a primary PUCCH transmitted to a base station. The secondary PUCCH group may comprise the PUCCH secondary cell with the secondary PUCCH transmitted to the base station. According to an embodiment, the at least one message may comprise random access resource parameters for the PUCCH secondary cell. According to an embodiment, the at least one message may comprise a pathloss reference parameter indicating a pathloss reference cell of the PUCCH secondary cell.

A first uplink control information (UCI) may be transmitted on the secondary PUCCH employing an adjustment factor at 2320. The adjustment factor may be updated when the wireless device receives a transmit power control command for the secondary PUCCH. According to an embodiment, the transmit power control command may be received on a common search space of a primary cell. According to an embodiment, the transmit power control command may be received on a dedicated search space of a secondary cell.

A first media access control (MAC) command indicating deactivation of the PUCCH secondary cell may be received at 2330. Transmission of uplink signals on the PUCCH secondary cell may be stopped at 2340. The adjustment factor may be reset to zero at 2350. A second MAC command indicating activation of the PUCCH secondary cell may be received at 2360. A second UCI may be transmitted on the secondary PUCCH at 2370.

According to an embodiment, the method may further comprise initializing the adjustment factor employing a transmit power control value received in a random access response if the wireless device transmits a random access preamble on the PUCCH secondary cell. According to an embodiment, the method may further comprise initializing the adjustment factor employing at least one power ramp-up value if the wireless device transmits a random access preamble on the PUCCH secondary cell.

Figure 24:
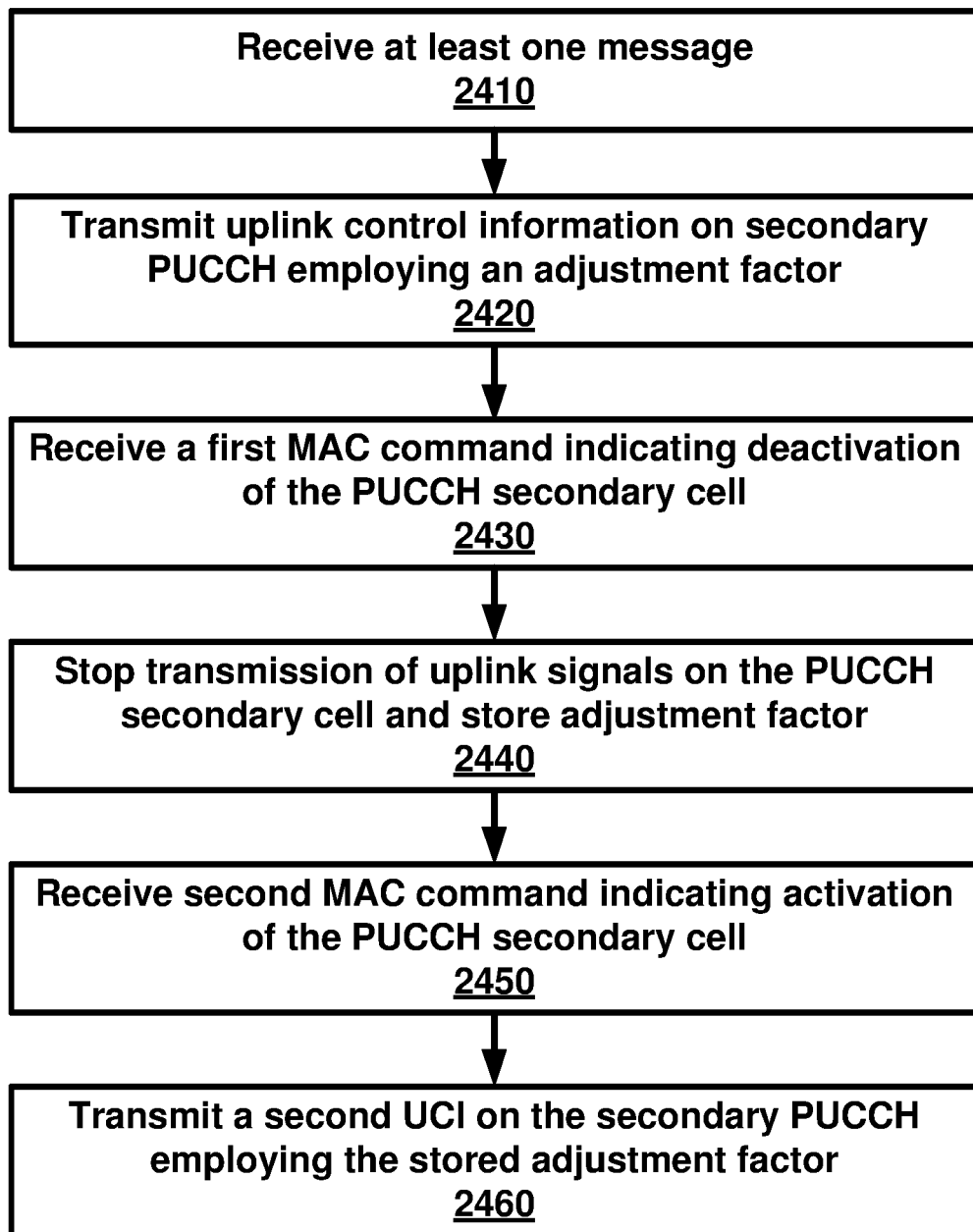
FIG. 24 is an example flow diagram as per an aspect of an embodiment of the present invention.

FIG. 24 is an example flow diagram as per an aspect of an embodiment of the present invention. According to an embodiment, a wireless device may comprise one or more processors and memory storing instructions that, when executed, cause the wireless device to perform at least part of the flow diagram. A wireless device may receive at least one message at 2410. The at least one message may comprise configuration parameters of a physical uplink control channel (PUCCH) secondary cell with a secondary PUCCH. According to an embodiment, the at least one message may comprise configuration parameters of a plurality of cells grouped into a plurality of PUCCH groups. The plurality of PUCCH groups may comprise a primary PUCCH group and a secondary PUCCH group. The primary PUCCH group may comprise a primary cell with a primary PUCCH transmitted to a base station. The secondary PUCCH group may comprise the PUCCH secondary cell with the secondary PUCCH transmitted to the base station. According to an embodiment, the at least one message may comprise random access resource parameters for the PUCCH secondary cell. According to an embodiment, the at least one message may comprise a pathloss reference parameter indicating a pathloss reference cell of the PUCCH secondary cell.

First uplink control information (UCI) may be transmitted on the secondary PUCCH employing an adjustment factor at 2420. The adjustment factor may be updated when the wireless device receives a transmit power control command for the secondary PUCCH. According to an embodiment, the transmit power control command may be received on a common search space of a primary cell. According to an embodiment, the transmit power control command may be received on a dedicated search space of a secondary cell.

A first media access control (MAC) command indicating deactivation of the PUCCH secondary cell may be received at 2430. Transmission of uplink signals on the PUCCH secondary cell may be stopped and a current value of the adjustment factor stored at 2440. A second MAC command indicating activation of the PUCCH secondary cell may be received at 2450. A second UCI may be transmitted on the secondary PUCCH employing the stored adjustment factor at 2460.

According to an embodiment, the method may further comprise initializing the adjustment factor employing a transmit power control value received in a random access response if the wireless device transmits a random access preamble on the PUCCH secondary cell. According to an embodiment, the method may further comprise initializing the adjustment factor employing at least one power ramp-up value if the wireless device transmits a random access preamble on the PUCCH secondary cell. According to an embodiment, the method may further comprise ignoring, by the wireless device, a first power control command for the secondary PUCCH when the PUCCH secondary cell is deactivated.

Figure 25:
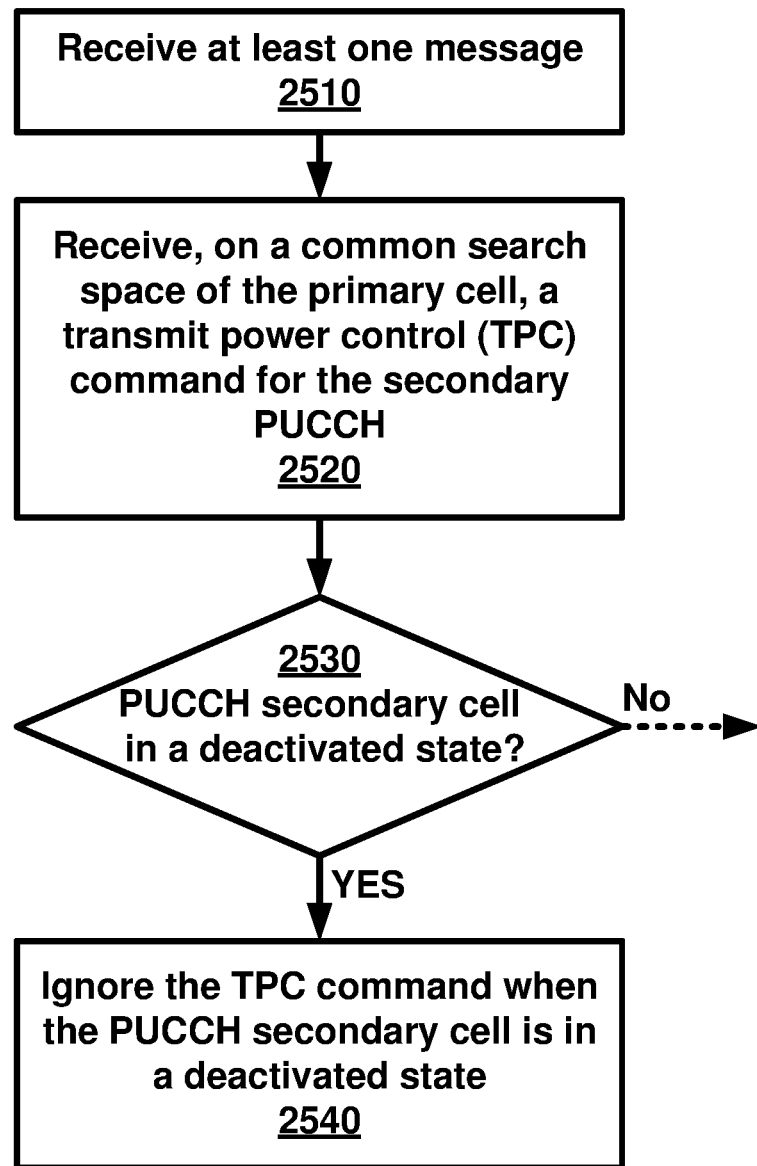
FIG. 25 is an example flow diagram as per an aspect of an embodiment of the present invention.

FIG. 25 is an example flow diagram as per an aspect of an embodiment of the present invention. According to an embodiment, a wireless device may comprise one or more processors and memory storing instructions that, when executed, cause the wireless device to perform at least part of the flow diagram. A wireless device may receive at least one message at 2510. The at least one message may comprise configuration parameters of a plurality of cells grouped into a plurality of physical uplink control channel (PUCCH) groups. The plurality of PUCCH groups may comprise a primary PUCCH group and a secondary PUCCH group. The primary PUCCH group may comprise a primary cell with a primary PUCCH. The secondary PUCCH group may comprise the PUCCH secondary cell with the secondary PUCCH. According to an embodiment, the at least one message may further comprise a pathloss reference parameter indicating a pathloss reference cell of the PUCCH secondary cell.

At 2520, the wireless device may receive, on a common search space of the primary cell, a transmit power control (TPC) command for the secondary PUCCH. A determination may be made as to whether the PUCCH secondary cell is in a deactivated state at 2530. The determination step may be explicit or may be implicit as a part of the implementation of the PHY/MAC in the wireless device. The wireless device may ignore the TPC command at 2540 when the PUCCH secondary cell is in a deactivated state.

According to an embodiment, the wireless device may further receive a media access control (MAC) command indicating activation of the secondary cell. According to an embodiment, the wireless device may transmit uplink control information (UCI) on the secondary PUCCH employing a closed loop adjustment factor of zero. According to an embodiment, the wireless device may transmit uplink control information (UCI) on the secondary PUCCH employing a stored value of a closed loop adjustment factor.

According to an embodiment, the wireless device may further calculate a transmit power of the secondary PUCCH employing the TPC command when the PUCCH secondary cell is in an activated state and transmit uplink signals on the secondary PUCCH with the transmit power. According to an embodiment, the wireless device may further receive a media access control (MAC) command indicating deactivation of the secondary cell. According to an embodiment, downlink control information may be received on the common search space may comprise the TPC command and a first TPC command for the primary PUCCH.

Figure 26:
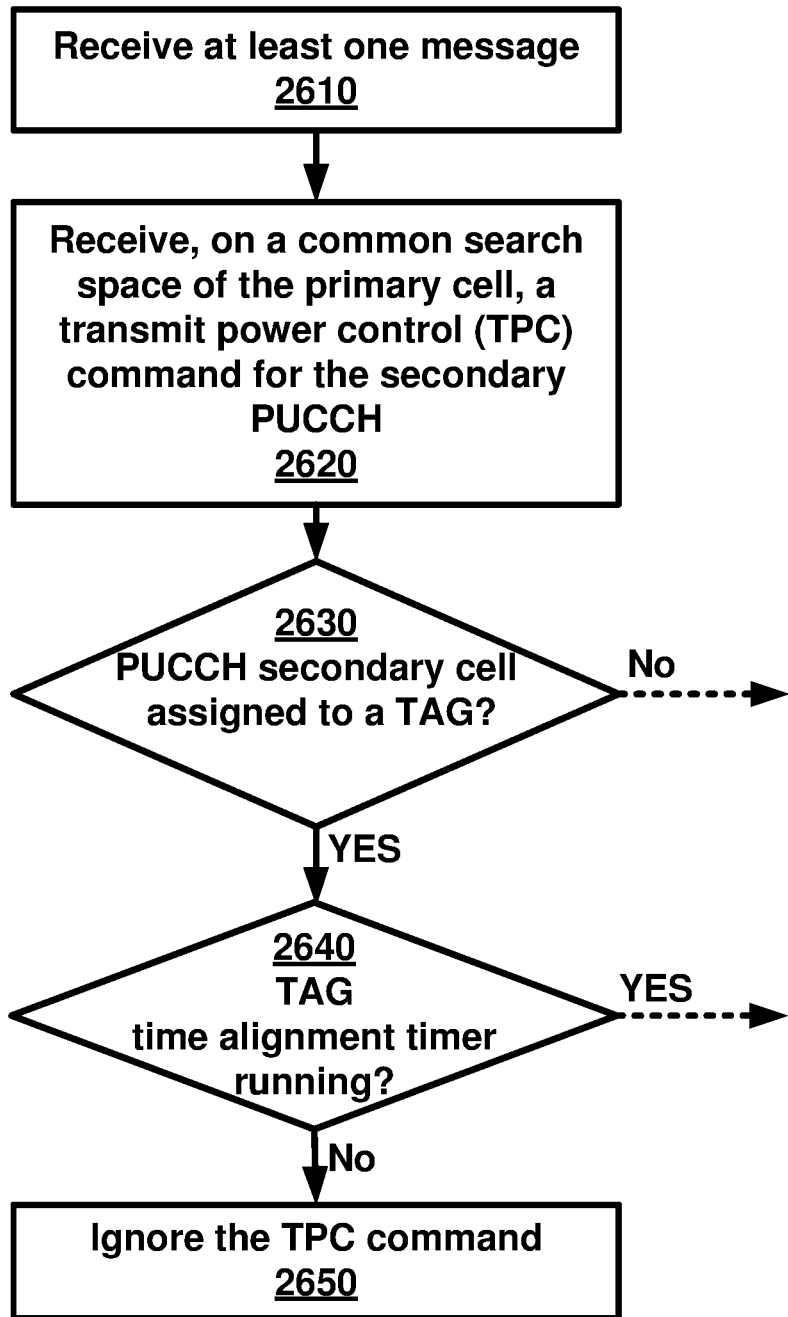
FIG. 26 is an example flow diagram as per an aspect of an embodiment of the present invention.

FIG. 26 is an example flow diagram as per an aspect of an embodiment of the present invention. According to an embodiment, a wireless device may comprise one or more processors and memory storing instructions that, when executed, cause the wireless device to perform at least part of the flow diagram. A wireless device may receive at least one message at 2610. The at least one message may comprise configuration parameters of a plurality of cells grouped into a plurality of physical uplink control channel (PUCCH) groups. The plurality of PUCCH groups may comprise a primary PUCCH group and a secondary PUCCH group. The primary PUCCH group may comprise a primary cell with a primary PUCCH. The secondary PUCCH group may comprise the PUCCH secondary cell with the secondary PUCCH. According to an embodiment, the at least one message may further comprise a pathloss reference parameter indicating a pathloss reference cell of the PUCCH secondary cell.

The wireless device may receive at 2620, on a common search space of the primary cell, a transmit power control (TPC) command of the secondary PUCCH. A determination may be made at 2630 whether the PUCCH secondary cell is assigned to a timing advance group. A determination may be made at 2640 whether the time alignment timer is running. The determination step may be explicit or may be implicit as a part of the implementation of the PHY/MAC in the wireless device. The wireless device may ignore the power control command at 2650 when the PUCCH secondary cell is assigned to a timing advance group whose time alignment timer is not running.

According to an embodiment, the wireless device may further receive a random access response comprising a timing advance command for a timing advance group and transmit uplink control information (UCI) on the secondary PUCCH employing a first TPC command. According to an embodiment, the wireless device may further calculate a transmit power of the secondary PUCCH employing the TPC command when the PUCCH secondary cell is in an activated state and the time alignment timer is running and transmit uplink signals on the secondary PUCCH with the transmit power. According to an embodiment, the wireless device may further receive a timing advance command for the timing advance group. According to an embodiment, downlink control information received on the common search space may comprise the TPC command and a first TPC command for the primary PUCCH.

Figure 27:
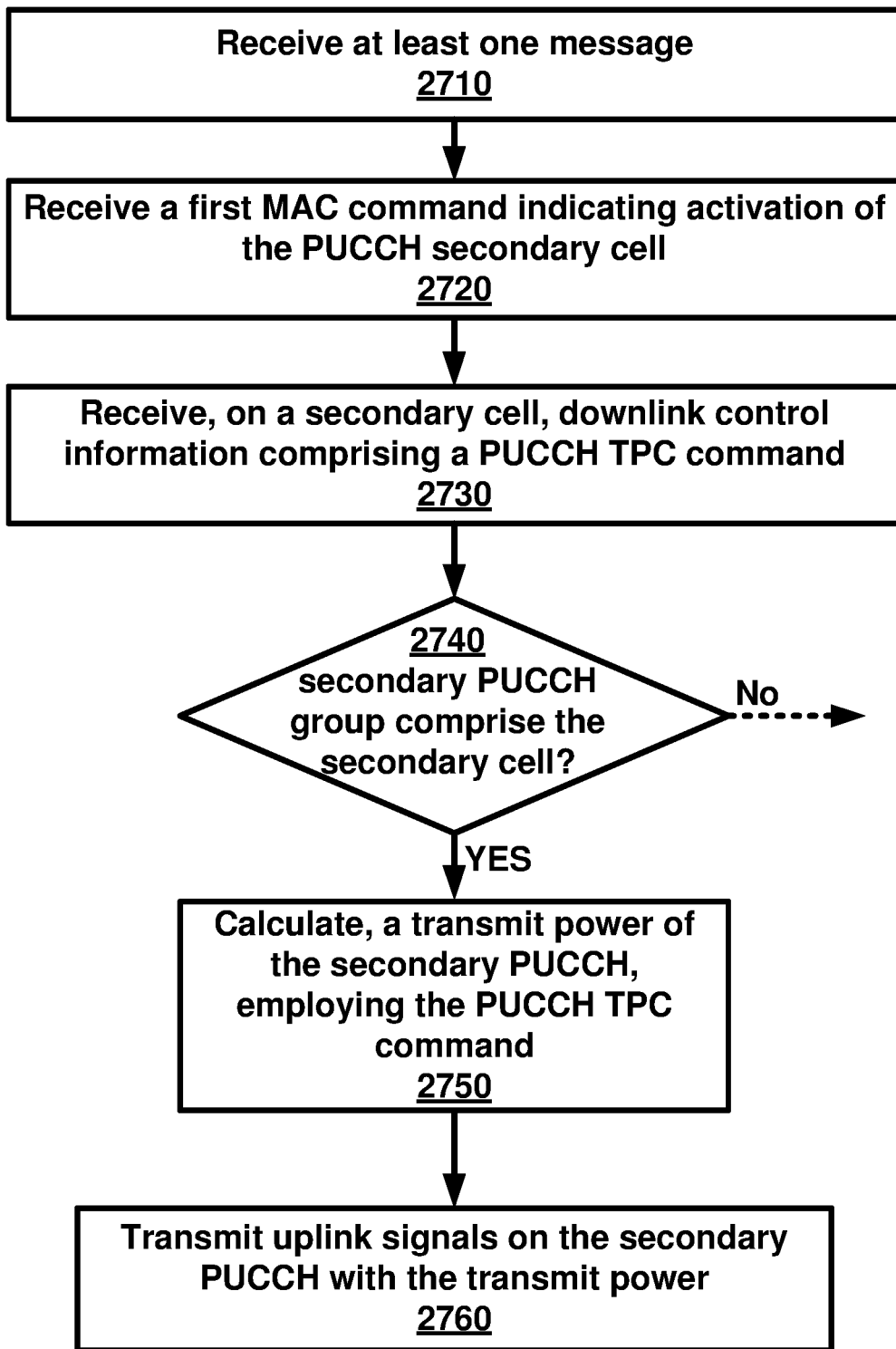
FIG. 27 is an example flow diagram as per an aspect of an embodiment of the present invention.

FIG. 27 is an example flow diagram as per an aspect of an embodiment of the present invention. A wireless device may receive at least one message at 2710. The at least one message may comprise configuration parameters of a plurality of cells grouped into a plurality of physical uplink control channel (PUCCH) groups. The plurality of PUCCH groups may comprise a primary PUCCH group and a secondary PUCCH group. The primary PUCCH group may comprise a primary cell with a primary PUCCH. The secondary PUCCH group may comprise the PUCCH secondary cell with the secondary PUCCH. According to an embodiment, the at least one message may further comprise a pathloss reference parameter indicating a pathloss reference cell of the PUCCH secondary cell.

According to an embodiment, the at least one message may comprise one or more first PUCCH information elements (IEs) and/or one or more second PUCCH power control IEs. The one or more first PUCCH information elements (IEs) may indicate one or more PUCCH formats of the secondary PUCCH. The one or more second PUCCH power control IEs may indicate a power parameter value for at least one of the one or more PUCCH formats.

The wireless device may receive, at 2720, a media access control (MAC) activation command indicating activation of the PUCCH secondary cell.

At 2730, the wireless device may receive, on a secondary cell in the plurality of cells, downlink control information comprising a PUCCH transmit power control (TPC) command. According to an embodiment, the downlink control information may be received in a wireless device specific search space of a physical downlink control channel of the secondary cell. According to an embodiment, the wireless device may further receive, on a common search space of the primary cell, a second PUCCH TPC command for the secondary PUCCH.

A determination may be made at 2740 whether the secondary PUCCH group comprises the secondary cell. The determination step may be explicit or may be implicit as a part of the implementation of the PHY/MAC in the wireless device. At 2750, the wireless device may calculate a transmit power of the secondary PUCCH employing the PUCCH TPC command only if the secondary PUCCH group comprises the secondary cell. According to an embodiment, the calculation of the transmit power may further employ one or more second PUCCH power control IEs. According to an embodiment, the wireless device may further calculate, a first transmit power of the primary PUCCH, employing the PUCCH TPC command only if the primary PUCCH group comprises the secondary cell; and transmit first uplink signals on the primary PUCCH with the first transmit power.

At 2760, the wireless device may transmit uplink signals on the secondary PUCCH with the transmit power. According to an embodiment, the uplink signals may comprise channel state information.

Figure 28:
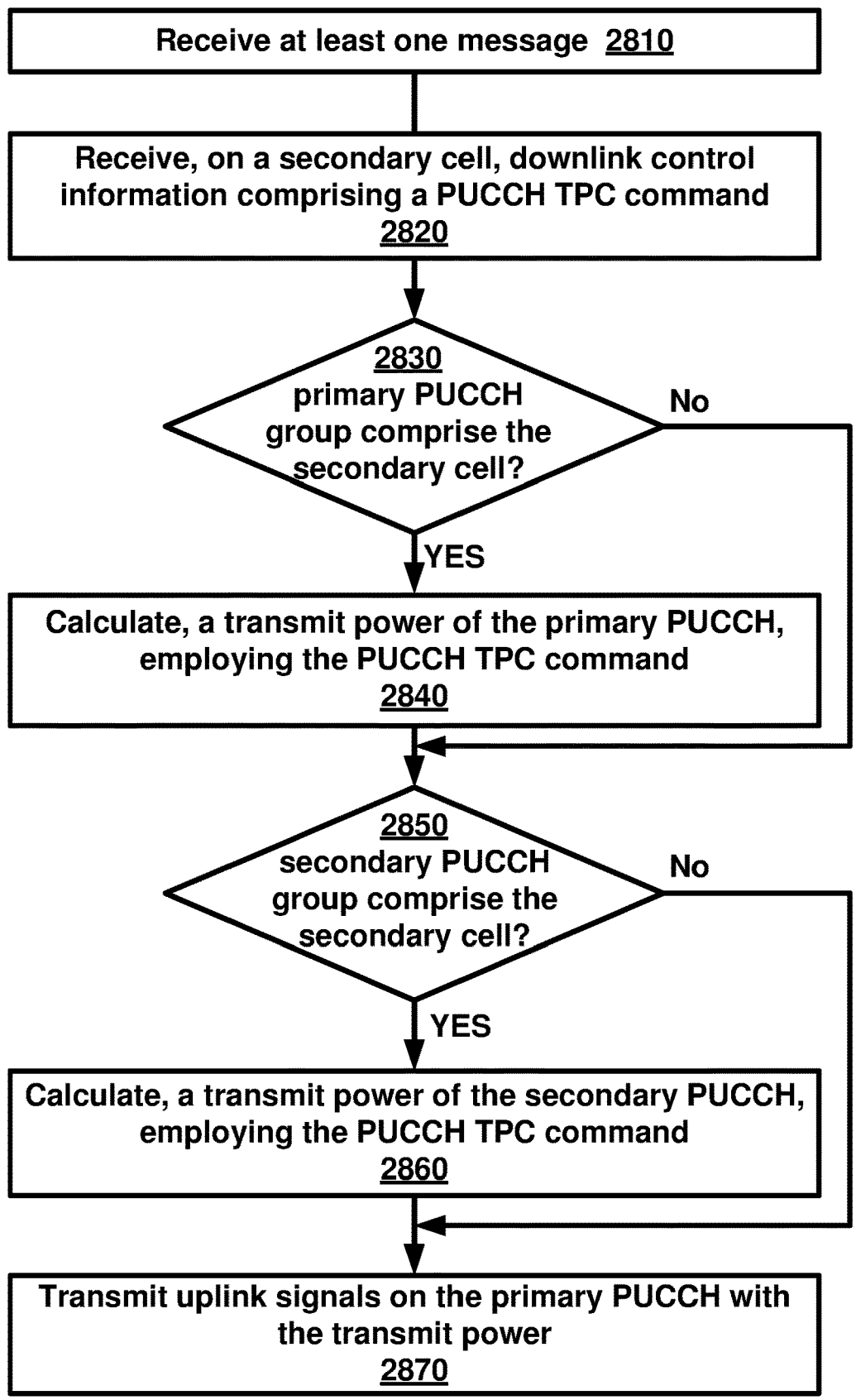
FIG. 28 is an example flow diagram as per an aspect of an embodiment of the present invention.

FIG. 28 is an example flow diagram as per an aspect of an embodiment of the present invention. A wireless device may receive at least one message at 2810. The at least one message may comprise configuration parameters of a plurality of cells grouped into a plurality of physical uplink control channel (PUCCH) groups. The plurality of PUCCH groups may comprise a primary PUCCH group and a secondary PUCCH group. The primary PUCCH group may comprise a primary cell with a primary PUCCH transmitted to a base station. The secondary PUCCH group may comprise the PUCCH secondary cell with the secondary PUCCH transmitted to the base station.

According to an embodiment, the at least one message may further comprise a pathloss reference parameter indicating a pathloss reference cell of the PUCCH secondary cell. According to an embodiment, the at least one message may comprise one or more first PUCCH information elements (IEs) and/or one or more second PUCCH power control IEs. The one or more first PUCCH IEs may indicate one or more PUCCH formats of the secondary PUCCH. The one or more second PUCCH power control IEs may indicate a power parameter value for at least one of the one or more PUCCH formats.

At 2820, the wireless device may receive, on a secondary cell in the plurality of cells, downlink control information comprising a PUCCH transmit power control (TPC) command. According to an embodiment, the downlink control information may be received in a wireless device specific search space of a physical downlink control channel of the secondary cell. According to an embodiment, the wireless device may further receive a second PUCCH TPC command for the second PUCCH on a common search space of the primary cell.

A determination may be made at 2830 whether the primary PUCCH group comprises the secondary cell. The determination step may be explicit or may be implicit as a part of the implementation of the PHY/MAC in the wireless device. At 2840, the wireless device may calculate, a first transmit power of the primary PUCCH, employing the PUCCH TPC command if the primary PUCCH group comprises the secondary cell. A determination may be made at 2850 whether the secondary PUCCH group comprises the secondary cell. The determination step may be explicit or may be implicit as a part of the implementation of the PHY/MAC in the wireless device. At 2860, the wireless device may calculate a second transmit power of the secondary PUCCH employing the PUCCH TPC command if the secondary PUCCH group comprises the secondary cell. According to an embodiment, the calculation of the second transmit power may further employ the one or more second PUCCH power control IEs.

At 2870, the wireless device may transmit first uplink signals on the primary PUCCH with the first transmit power or second uplink signals on the secondary PUCCH with the second transmit power. According to an embodiment, the second uplink signals may comprise channel state information.

Figure 29:
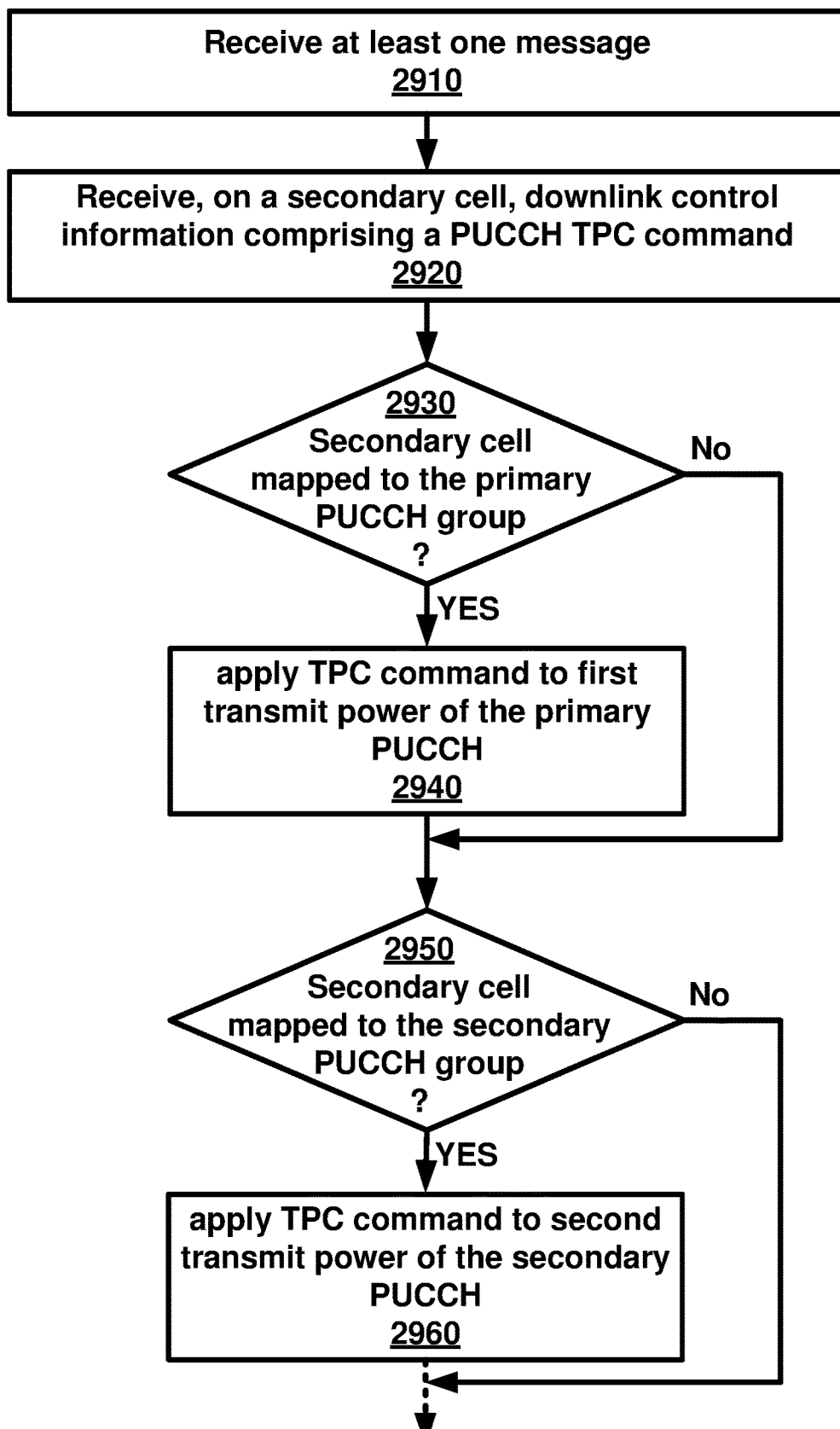
FIG. 29 is an example flow diagram as per an aspect of an embodiment of the present invention.

FIG. 29 is an example flow diagram as per an aspect of an embodiment of the present invention. According to an embodiment, a wireless device may comprise one or more processors and memory storing instructions that, when executed, cause the wireless device to perform at least part of the flow diagram. A wireless device may receive at least one message at 2910. The at least one message may comprise configuration parameters of a plurality of cells grouped into a plurality of physical uplink control channel (PUCCH) groups. The plurality of PUCCH groups may comprise a primary PUCCH group and a secondary PUCCH group. The primary PUCCH group may comprise a primary cell with a primary PUCCH transmitted to the base station. The secondary PUCCH group may comprise the PUCCH secondary cell with the secondary PUCCH transmitted to the base station.

According to an embodiment, the at least one message may further comprise a pathloss reference parameter indicating a pathloss reference cell of the PUCCH secondary cell. According to an embodiment, the at least one message may comprise the one or more PUCCH information elements (IEs) and/or the one or more second PUCCH power control IEs. The one or more PUCCH information elements (IEs) may indicate one or more PUCCH formats of the secondary PUCCH. The one or more second PUCCH power control IEs may indicate a power parameter value for at least one of the one or more PUCCH formats.

At 2920, the wireless device may receive, on a secondary cell in the plurality of cells, downlink control information comprising a PUCCH transmit power control (TPC) command. According to an embodiment, the wireless device may further receive a second PUCCH TPC command for the second PUCCH on a common search space of the primary cell. According to an embodiment, the downlink control information may be received in a wireless device specific search space of a physical downlink control channel of the secondary cell. According to an embodiment, the downlink control information may be received in a wireless device specific search space of a physical downlink control channel of the secondary cell.

A determination may be made at 2930 whether the secondary cell is mapped to the primary PUCCH group. The determination step may be explicit or may be implicit as a part of the implementation of the PHY/MAC in the wireless device. At 2940, the wireless device may apply the TPC command to a first transmit power of the primary PUCCH if the secondary cell is mapped to the primary PUCCH group. A determination may be made at 2950 whether the secondary cell is mapped to the secondary PUCCH group. The determination step may be explicit or may be implicit as a part of the implementation of the PHY/MAC in the wireless device. At 2960, the wireless device may apply the TPC command to a second transmit power of the secondary PUCCH if the secondary cell is mapped to the secondary PUCCH group. The determination blocks in the figures of the specification describe conditional behavior of the mechanisms implemented in the wireless device. Implementation of the determination mechanism may be implicit by a hardware or code in a memory, or other methods.

According to an embodiment, the wireless device may further compute the second transmit power employing one or more second PUCCH power control IEs. According to an embodiment, the wireless device may further transmit first uplink signals on the primary PUCCH with the first transmit power or second uplink signals on the secondary PUCCH with the second transmit power.

A Primary PUCCH group may comprise a group of serving cells including a PCell whose PUCCH signalling may be associated with the PUCCH on PCell. A PUCCH group may comprise either a primary PUCCH group or a secondary PUCCH group. A PUCCH SCell may comprise a Secondary Cell configured with PUCCH. A Secondary PUCCH group may comprise a group of SCells whose PUCCH signalling may be associated with the PUCCH on the PUCCH SCell. A Timing Advance Group (TAG) may comprise a group of serving cells that may be configured by RRC and that, for the cells with an UL configured, may use the same timing reference cell and the same Timing Advance value. A Primary Timing Advance Group (pTAG) may comprise a Timing Advance Group containing the PCell. A Secondary Timing Advance Group (sTAG) may comprise a Timing Advance Group not containing the PCell.

A Physical uplink control channel (PUCCH) may be transmitted on a PCell, a PUCCH SCell (if such is configured in CA) and on a PSCell (in DC). The configured set of serving cells for a UE may always consists of one PCell and one or more SCells. If DC is not configured, one additional PUCCH may be configured on an SCell, and/or the PUCCH SCell. When a PUCCH SCell is configured, RRC may configure the mapping of each serving cell to Primary PUCCH group or Secondary PUCCH group, i.e., for each SCell whether the PCell or the PUCCH SCell is used for the transmission of ACK/NAKs and CSI reports.

If the UE is configured with a SCG, the UE may apply the procedures for both MCG and SCG. When the procedures are applied for MCG, the term 'serving cell' may refers to a serving cell belonging to the MCG.

When the procedures are applied for SCG, the term 'serving cell' may refer to a serving cell belonging to the SCG. The term 'primary cell' may refer to the PSCell of the SCG. If the UE is configured with a PUCCH-SCell, the UE may apply procedures for both primary PUCCH group and secondary PUCCH group. When the procedures are applied for the primary PUCCH group, the term 'serving cell' may refer to a serving cell belonging to the primary PUCCH group. When the procedures are applied for the secondary PUCCH group, the term 'serving cell' may refer to a serving cell belonging to the secondary PUCCH group. The term 'primary cell' may refer to the PUCCH-SCell of the secondary PUCCH group.

$\delta_{PUCCH}$ may comprise a UE specific correction value, also referred to as a TPC command, included in a PDCCH with DCI format 1A/1B/1D/1/2A/2/2B/2C/2D for the primary cell, or included in an EPDCCH with DCI format 1A/1B/1D/1/2A/2/2B/2C/2D for the primary cell, or sent jointly coded with other UE specific PUCCH correction values on a PDCCH with DCI format 3/3A whose CRC parity bits are scrambled with TPC-PUCCH-RNTI.

If a UE is not configured for EPDCCH monitoring, the UE may attempt to decode a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI on every subframe except when in DRX. If a UE is configured for EPDCCH monitoring, the UE may attempt to decode a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI, and one or several EPDCCHs of DCI format 1A/1B/1D/1/2A/2/2B/2C/2D with the UE's C-RNTI or SPS C-RNTI.

If the UE decodes a PDCCH with DCI format 1A/1B/1D/1/2A/2/2B/2C/2D or an EPDCCH with DCI format 1A/1B/1D/1/2A/2/2B/2C/2D for the primary cell and the corresponding detected RNTI equals the C-RNTI or SPS C-RNTI of the UE and the TPC field in the DCI format is not used to determine the PUCCH resource, the UE may use the $\delta_{PUCCH}$ provided in that PDCCH/EPDCCH. Otherwise, if the UE decodes a PDCCH with DCI format 3/3A, the UE may use the $\delta_{PUCCH}$ provided in that PDCCH, else the UE may be set PUCCH=0 dB. g(i)-g(i-1)+$\Sigma_{m=0}^{M-1}\delta_{PUCCH}$(i-$k_m$) where is the current PUCCH power control adjustment state and where g(0) is the first value after reset. For FDD or FDD-TDD and primary cell frame structure type 1, M=1 and $k_0$=4. For TDD, values of M and $k_m$ be given, where the "UL/DL configuration" may corresponds to the eimta-HARQ-ReferenceConfig-r12 for the primary cell when the UE is configured with the parameter EIMTA-MainConfig-ServCell-r12 for the primary cell. The $\delta_{PUCCH}$ dB values signalled on PDCCH with DCI format 1A/1B/1D/1/2A/2/2B/2C/2D or EPDCCH with DCI format 1A/1B/1D/1/2A/2/2B/2C/2D may be given below. If the PDCCH with DCI format 1/1A/2/2A/2B/2C/2D or EPDCCH with DCI format 1/1A/2A/2/2B/2C/2D is validated as an SPS activation PDCCH/EPDCCH, or the PDCCH/EPDCCH with DCI format 1A is validated as an SPS release PDCCH/EPDCCH, then $\delta_{PUCCH}$ may be 0 dB. The PUCCH dB values signalled on PDCCH with DCI format 3/3A may be given as semi-statically configured by higher layers.

If the UE is configured with a SCG, the UE may apply procedures for both MCG and/or SCG. When the procedures are applied for MCG, the term 'serving cell' may refer to a serving cell belonging to the MCG. When the procedures are applied for SCG, the term 'serving cell' may refers to a serving cell belonging to the SCG. The term 'primary cell' may refer to the PSCell of the SCG. If the UE is configured with a PUCCH-SCell, the UE may apply the procedures described in for both primary PUCCH group and secondary PUCCH group. When the procedures are applied for the primary PUCCH group, the term 'serving cell' may refer to a serving cell belonging to the primary PUCCH group. When the procedures are applied for the secondary PUCCH group, the term 'serving cell' may refer to a serving cell belonging to the secondary PUCCH group. The term 'primary cell' may refer to the PUCCH-SCell of the secondary PUCCH group.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A method comprising:
   transmitting, by a wireless device, first control information, via a secondary physical uplink control channel (PUCCH) of a secondary cell, with a first transmit power computed based on an adjustment factor;
   receiving a power control command of the secondary PUCCH;
   ignoring the power control command by not applying the power control command to the adjustment factor in response to a time alignment timer of a timing advance group comprising the secondary cell not running;
   initializing the adjustment factor to a first value; and
   transmitting second control information on the secondary PUCCH with a second transmit power computed based on the initialized adjustment factor.

2. The method of claim 1, further comprising receiving at least one message comprising configuration parameters of a plurality of cells grouped into a plurality of PUCCH groups, the plurality of PUCCH groups comprising:
   a primary PUCCH group comprising a primary cell with a primary PUCCH transmitted to a base station; and
   a secondary PUCCH group comprising the secondary cell with the secondary PUCCH transmitted to the base station.

3. The method of claim 2, wherein the at least one message further comprises random access resource parameters of the PUCCH secondary cell.

4. The method of claim 2, wherein the at least one message further comprises a pathloss reference parameter indicating a pathloss reference cell for the PUCCH secondary cell.

5. The method of claim 1, wherein the first value is received in a random access response received on a primary cell.

6. The method of claim 5, wherein the first control information is transmitted after receiving the random access response.

7. The method of claim 1, further comprising computing the first transmit power employing one or more second PUCCH power control information elements indicating a power parameter value of at least one PUCCH format.

8. The method of claim 1, wherein the initializing the adjustment factor further comprises employing at least one power ramp-up value.

9. The method of claim 1, wherein the secondary cell is initially deactivated when configured.

10. A wireless device comprising:
    one or more processors; and
    memory storing instructions that, when executed, cause the wireless device to:
    transmit first control information, via a secondary physical uplink control channel (PUCCH) of a secondary cell, with a first transmit power computed based on an adjustment factor;
    receive a power control command of the secondary PUCCH;
    ignore the power control command by not applying the power control command to the adjustment factor in response to a time alignment timer of a timing advance group comprising the secondary cell not running;
    initialize the adjustment factor to a first value; and
    transmit second control information on the secondary PUCCH with a second transmit power computed based on the initialized adjustment factor.

11. The wireless device of claim 10, wherein the instructions, when executed by the one or more processors, further cause the wireless device to receive at least one message comprising configuration parameters of a plurality of cells grouped into a plurality of PUCCH groups, the plurality of PUCCH groups comprising:
    a primary PUCCH group comprising a primary cell with a primary PUCCH transmitted to a base station; and
    a secondary PUCCH group comprising the secondary cell with the secondary PUCCH transmitted to the base station.

12. The wireless device of claim 11, wherein the at least one message further comprises random access resource parameters of the PUCCH secondary cell.

13. The wireless device of claim 11, wherein the at least one message further comprises a pathloss reference parameter indicating a pathloss reference cell for the PUCCH secondary cell.

14. The wireless device of claim 10, wherein the first value is received in a random access response received on a primary cell.

15. The wireless device of claim 14, wherein the first control information is transmitted after receiving the random access response.

16. The wireless device of claim 10, wherein the instructions, when executed by the one or more processors, further cause the wireless device to compute the first transmit power employing one or more second PUCCH power control information elements indicating a power parameter value of at least one PUCCH format.

17. The wireless device of claim 10, wherein the instructions, when executed by the one or more processors, further cause the wireless device to initialize the adjustment factor employing at least one power ramp-up value.

18. The wireless device of claim 10, wherein the secondary cell is initially deactivated when configured.

\* \* \* \* \*